United States Patent
McDevitt et al.

(10) Patent No.: US 10,366,427 B2
(45) Date of Patent: Jul. 30, 2019

(54) METHOD AND SYSTEM FOR IMPROVED E-COMMERCE SHOPPING

(71) Applicant: HSNi, LLC, St. Petersburg, FL (US)

(72) Inventors: John McDevitt, Clearwater, FL (US); Sean Bunner, St. Petersburg, FL (US); Gerard Johnson, Wesley Chapel, FL (US)

(73) Assignee: HSNi, LLC, St. Petersburg, FL (US)

( * ) Notice: Subject to any disclaimer, the term of this patent is extended or adjusted under 35 U.S.C. 154(b) by 0 days.

(21) Appl. No.: 16/137,429

(22) Filed: Sep. 20, 2018

(65) Prior Publication Data

US 2019/0026802 A1 Jan. 24, 2019

Related U.S. Application Data

(63) Continuation of application No. 15/924,556, filed on Mar. 19, 2018, now Pat. No. 10,089,663, which is a continuation of application No. 15/600,925, filed on May 22, 2017, now Pat. No. 9,947,034, which is a continuation of application No. 15/098,705, filed on Apr. 14, 2016, now Pat. No. 9,697,549, which is a continuation of application No. 13/792,628, filed on Mar. 11, 2013, now abandoned, which is a continuation of application No. 12/788,615, filed on May 27, 2010, now Pat. No. 8,423,421, which is a continuation of application No. 12/330,385, filed on Dec. 8, 2008, now Pat. No. 7,756,758.

(51) Int. Cl.
*G06Q 30/00* (2012.01)
*G06Q 30/06* (2012.01)

(52) U.S. Cl.
CPC ..... *G06Q 30/0603* (2013.01); *G06Q 30/0623* (2013.01); *G06Q 30/0641* (2013.01)

(58) Field of Classification Search
None
See application file for complete search history.

(56) References Cited

U.S. PATENT DOCUMENTS

| 5,438,355 | A | 8/1995 | Almer |
| 6,769,128 | B1 | 7/2004 | Knee et al. |
| 7,664,678 | B1 | 2/2010 | Haber |
| 8,671,424 | B2 | 3/2014 | Skinner |
| 2001/0030660 | A1 | 10/2001 | Zainoulline |
| 2002/0089534 | A1 | 7/2002 | Siekmann |

(Continued)

FOREIGN PATENT DOCUMENTS

| KR | 10-1999-022390 A | 3/1999 |
| KR | 10-2001-0110767 A | 12/2001 |

(Continued)

OTHER PUBLICATIONS

Notice of Preliminary Rejection from the Korean Intellectual Property Office for corresponding KR 10-2014-7007071, dated Jun. 13, 2014.

*Primary Examiner* — Mila Airapetian
(74) *Attorney, Agent, or Firm* — Arent Fox LLP

(57) ABSTRACT

An e-commerce system and method for presenting product information to a viewer, where a video feed and product information associated with a product that relates to the content in the video feed can be displayed or presented to the viewer on one or more remote display devices.

30 Claims, 55 Drawing Sheets

(56) References Cited

U.S. PATENT DOCUMENTS

| | | | |
|---|---|---|---|
| 2002/0131511 A1* | 9/2002 | Zenoni | G07C 9/00158 375/240.28 |
| 2004/0165006 A1 | 8/2004 | Kirby | |
| 2006/0020523 A1* | 1/2006 | Song | G06Q 30/0256 705/14.54 |
| 2006/0026655 A1 | 2/2006 | Perez | |
| 2006/0184424 A1 | 8/2006 | Connolly et al. | |
| 2006/0184966 A1 | 8/2006 | Hunleth et al. | |
| 2006/0224761 A1 | 10/2006 | Howarth et al. | |
| 2006/0230427 A1 | 10/2006 | Kunkel et al. | |
| 2007/0186252 A1 | 8/2007 | Maggio | |
| 2008/0018783 A1* | 1/2008 | Chen | G06K 9/00711 348/402.1 |
| 2008/0086752 A1 | 4/2008 | Perez | |
| 2008/0148152 A1 | 6/2008 | Blinnikka et al. | |
| 2009/0164484 A1* | 6/2009 | Horowitz | H04N 7/17318 |
| 2009/0300670 A1 | 12/2009 | Barish | |
| 2009/0307741 A1* | 12/2009 | Casagrande | G11B 27/034 725/137 |
| 2010/0003015 A1* | 1/2010 | Rodriguez | H04N 19/66 386/220 |
| 2014/0181862 A1 | 6/2014 | Sussman | |
| 2014/0245213 A1 | 8/2014 | Gardenfors et al. | |

FOREIGN PATENT DOCUMENTS

| | | |
|---|---|---|
| KR | 10-2002-0028745 A | 4/2002 |
| KR | 2007-0042151 A | 4/2007 |
| WO | 00/67484 A1 | 11/2000 |

\* cited by examiner

METHOD AND SYSTEM FOR IMPROVED E-COMMERCE SHOPPING

CROSS REFERENCE TO RELATED APPLICATIONS

This application is a continuation of pending U.S. patent application Ser. No. 15/924,556, filed Mar. 19, 2018, which is a continuation of U.S. patent application Ser. No. 15/600,925, filed May 22, 2017, now issued as U.S. Pat. No. 9,947,034, which is a continuation of U.S. patent application Ser. No. 15/098,705, filed Apr. 14, 2016, now issued as U.S. Pat. No. 9,697,549, which is a continuation of U.S. patent application Ser. No. 13/792,628, filed Mar. 11, 2013, now abandoned, which is a continuation of U.S. patent application Ser. No. 12/788,615, filed May 27, 2010, now issued as U.S. Pat. No. 8,423,421, which is a continuation of U.S. patent application Ser. No. 12/330,385, filed Dec. 8, 2008, now issued as U.S. Pat. No. 7,756,758, the entire contents of each of which are incorporated herein by reference into the present application.

FIELD OF THE INVENTION

The present invention relates to a method and system for offering products and services via multiple formats. An exemplary embodiment of the present invention may include providing a catalog of products to a user, a live video stream showcasing products the user may purchase, and on-demand video streams showcasing products the user may purchase.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND INFORMATION

Commerce may be conducted in numerous venues. In particular, commerce may be conducted in real space or electronically, i.e., e-commerce. E-commerce is conducted via a computer network. Servers are used to store product and transaction information and computer terminals are used by purchasers to access the information stored in the server to view and modify such information via a transaction.

Another form of direct to the consumer product presentation includes a video feed of products and associated information, presented in conjunction with an ordering mechanism. For example, a television channel may present one or more pieces of jewelry with a phone number to call to order.

Further, television has evolved past mere broadcast and receipt of different programs (e.g., one stream per "channel"). Now, a limited quantity of programming is available "on-demand" ("VOD"). Some VOD is "pay-per-view," where the viewer is charged a fee for the content. Other VOD is free, or unlimited with a monthly subscription.

It would be desirable to combine and enhance these features to provide a superior format for consumers to shop for various goods and/or services.

SUMMARY

In an exemplary embodiment of the present invention, a system may be provided that includes a video component, a processing component, and a communication component. For example, an example system may be implemented with a general purpose computer ("PC"). The 5 example system may be a desktop, laptop, cellular telephone, personal digital assistant ("PDA"), smart-phone, television with internal or attached processors (e.g., a "cable-box"), or any number of other systems that provide the essential elements of the present invention.

The system may provide a combination of product presentation tools to facilitate a diversified shopping experience for the user. For example, the example systems and methods may provide three general presentation formats. First, a user may be able to browse through an electronic catalog of products. This catalog may contain all of the products available, may contain products that are not available in the other formats, or may lack some products that are available in the other formats. Second, the user may be able to see a live video feed. This may be an ongoing video presentation of different items for sale. Several companies already present products for sale on one or more television stations, in one or more broadcast areas. Example embodiments of the present invention may tie into that established service and present the live feed of that on-going program. The program itself may be live or pre-recorded, and the "live" format may present the live feed of the program. This program may have information embedded in the feed, such as a textual description about the product and terms of the offering. The information may include a phone number to call to order the product. When transmitted to a passive television, the embedded information may be the sole source of information about the product or ordering terms. However, when accessed via a system according to an example embodiment of the present invention, additional information or options may be provided by the example system, while presenting the program. An example may include an alternative purchasing mechanism, such as an e-commerce order form provided in conjunction with the presented item. Alternatively, a link to the page in the online catalog where the currently presented product is available for purchase may be provided. This page may be a webpage accessible by the internet, a set-top box page displayed on a television, or any number of other interactive display pages. Additional information about the product, interactive sets of information, recommendations of similar products, advertisements, or any other relevant material may be presented in conjunction with the product presentation.

A third format that may be provided by example embodiments of the present invention is a VOD product presentation system. This portion of example embodiments may include multiple presentations to choose from, preferably organized into categories (e.g., "home and garden," "jewelry," "apparel," etc.). Any number of subcategories may also be used in this 5 section. The VOD section may include live feeds, similar to the "live" section, may include stored video, or may be a combination of the two. The stored video may include previously aired "live" segments of products still available for purchase, and may include segments only available in the VOD section (e.g., not previously aired in the "live" section).

Example embodiments of the present invention may include a method of presenting e-commerce products. The method may include providing a user interface. The method may include displaying a plurality of product categories. The method may include receiving user input selecting one of the plurality of product categories. The method may include displaying a video feed, where the video feed is streamed from a VOD server, and where the video feed includes video presentations of products for sale, where the products for sale are all of a type belonging to the selected product category. The method may include displaying a link in proximity to an area displaying the video feed, where the link provides information about a product currently being presented in the video feed. Responsive to user input selecting the link, the method may display additional information about the product currently being presented. The method may include providing a user input mechanism, associated with the link, for indicating a desire to purchase an item associated with the link (e.g., a "buy now" button). The method may include displaying a second link in proximity to the link, where the second link provides information about a product that was previously presented in the video feed. The method may include restarting the video feed at a starting point for a presentation of a product associated with the second link, responsive to the user clicking on the second link. The method may include displaying a third link in proximity to the link, where the third link provides information about a product that will be subsequently presented in the video feed. The method may include advancing the video feed to a starting point for a presentation of a product associated with the third link, responsive to clicking on the third link. The video feed may be pre-recorded and stored on a server. The method may include providing an option, selectable by the user, to display a live video feed, and displaying the live video feed, responsive to a selection by the user.

An example embodiment of the present invention may include a method of e-commerce including serving a plurality of video streams to a plurality of user devices, receiving input from a user requesting a particular video stream of the plurality, streaming the requested video stream to the user, providing information about a product for sale, where the product is presented in the particular video stream, and receiving input from the user requesting to purchase the item. The plurality of video streams may be organized into a plurality of categories. At least one category may be organized into a plurality of sub-categories. The streaming may be performed over a television transmission network or a computer network.

Example embodiments of the present invention may include an e-commerce system, including a computer with a display, where the system is configured to provide a set of user interfaces. The example system may have a first user interface configured to receive and display video received from a VOD system, where the VOD system includes a plurality of video segments, where each segment includes a presentation of at least one product available for sale, where the plurality of video segments are organized in a plurality of categories, and where at least one category is organized in a plurality of sub-categories. Also, the first user interface may be configured to receive user input selecting a desired category from the plurality of categories. The first user interface may be configured to display one or more video segments associated with the desired category. The first user interface may be configured to display information associated with a product, where the product is presented in a currently playing video segment. The first user interface may be configured to receive input from a user indicating a desire to purchase the product. One or more video segments associated with the desired category may be displayed one at a time in a predetermined order. The user interface may be configured to display a plurality of links, where each link is associated with a product, where the links are organized in an order according to the predetermined order of the one or more video segments. The user interface may be configured to display a video segment associated with a link, responsive to the user selecting the link.

An example embodiment of the present invention may include producing a continuous set of video segments, each segment featuring a product or set of products for sale. The example method may broadcast this ordered set as a "shop at home" television program. The continuous set may be partitioned into the individual segments and stored on a video server. The segments may be tagged with various categories, attributes, and features. The example method may then provide users with a user interface (UI). The UI may display the broadcast program and may enhance the broadcast program with additional information and options related to the featured product. The UI may provide a VOD system, where users may stream different sets of video segments, and the UI may provide enhancements for those video segments. The UI may provide 5 an e-commerce catalog, where each product in the catalog has various descriptions, and each product has a video segment associated with the product. The associated video segment may feature that product.

DETAILED DESCRIPTION

In an exemplary embodiment of the present invention, a system may be provided that includes a video component, a processing component, and a communication component. For example, an example system may be implemented with a general purpose computer ("PC"). The example system may be a desktop, laptop, cellular telephone, personal digital assistant ("PDA"), smart-phone, television with internal or attached processors (e.g., a "cable-box"), or any number of other systems that provide the essential elements of the present invention.

The system may provide a combination of product presentation tools to facilitate a diversified shopping experience for the user. For example, the example systems and methods 5 may provide three general presentation formats. First, a user may be able to browse through an electronic catalog of products. This catalog may contain all of the products available, may contain products that are not available in the other formats, or may lack some products that are available in the other formats. Second, the user may be able to see a live video feed. This may be an ongoing video presentation of different items for sale. Several companies already present products for sale on one or more television stations, in one or more broadcast areas. Example embodiments of the present invention may tie into that established service and present the live feed of that on-going program. The program itself may be live or pre-recorded, and the "live" format may present the live feed of the program. This program may have information embedded in the feed, such as textual description about the product and terms of the offering. The information may include a phone number to call to order the product. When transmitted to a passive television, the embedded information may be the sole source of information about the product or ordering terms. However, when accessed via an example embodiment of the present invention, additional information or options may be provided by an example system, while presenting the program. An example may include an alternative purchasing mechanism, such as an e-commerce order form provided in conjunction with the presented item. Alternatively, a link to the page in the online catalog where the currently presented product is available for purchase may be provided. Additional information about the product, interactive sets of information, recommendations of similar products, advertisements, or any other relevant material may be presented in conjunction with the product presentation.

Figure 1:
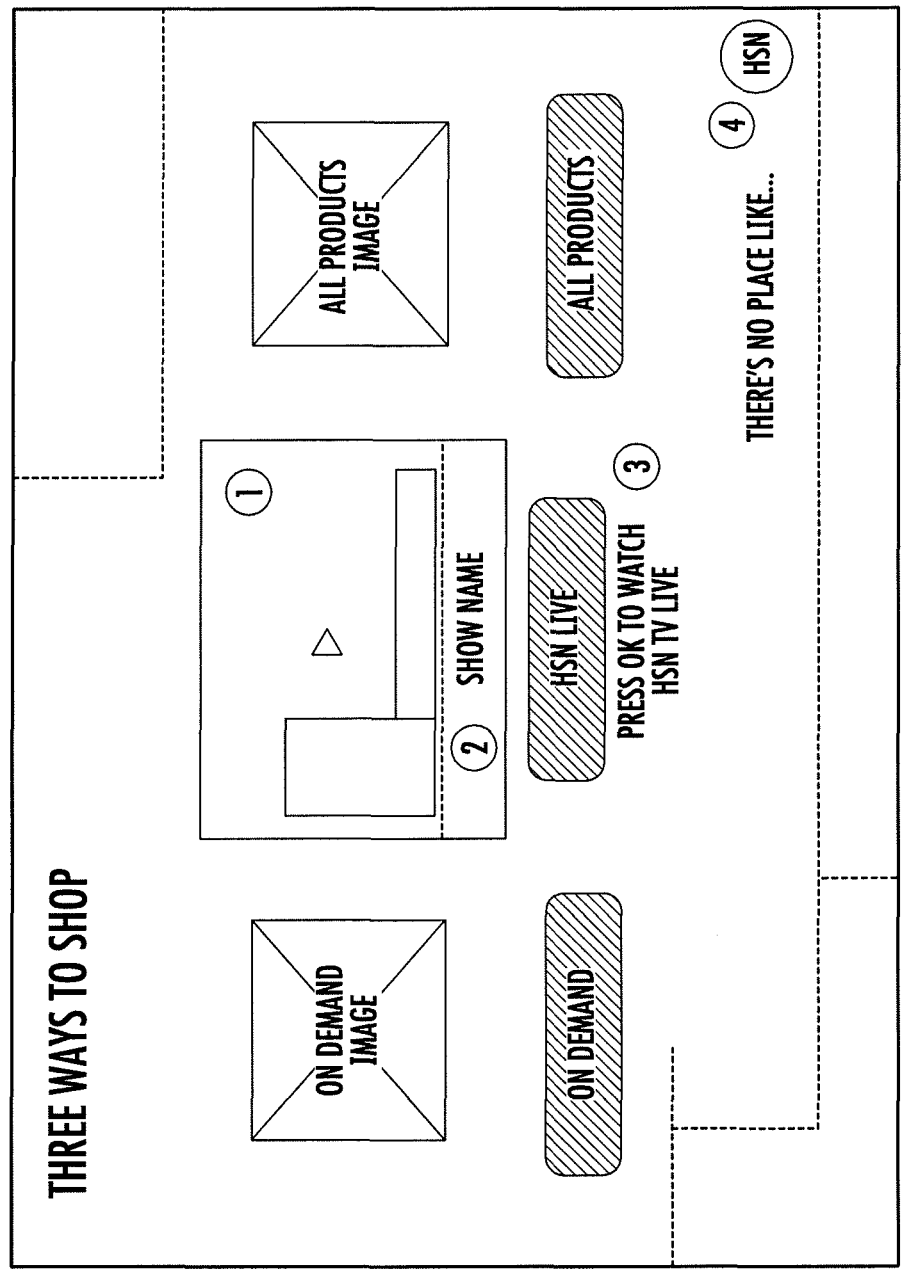
FIGS. 1 to 12 are exemplary user interfaces, according to example embodiments of the present invention.
Figure 1B:
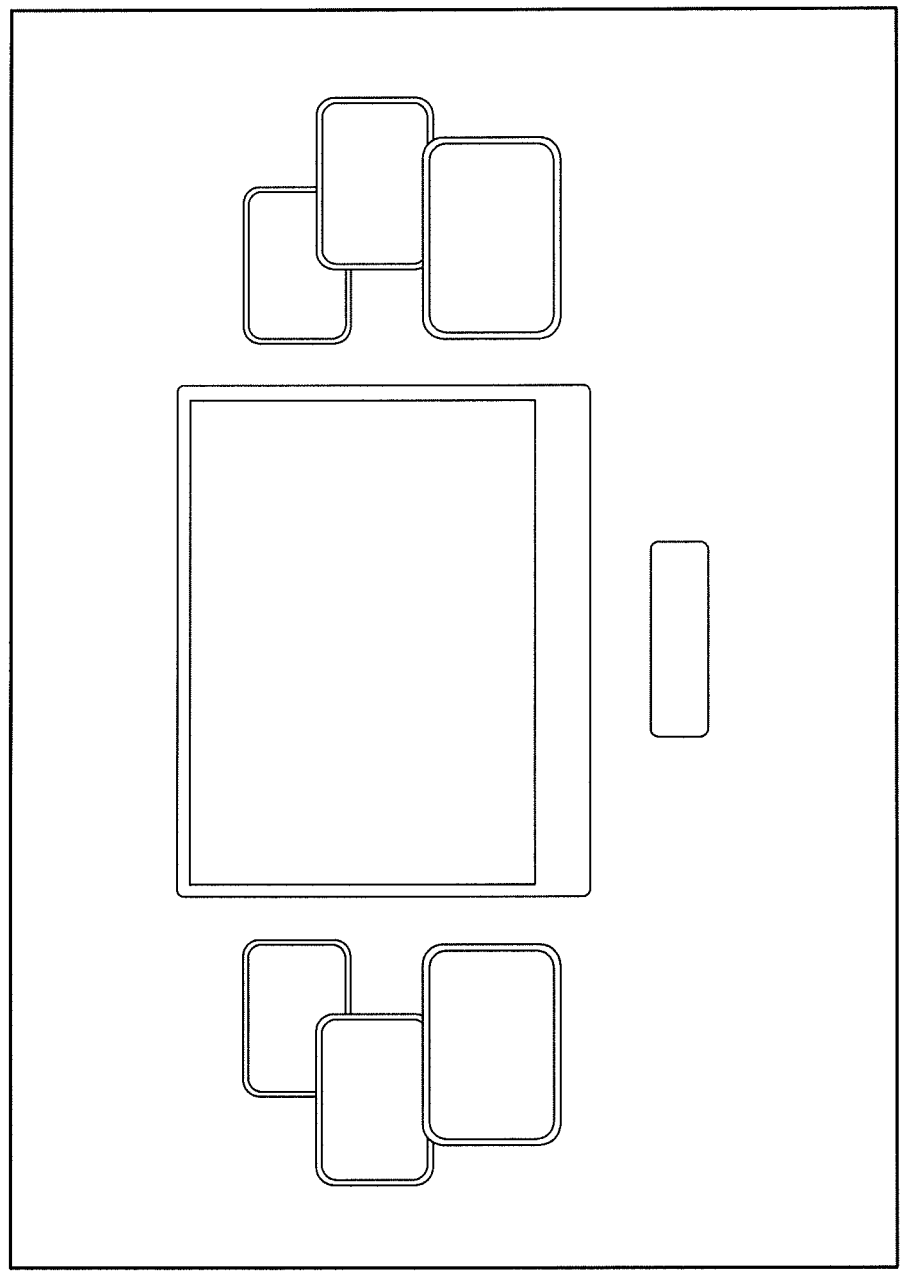
Figure 1C:
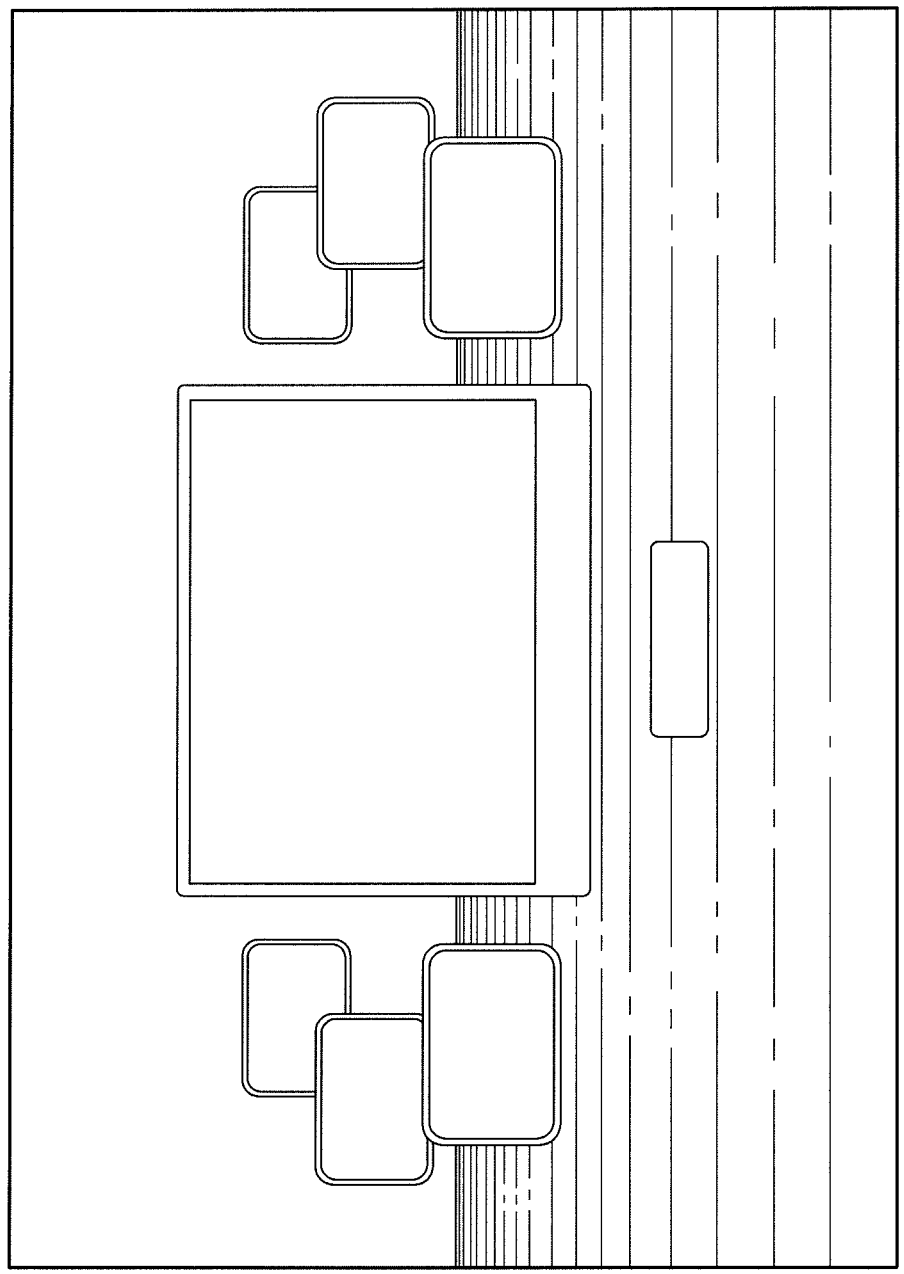
Figure 1D:
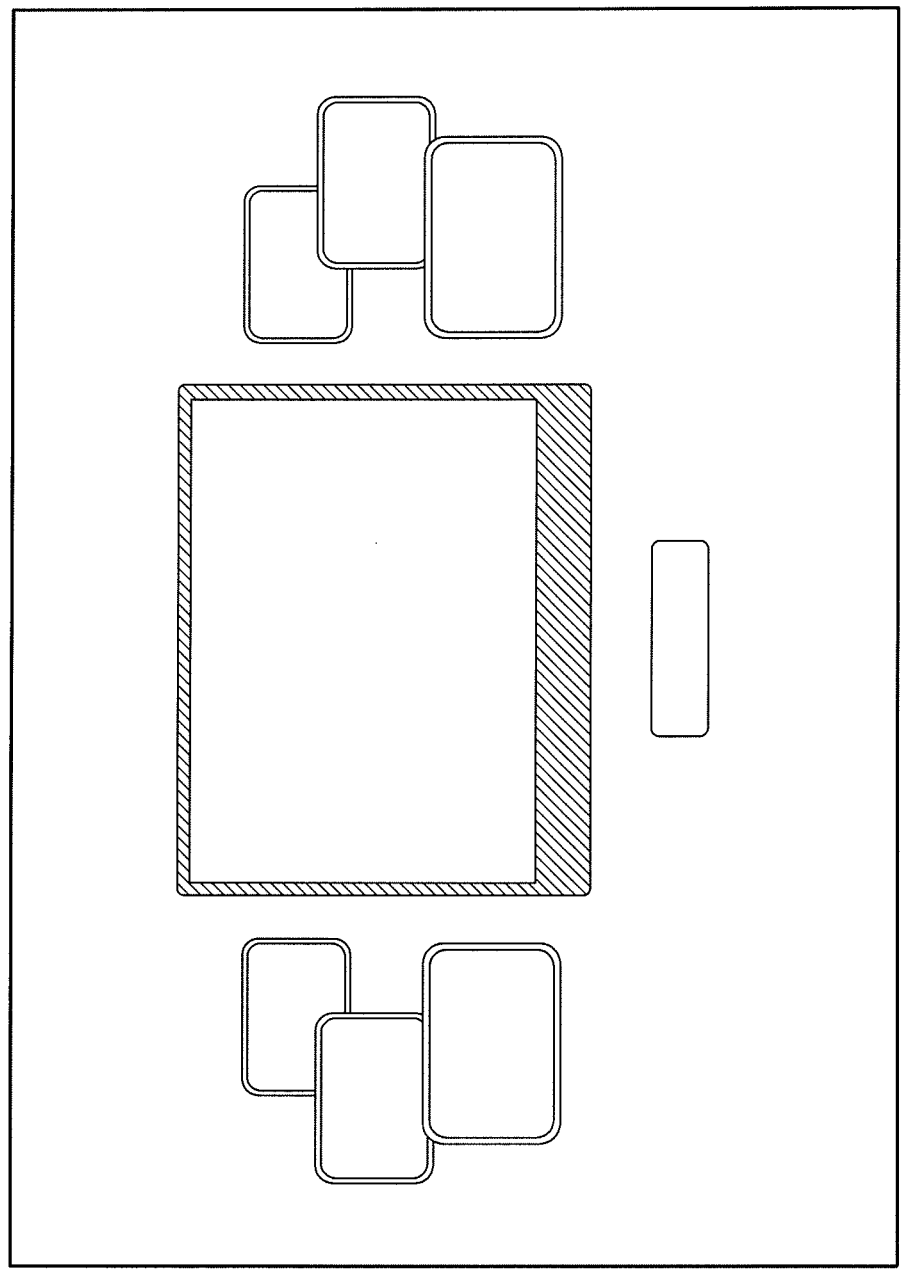

A third format that may be provided by example embodiments of the present invention is a VOD product presentation. This portion of example embodiments may include multiple presentations to choose from, preferably organized into categories (e.g., "home and garden," "jewelry," "apparel," etc.). Any number of subcategories may also be used in this section. The VOD section may include live feeds, similar to the "live" section, may include stored video, or may be a combination of the two. The stored video may include previously aired "live" segments of products still available for purchase, and may include segments only available in the VOD section (e.g., not previously aired in the "live" section). FIG. 1 illustrates one possible layout for a "home screen" of a user interface. On this screen the three product presentation formats are displayed for selection by the user. FIGS. IB to ID illustrate other example layouts for the "home screen" of the user interface.

Figure 2:
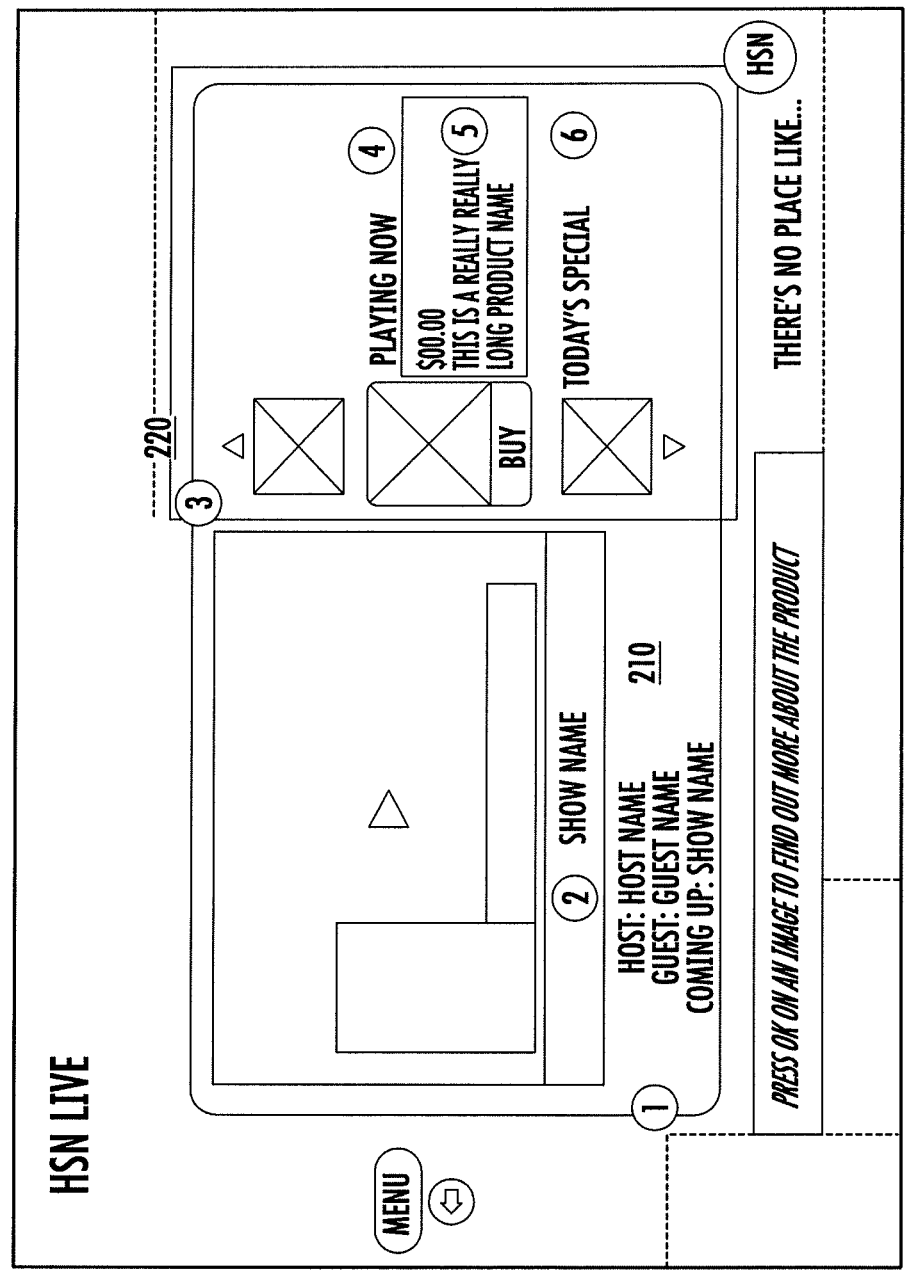
Figure 2B:
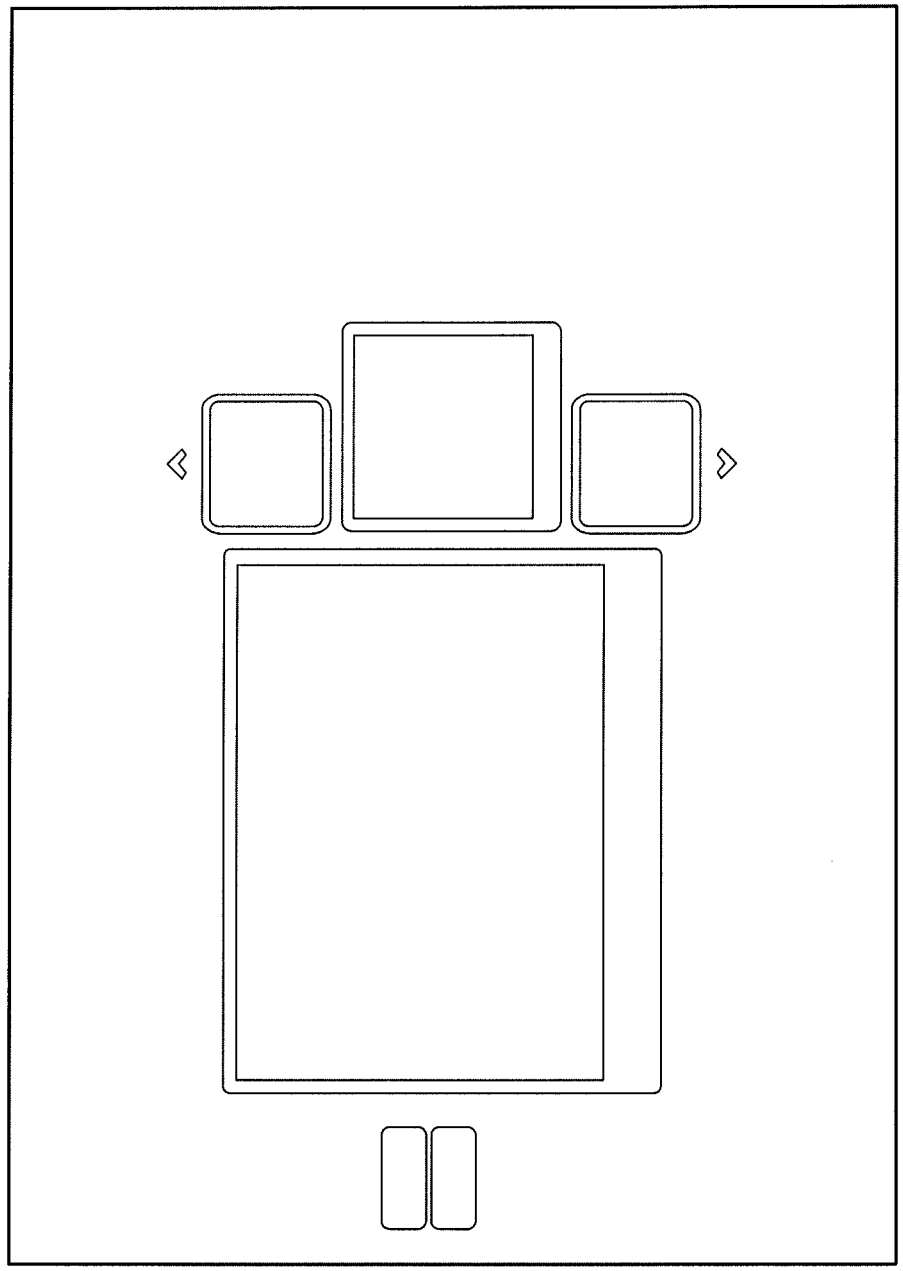
Figure 2C:
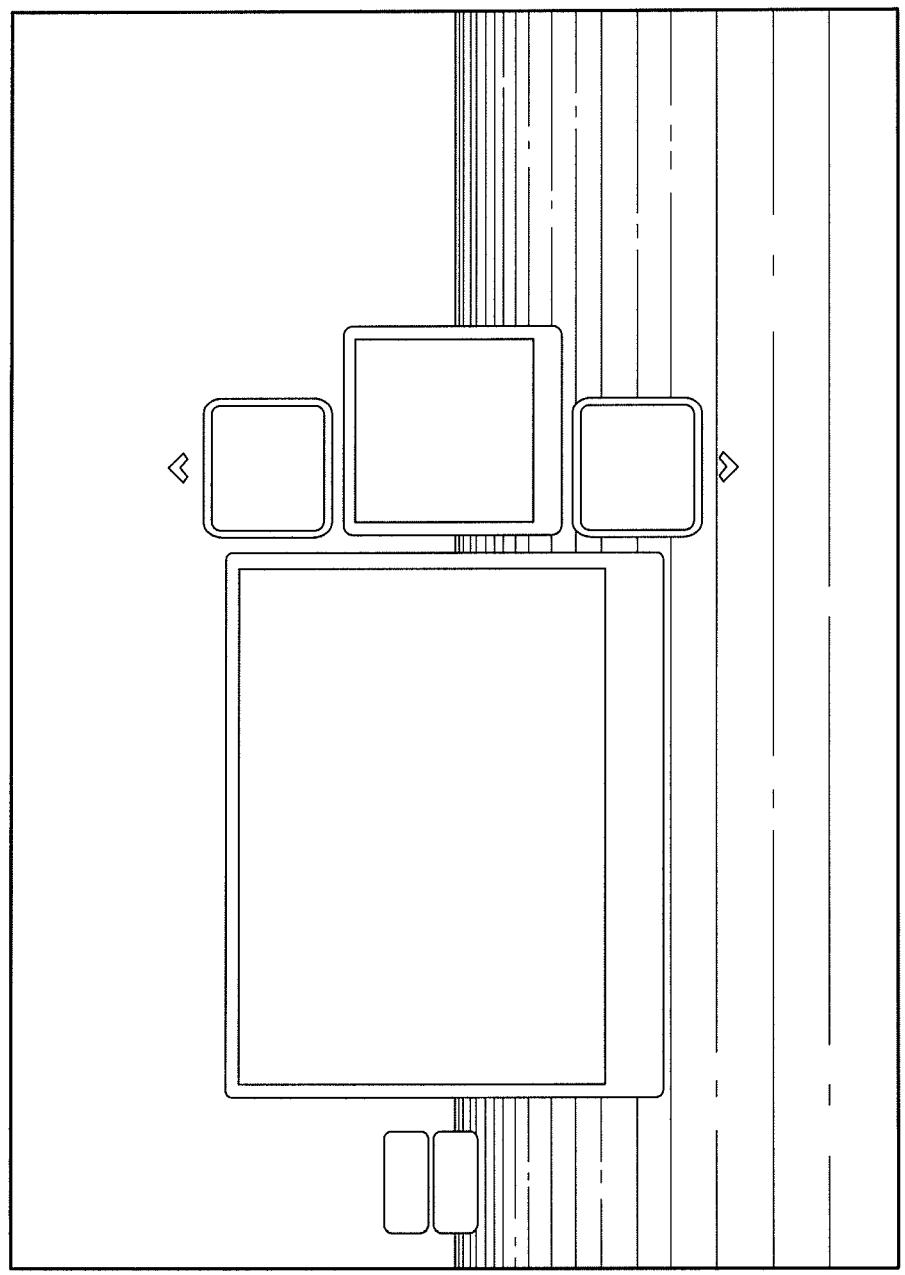
Figure 2D:
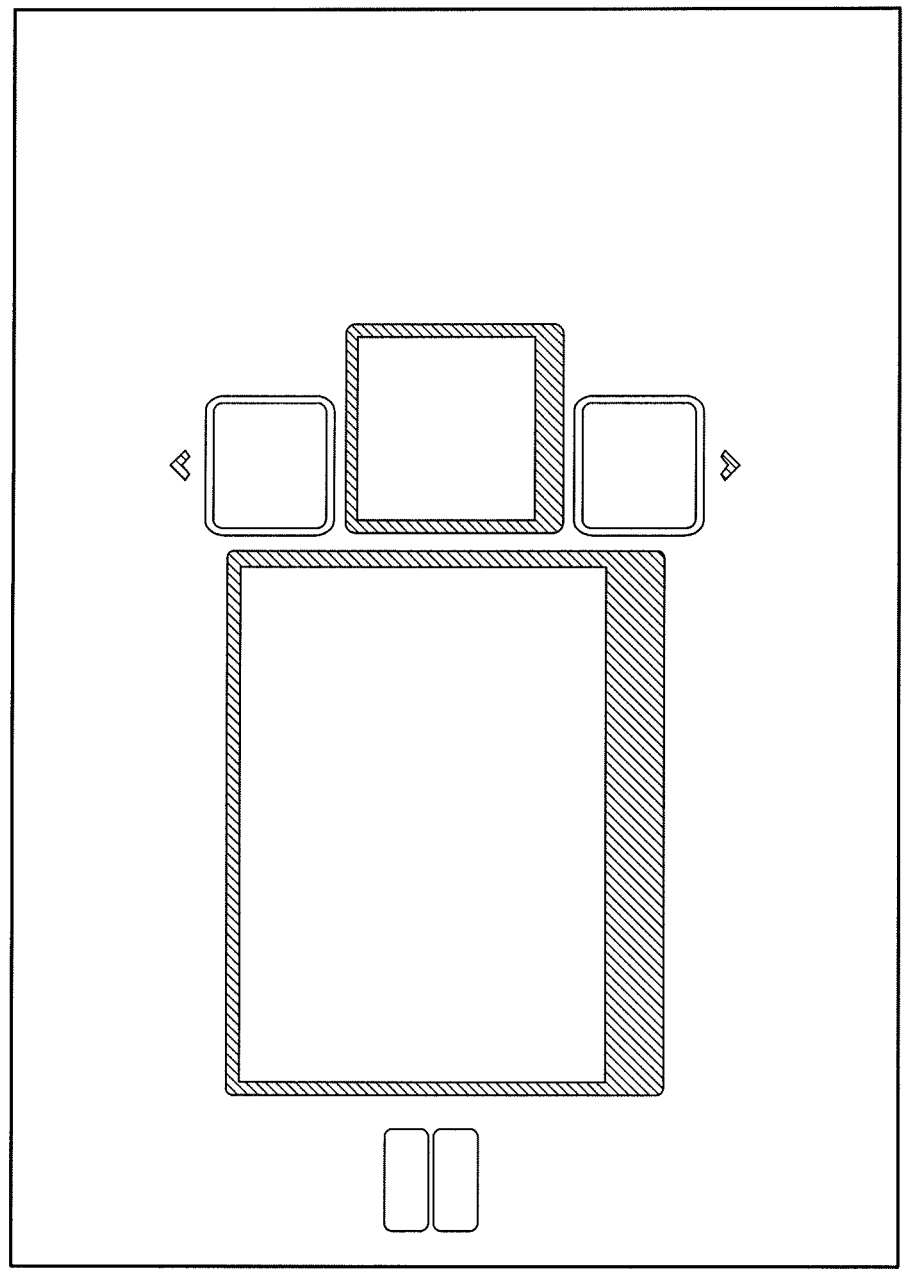

FIGS. 2 to 2D illustrate example embodiments of a "home" page for the "live" feed portion of example user interfaces. As illustrated, this screen may include information about the current show/host/guest, next (e.g., "coming up") show/host/guest, or any other relevant information (e.g., 210). Information about the current product, along with a "buy" option, may be provided to the user (e.g., 220). Previous products and up-coming products may also be presented adjacent to the current product. The user may be able to scroll through these products to preview and/or buy them. However, the user cannot advance the "live" video to future segments/products, because they are in the "live" section. However, the user may be allowed to "rewind" or replay previous segments, or pause the current feed. This would be a "live' VVOD hybrid function similar to digital video recording technology provided for pausing live television. Alternatively, the user may be given no option to pause/replay, and would need to access the prior videos in the VOD section, once available. Regardless of the replaying function in the "live" section, a user may be allowed to preview and purchase prior or future items (e.g., as illustrated in the dashed-line box 220). Alternatively, this feature may not be provided, and a user may be limited to purchasing the active item only, and only while that item is active. This embodiment may be advantageous by encouraging the user to purchase a desired item, instead of procrastinating and then forgetting to purchase the desired item.

Figure 3:
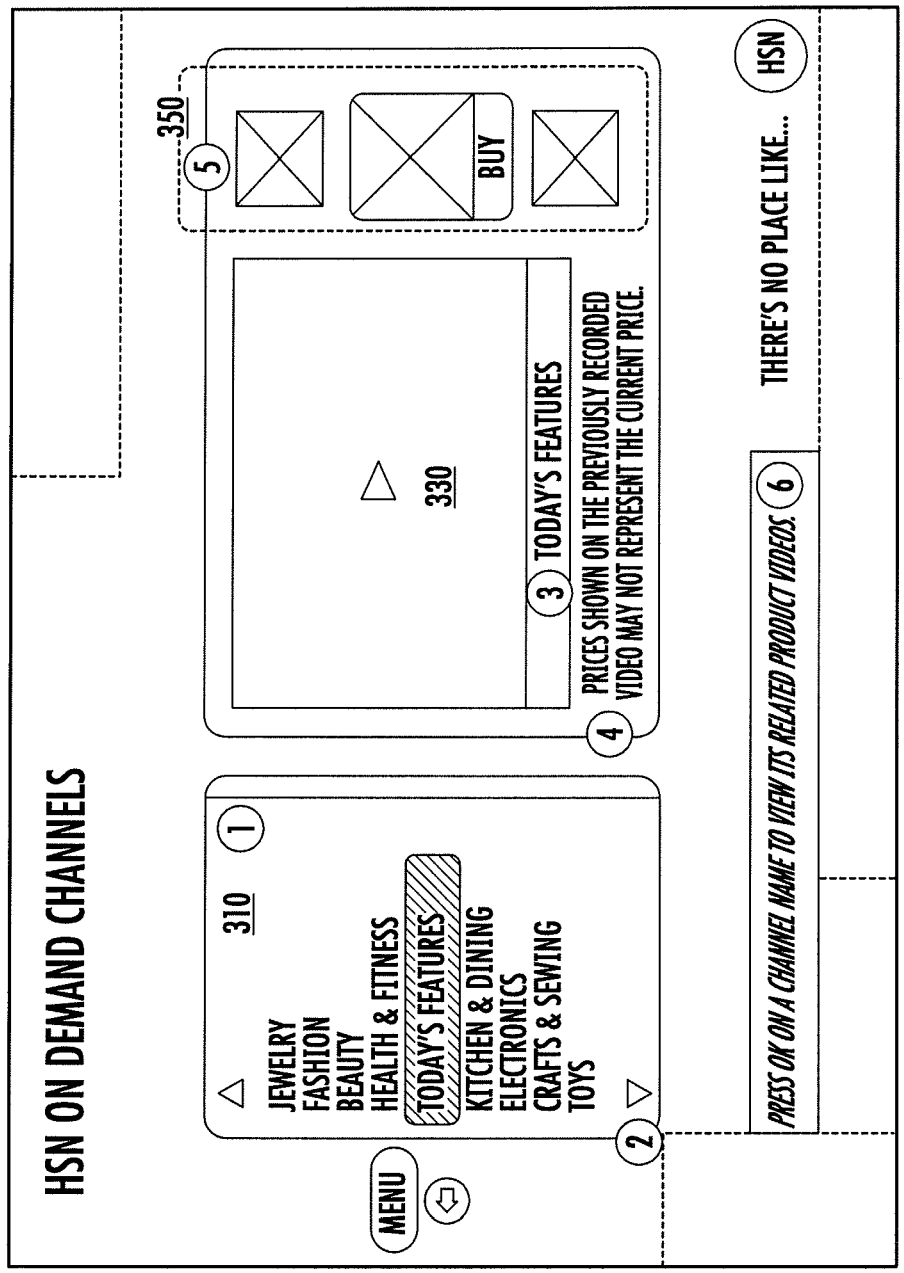
Figure 3B:
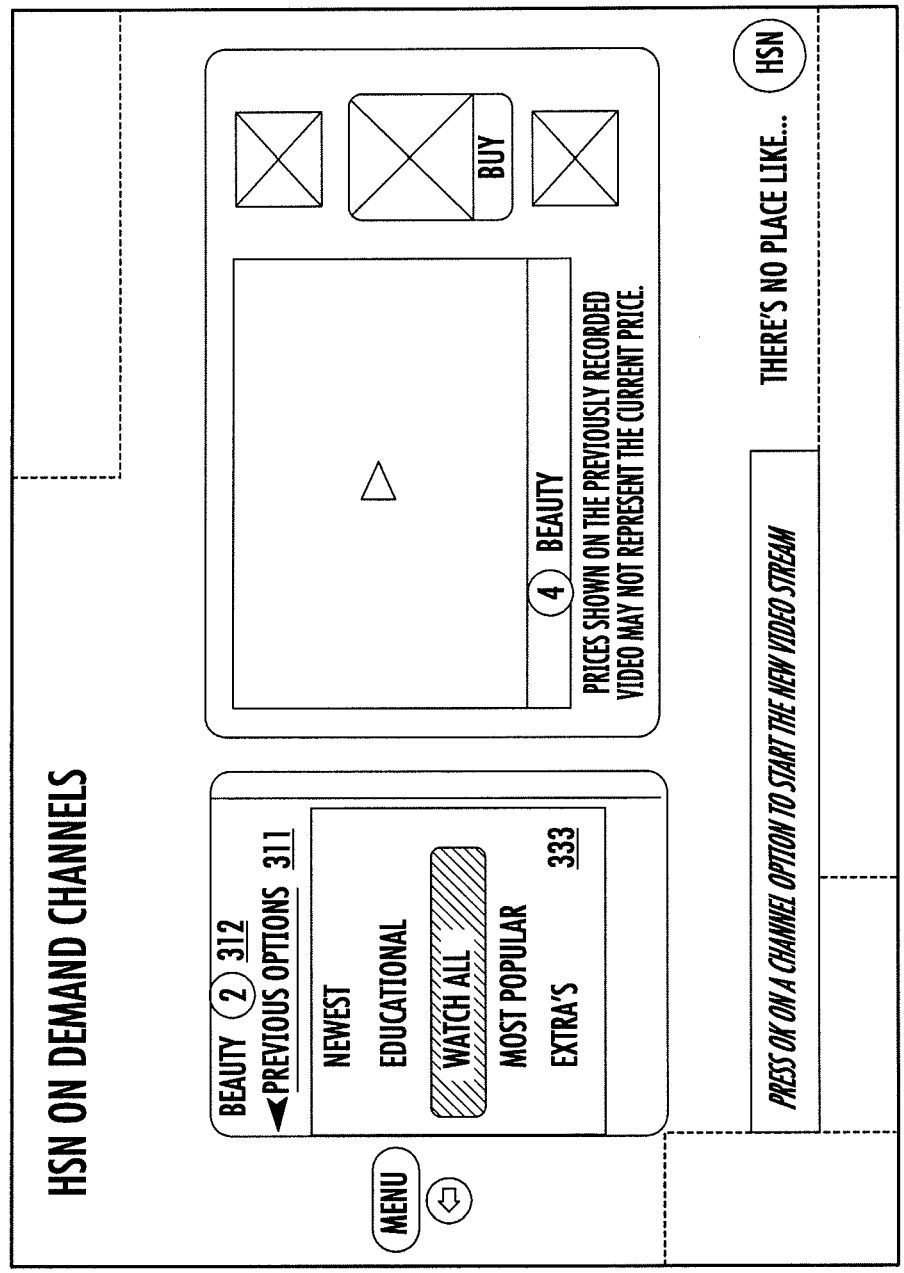
Figure 3C:
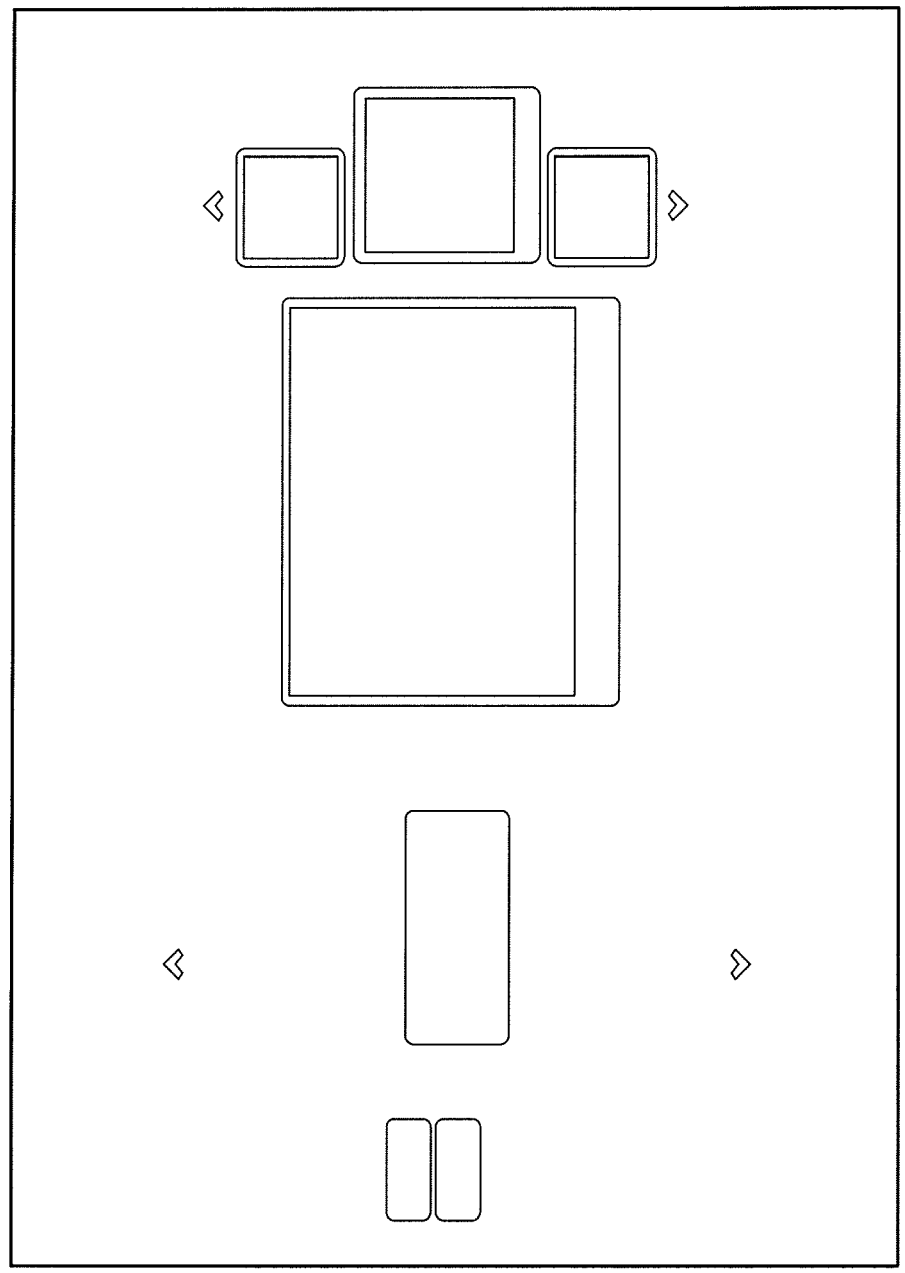
Figure 3D:
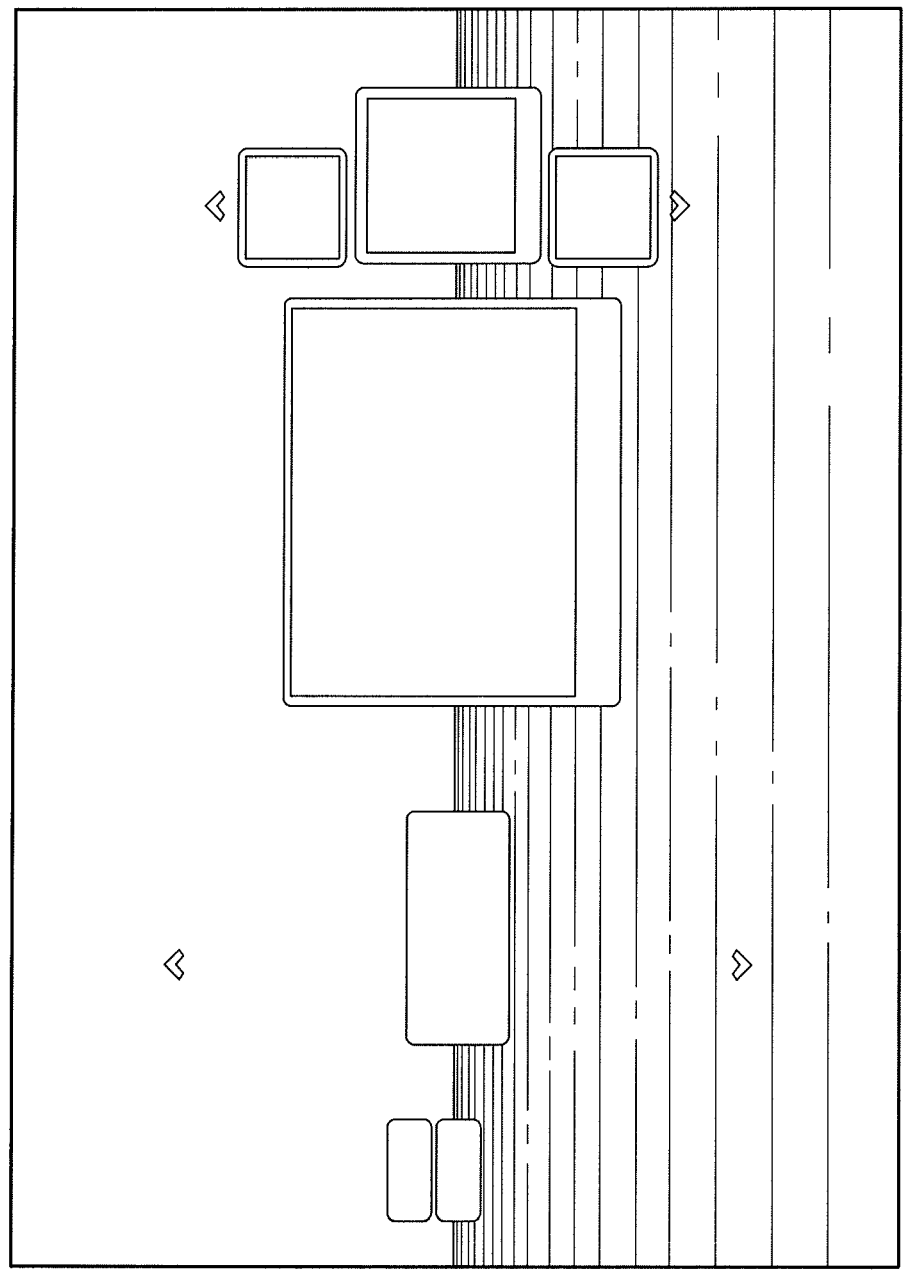

FIGS. 3 to 3D illustrate example embodiments of the user interface for the VOD portion of the present invention. Here, as illustrated in FIG. 3, after the user has selected the VOD option, the user is presented with various options. Section 310 shows a scroll list of various categories the user may select from. "Today's Features" is shown highlighted because this category is playing in the video portion of the interface (e.g., 330). A category (e.g., "Today's Features") may be set as the default, and automatically load upon entering the VOD section (e.g., FIG. 3). Any other default is possible, including the live program, advertisements, or any of the other available categories. Additionally, default play may be based on a user's purchase history, view history, or stated/derived preferences. For example, the default video may be the product within a selected category that the most people bought, of the people who bought items similar to those the current user bought. Dashed-line box 350 of this example interface shows three item boxes. The box in the middle of 350 may include the item that is currently being displayed in the video portion of the interface (e.g., 330). As is illustrated, the item may include a "buy" option for the user to purchase the item currently being presented. The other boxes of 5 350, of which two are illustrated but any number is possible, may illustrate the items that are presented in the video before and/or after the current item. Selecting these buttons may restart the video at the beginning of the presentation for that product. Alternatively, selection of a different product may provide "preview" information and an option the user may select to restart the video at that item. This later embodiment allows a user to watch a presentation of interest, while browsing the other items available. The item boxes of 350 do not necessarily need to correlate with the video feed schedule. Regardless of which product presentation is currently playing, previously played, or scheduled to play, the selectable items of box 350 may be associated with any products within the previously selected category. Alternatively, the items may be product suggestions related to the currently viewed product and the suggestions may be from the same category or a different category. Example embodiments may have both options: first providing links to the products corresponding to the video feed order, and upon user selections, may change to other relevant products.

The presentation in this section may include additional features for ease of use. For example, center-focused menus (e.g., menus where the active item is in the center) may have both scroll arrows and activate a delayed scroll when the selection pointer (e.g., mouse) is above or below the active item, but within the menu area. For example, if a user pointed to an area of 310 just below "Today's Features," after a delay, the menu may slowly begin to scroll "down" (i.e., in the direction of making "Kitchen & Dining" the active item). Further, if the user pointed to an area of 310 further down (e.g., near "Crafts & Sewing"), the menu may scroll "down" faster. The same feature, but in the opposite scroll direction, applies to the user pointing to areas above the active item. The same features may apply to 350, and any other scrollable menu of example embodiments. An additional feature may include video looping. The video currently playing may be set to restart upon completion. Alternative implementations are also possible, such as advancing to the video of the next product, or simply ending the video presentation. It is also possible to provide more category levels than those illustrated in 310. This may include additional category sections, or replacing the current category (e.g., 310) with the next category selected by the user. In the latter embodiment, "forward" and "back" buttons may be provided to navigate the hierarchy of categories. An example of this may include: Live programs or Prerecorded programs. Each of those may then be followed by categories 310 that apply to the respective "parent" category. Each of these categories (e.g., "Jewelry") may also be divided into sub-categories (e.g., gold, silver, diamonds, etc.).

FIG. 3B illustrates an example user interface after a category has been selected (e.g., 312 "Beauty"). 311 illustrates an example of the previously mentioned "back" navigation option, which may be used to return to the list of categories (e.g., 310). Here, in 333 of FIG. 3B, various sets of videos are presented for selection. The example interface may default to a "watch all" set, which may include all of the videos in that category. "Most popular," "newest," "best selling," or any number of other attribute sets could be constructed. Also, the video area may play something else, such as an advertisement. Additionally, the default setting may not be "universal," but rather specific to each user. In this way, the default channel may be the channel most often selected by that user, the channel of products most often purchased by that user, or the channel matching preferences set by the user. Likewise, user preferences or activity history may be used to set defaults in any other portion of the example embodiments.

In addition to videos designed to present the product for purchase, there may be videos in the "Educational" section designed to teach the purchaser how to best use the product. Here, product demonstrations, tips, and how-to videos may be available for any number of products in 20 this general category. An advantageous user feature is to have the selected category "Beauty" move (e.g., via animation) from its original position (e.g., the middle of 310) to 311. This may help the user associate the "back" navigation button with its function.

Figure 21:
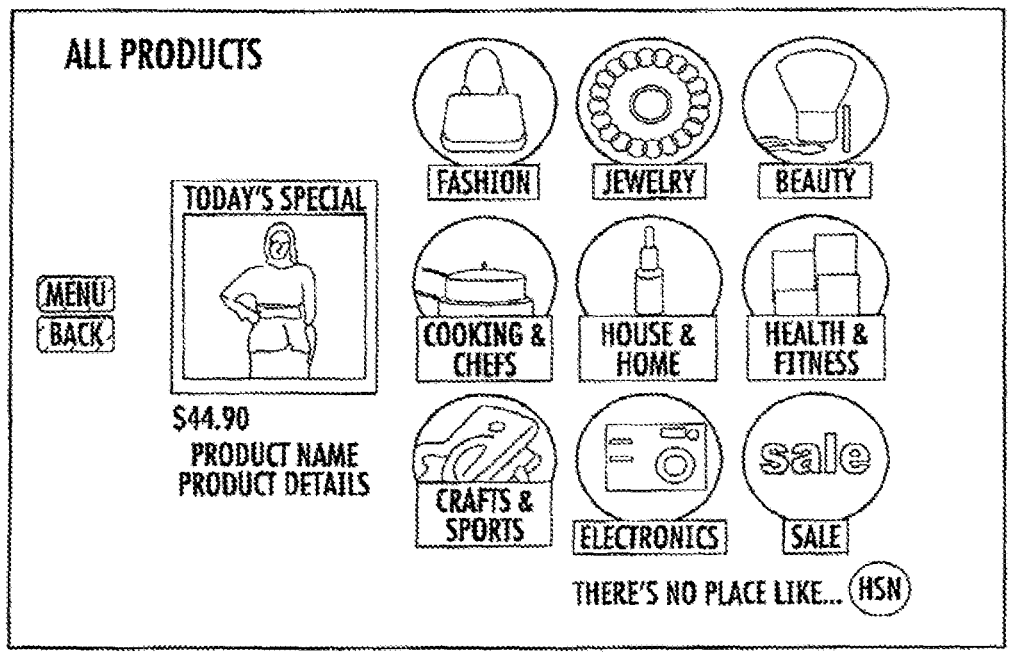
Figure 22:
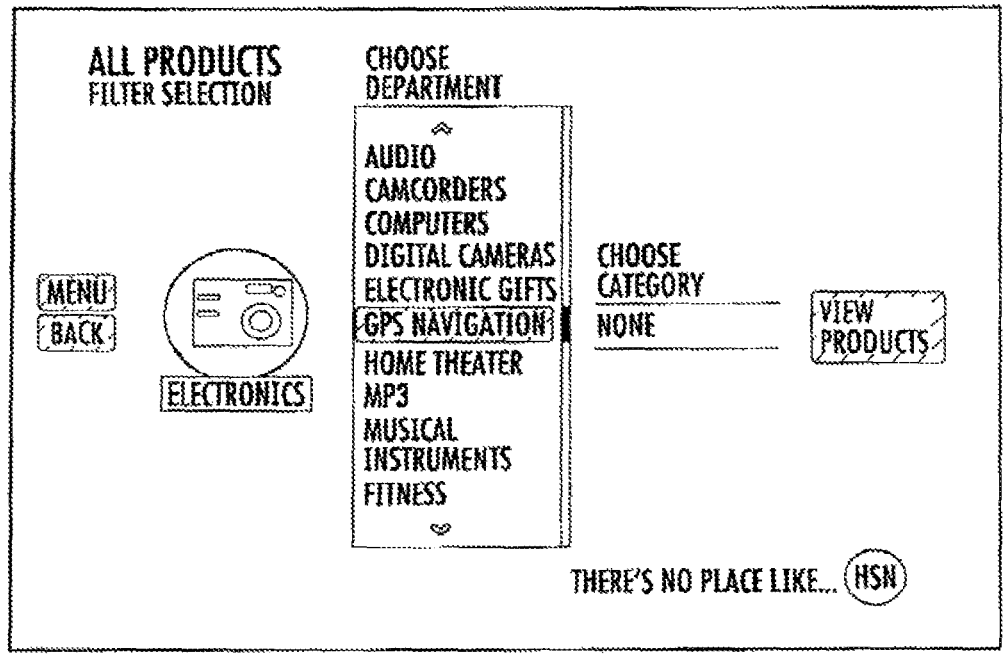
Figure 22B:
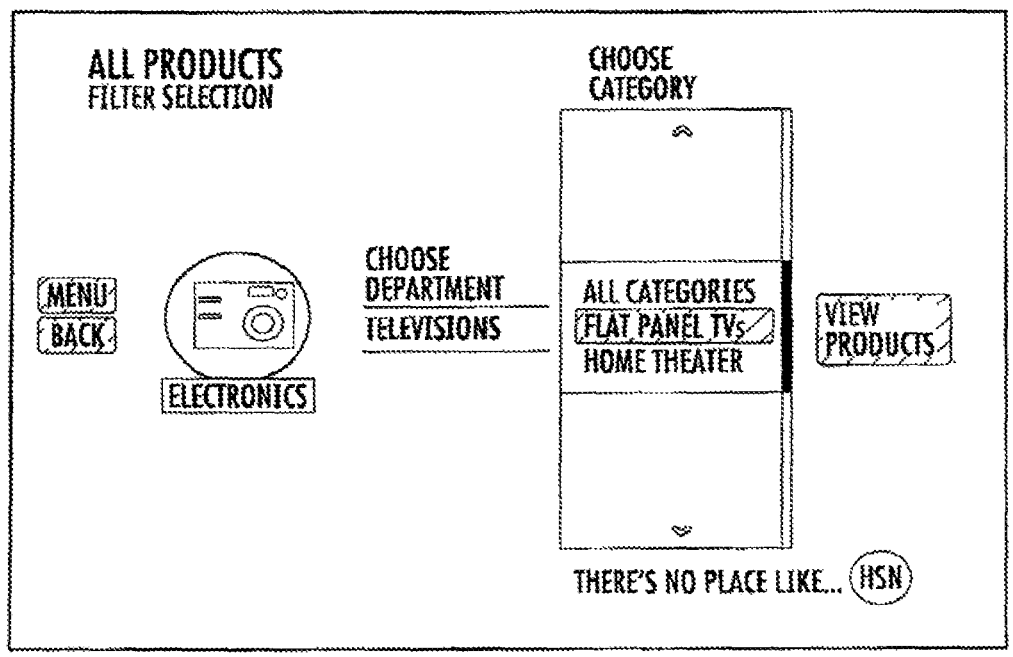
Figure 23:
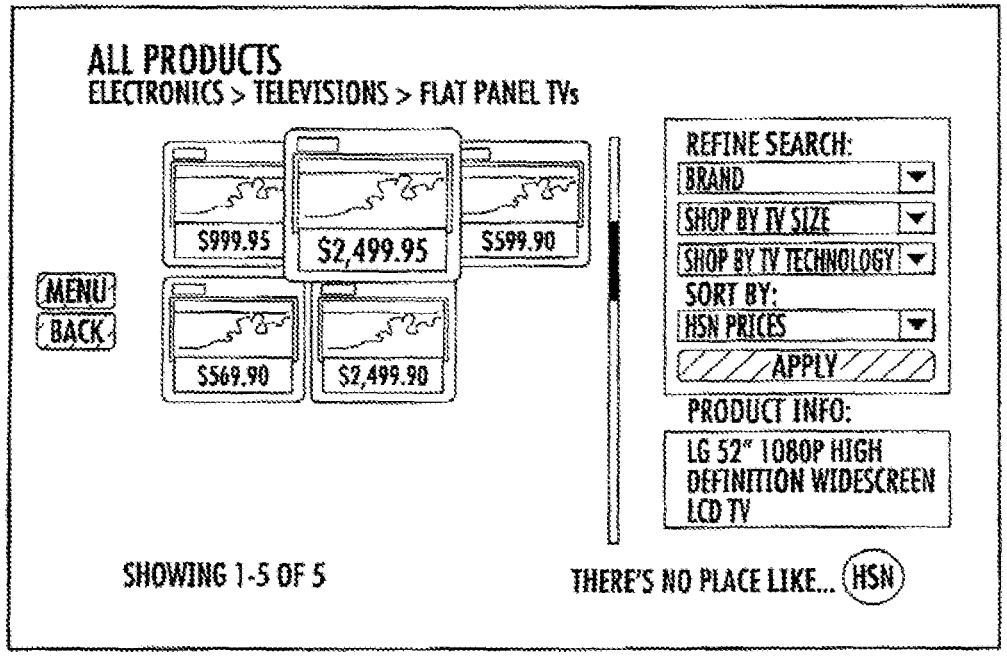
Figure 24:
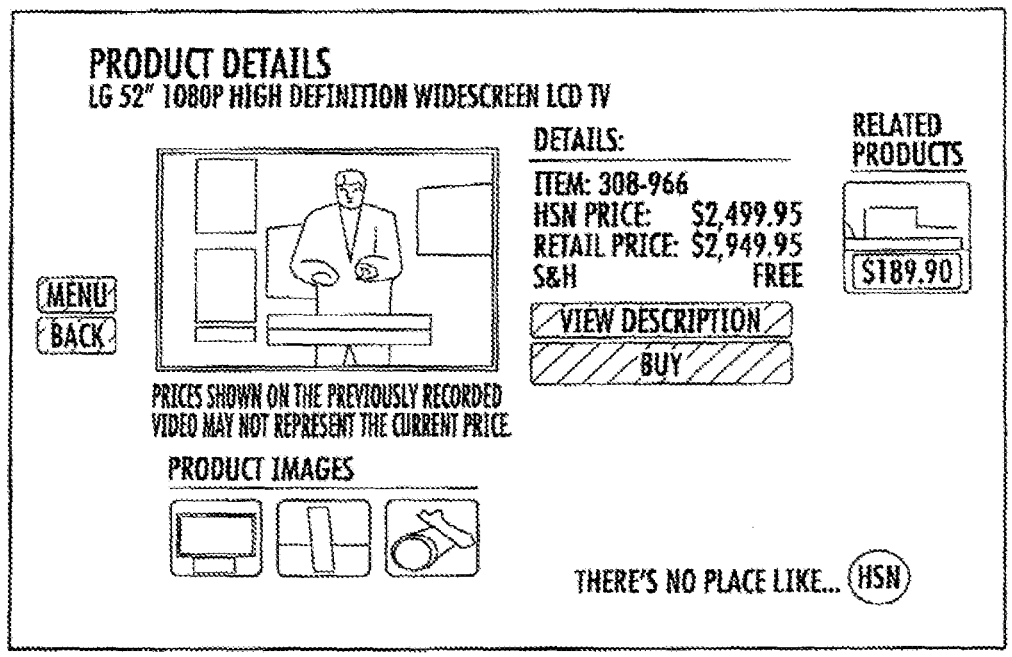
Figure 25:
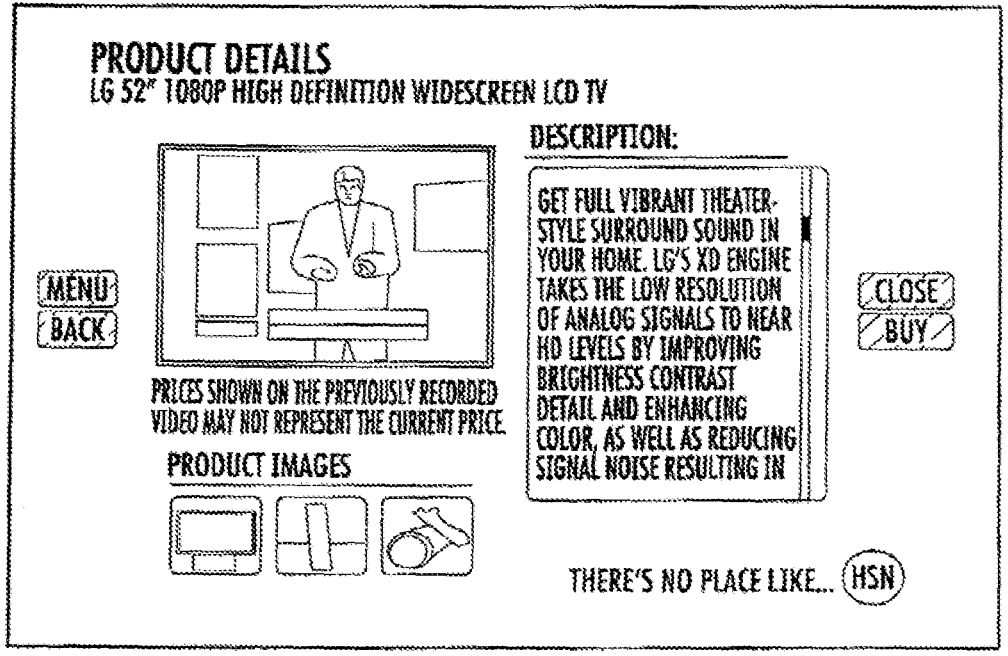
Figure 26:
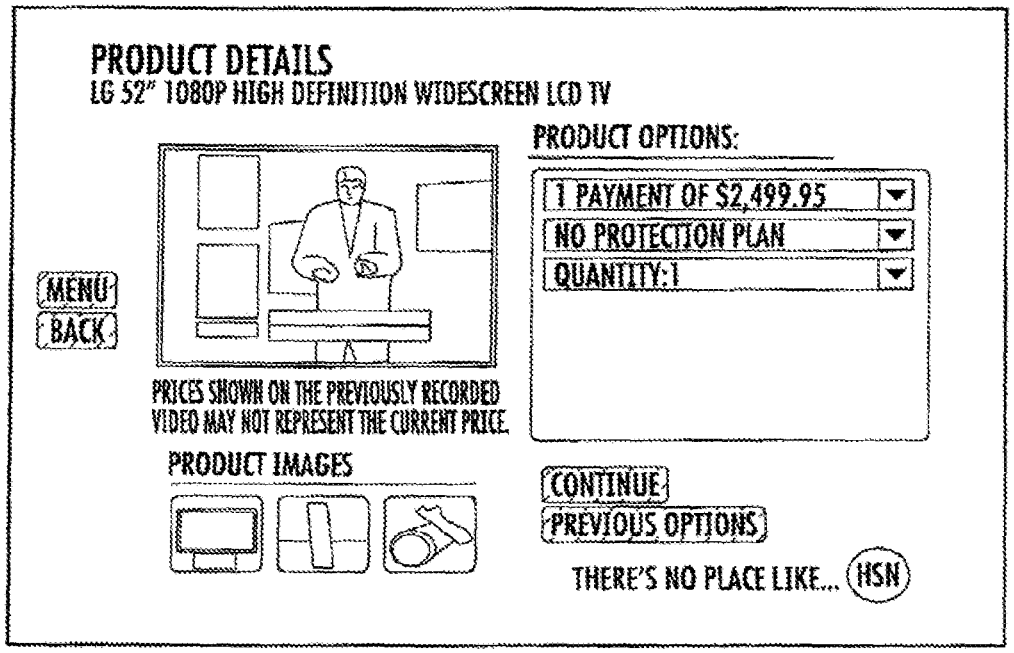
Figure 27:
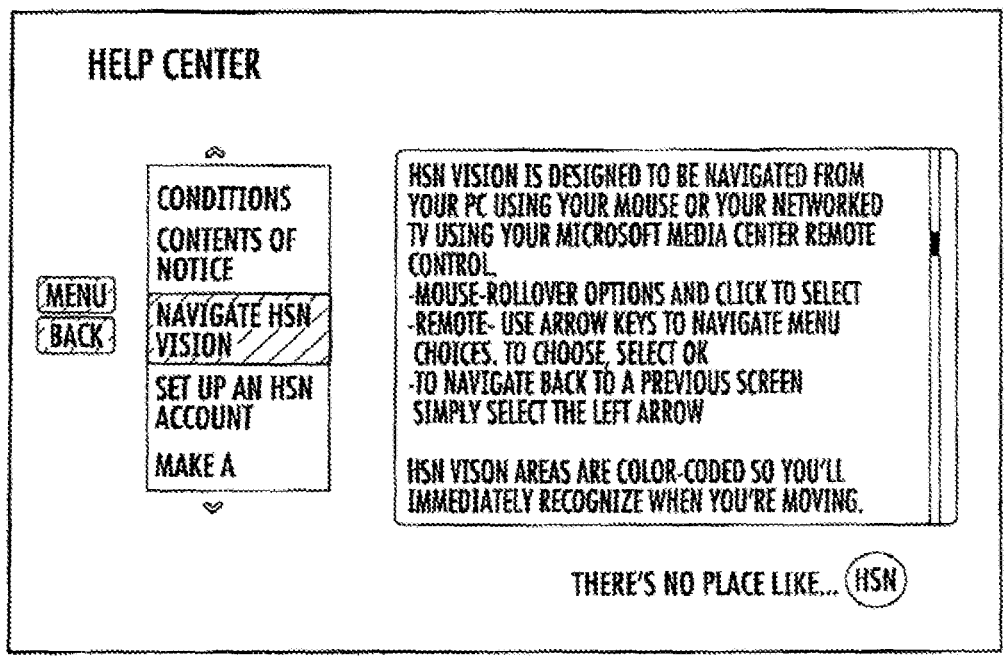

Once video play begins, the currently presented product may be highlighted (e.g., center-focused, illuminated, enlarged, etc.) with a "buy" option. Previous and future products of the current stream may be shown adjacent to the highlighted product. Along with the "buy" option, information may be presented along with the product, such as current price. One example embodiment of the "highlighting" may include a gradient back-lighting. For example, the featured item (e.g., icon link) may have a background graphic consisting of a color gradient centered behind the featured item (e.g., icon link) and consistent with the color scheme of the current user interface (e.g., as illustrated in FIG. 21). This highlighting, along with the other example embodiments of this feature, may apply to any aspect of an example embodiment where user selection is available (e.g., the category list, the product catalog, the video list, etc.).

Figure 3E:
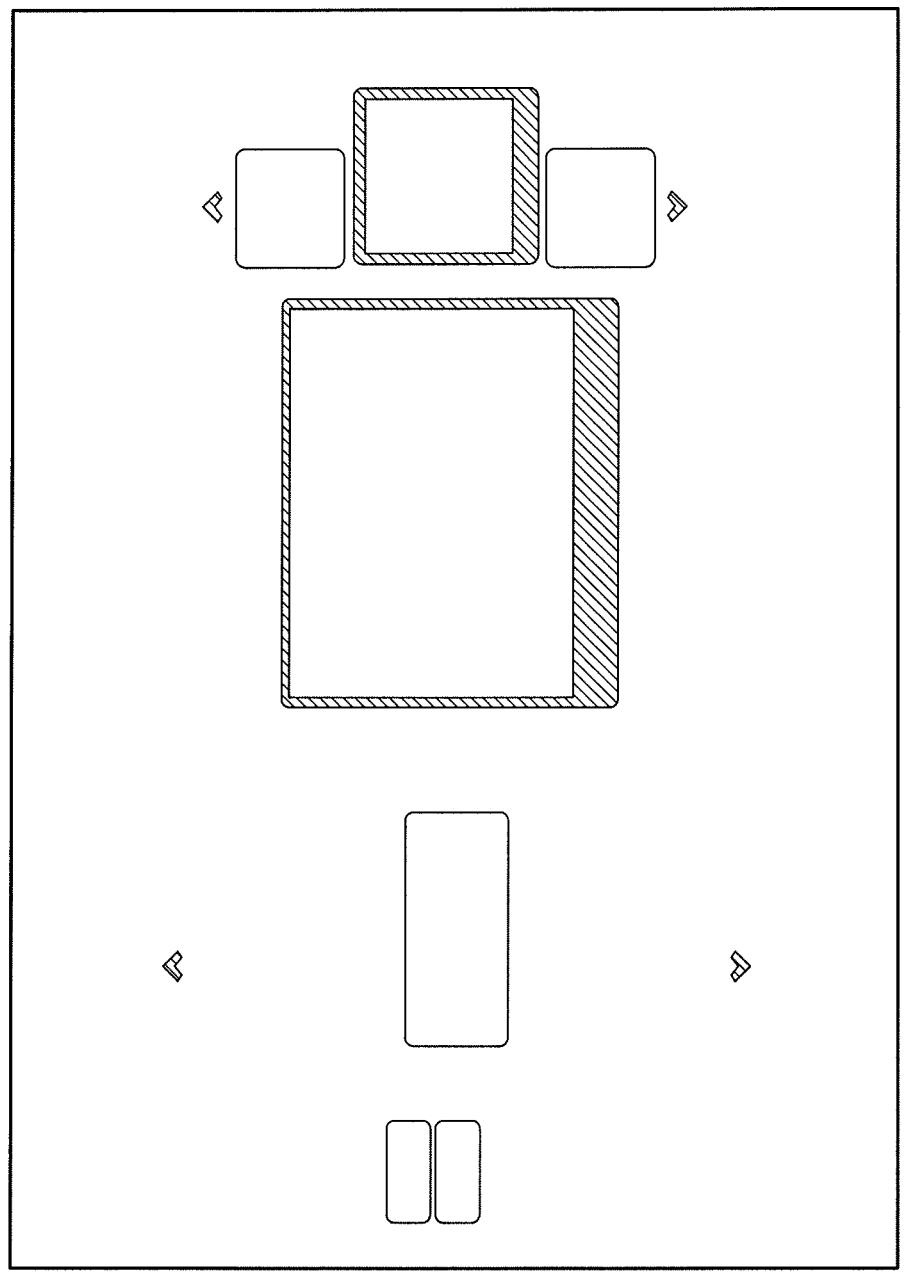

It may be noted, that when a program is originally aired (e.g., on a television station), a graphic is often displayed with certain time sensitive information (e.g., price, quantity, etc.). There are a number of ways to address this when replaying the video later. One way is to present a disclaimer/warning: "Prices shown on the previously recorded video may not represent the current price." Alternatively, advantageous methods may include: routing the original feed to the VOD recorder prior to that feed passing through the graphics device, or otherwise storing the video without the time sensitive information displayed. Alternatively or additionally, example embodiments may "overlay" a new graphic is the spot of the old graphic, with updated information. This may be done to conceal the old information, or to enhance the video stored without the old information. The overlay may be performed at the users machine (e.g., the computer), or may be performed at the VOD server prior to or during the streaming. A VOD server may be one or more servers optimized for streaming video, or may be a general purpose computer capable of streaming video segments as described herein. The VOD server may use a file storage structure with meta-data, may use a database storage system (e.g., a series of vlobs), or any other multi-media storage and streaming configuration. FIGS. 3C to 3E illustrate other example user interfaces similar to 3A and 3B.

Figure 4:
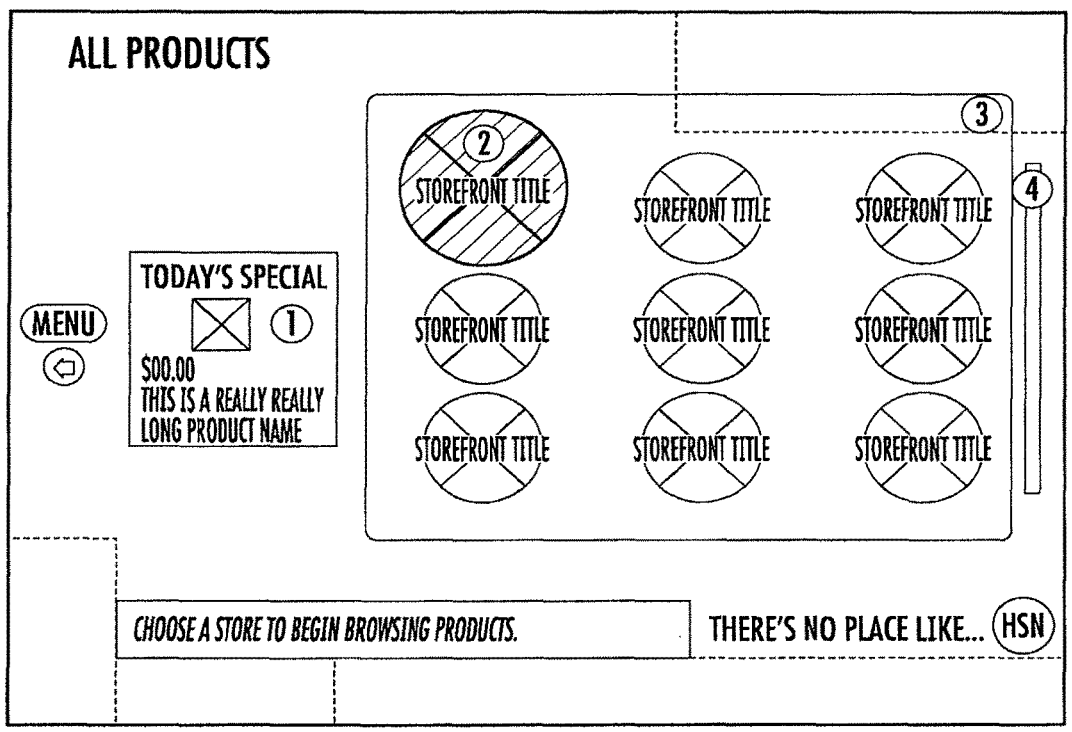
Figure 4B:
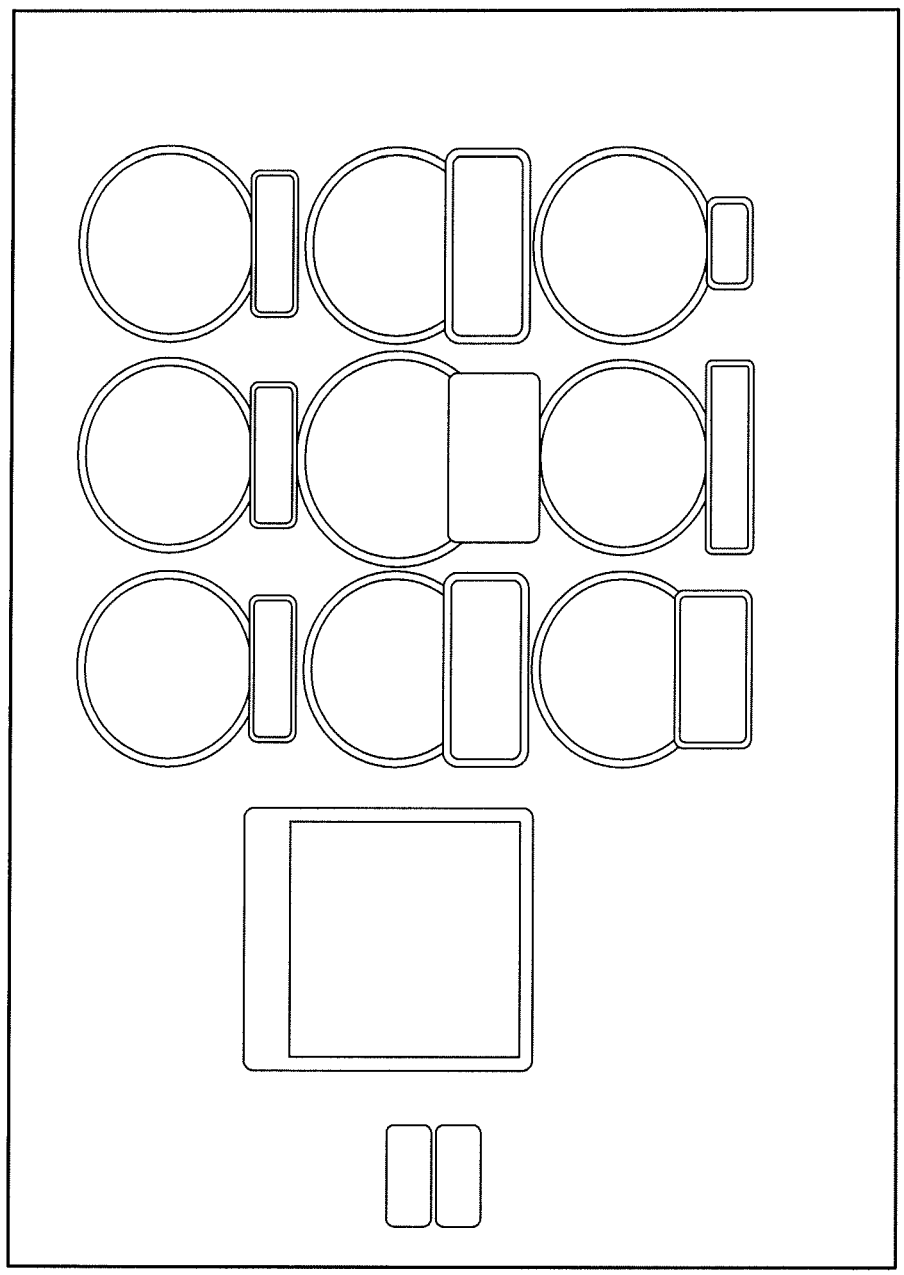
Figure 4C:
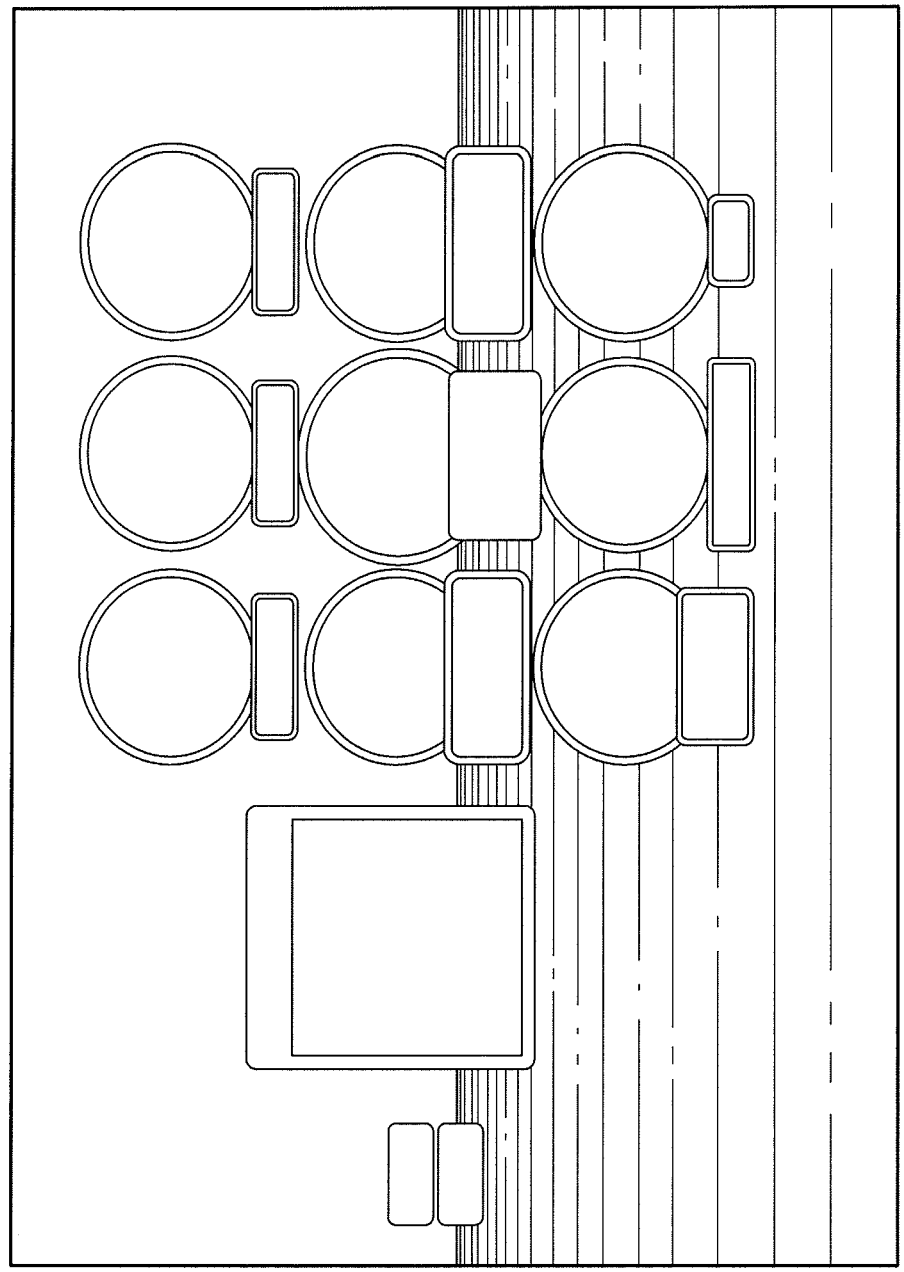
Figure 4D:
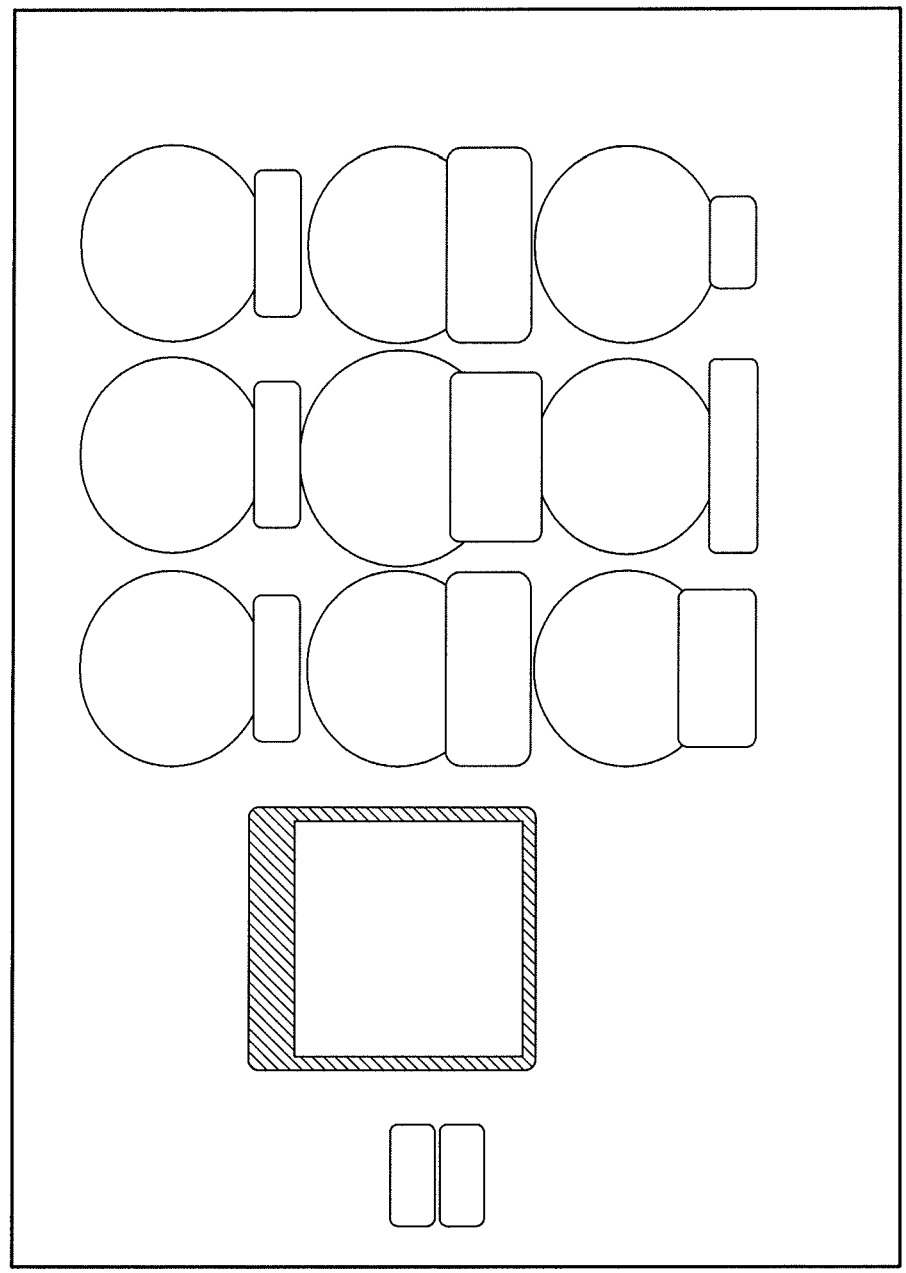
Figure 5A:
Figure 5B:
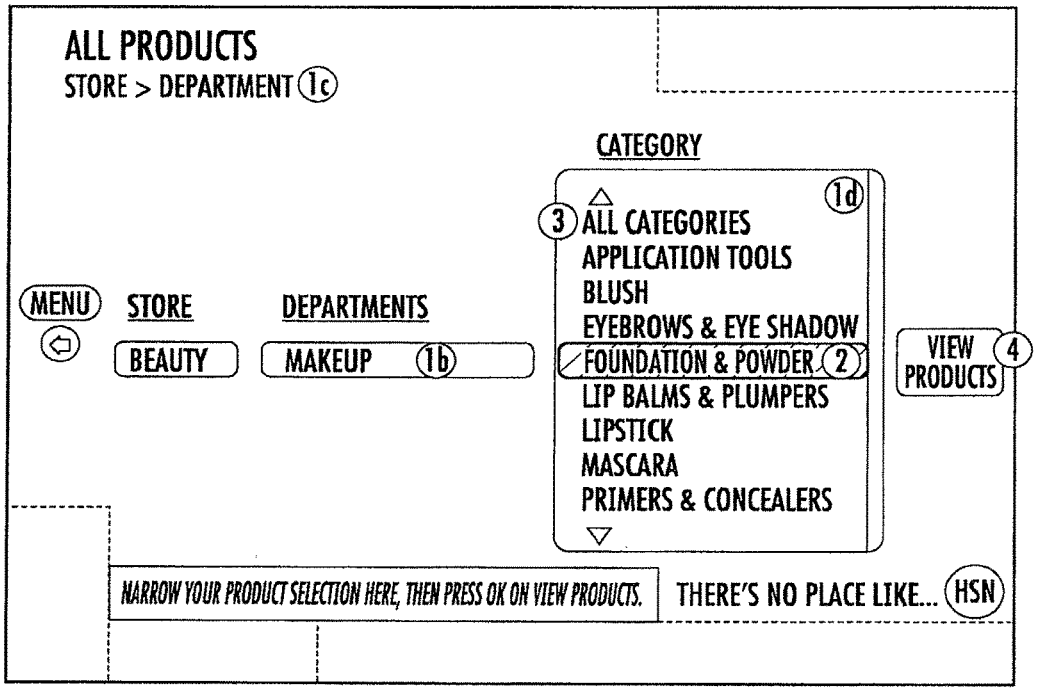
Figure 5C:
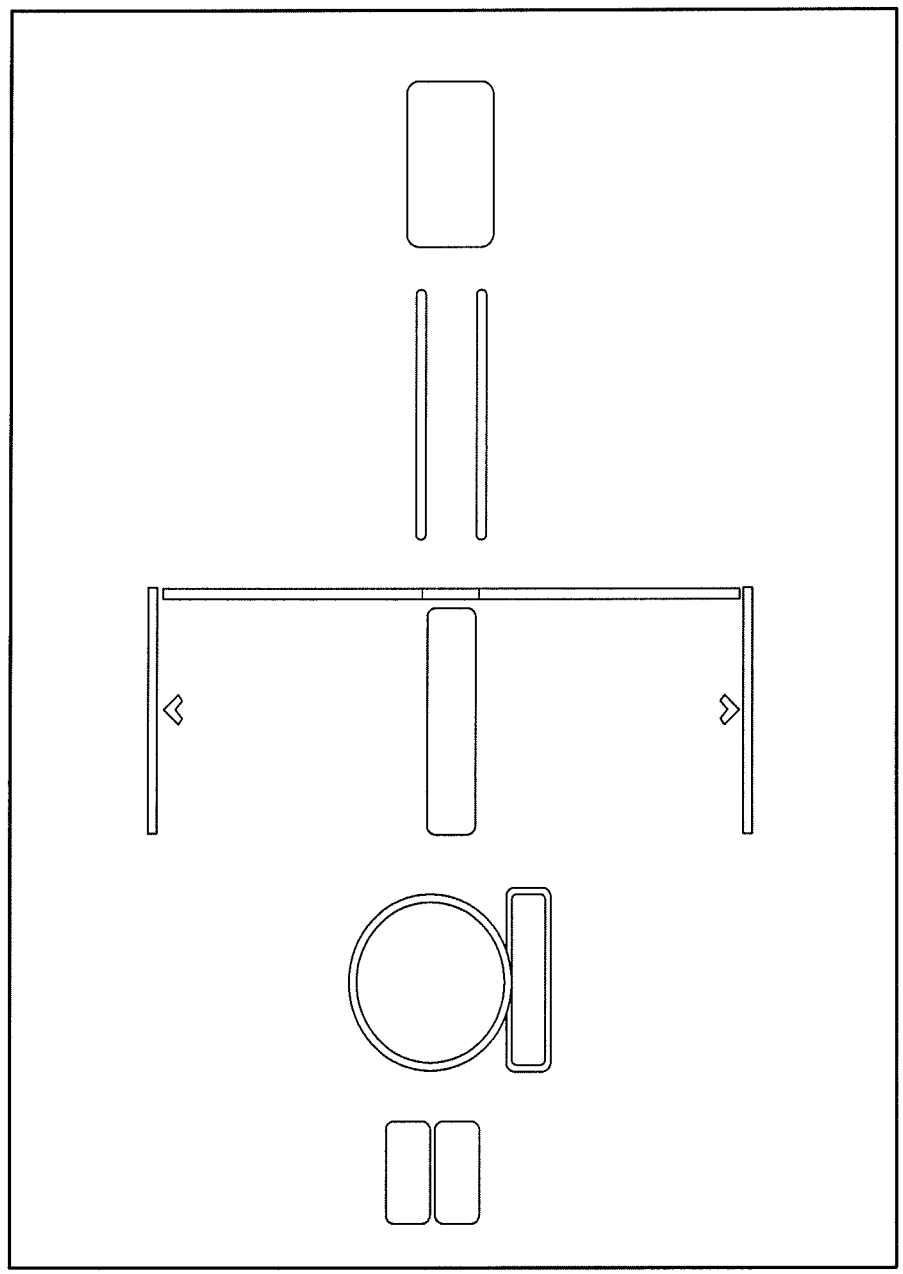
Figure 5D:
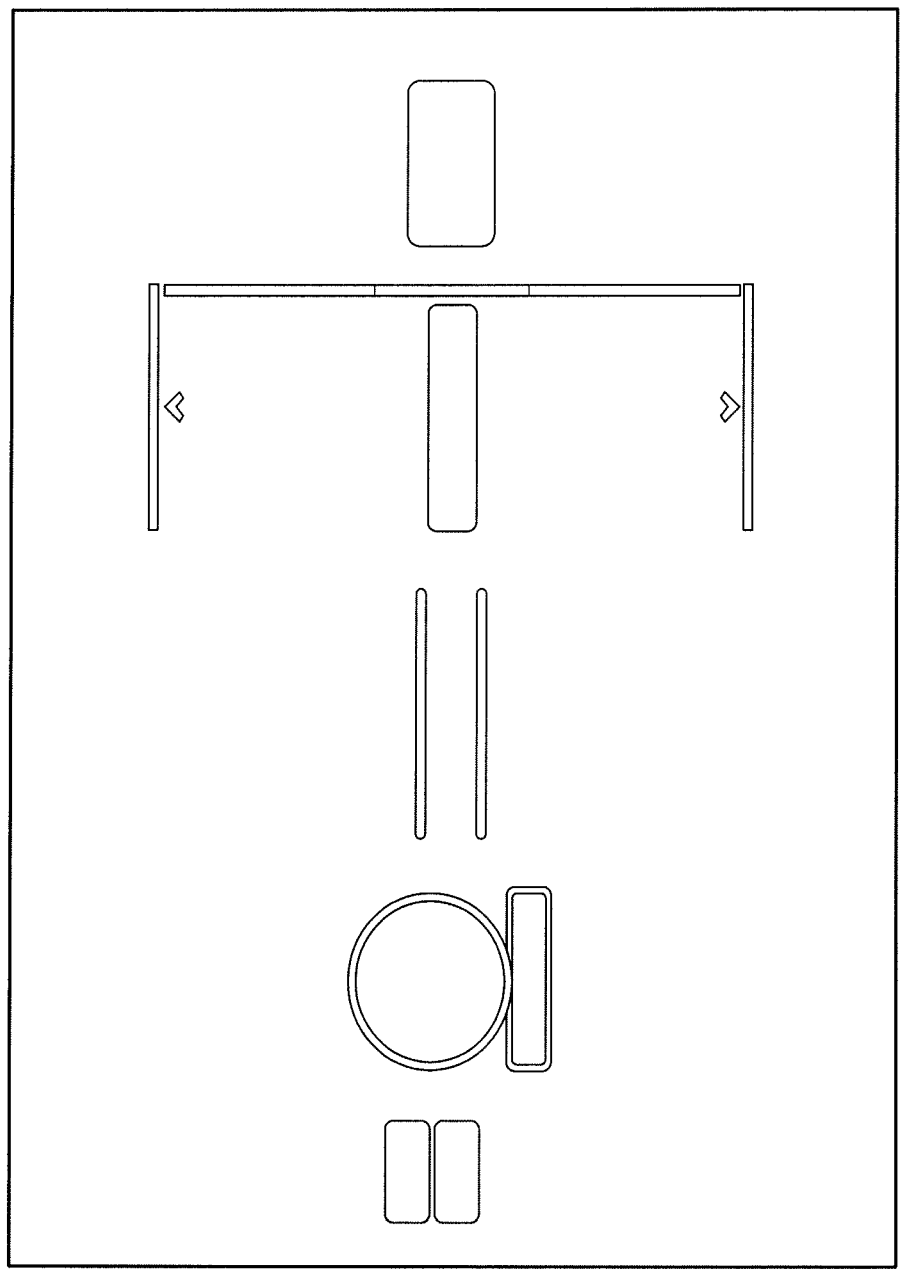
Figure 5E:
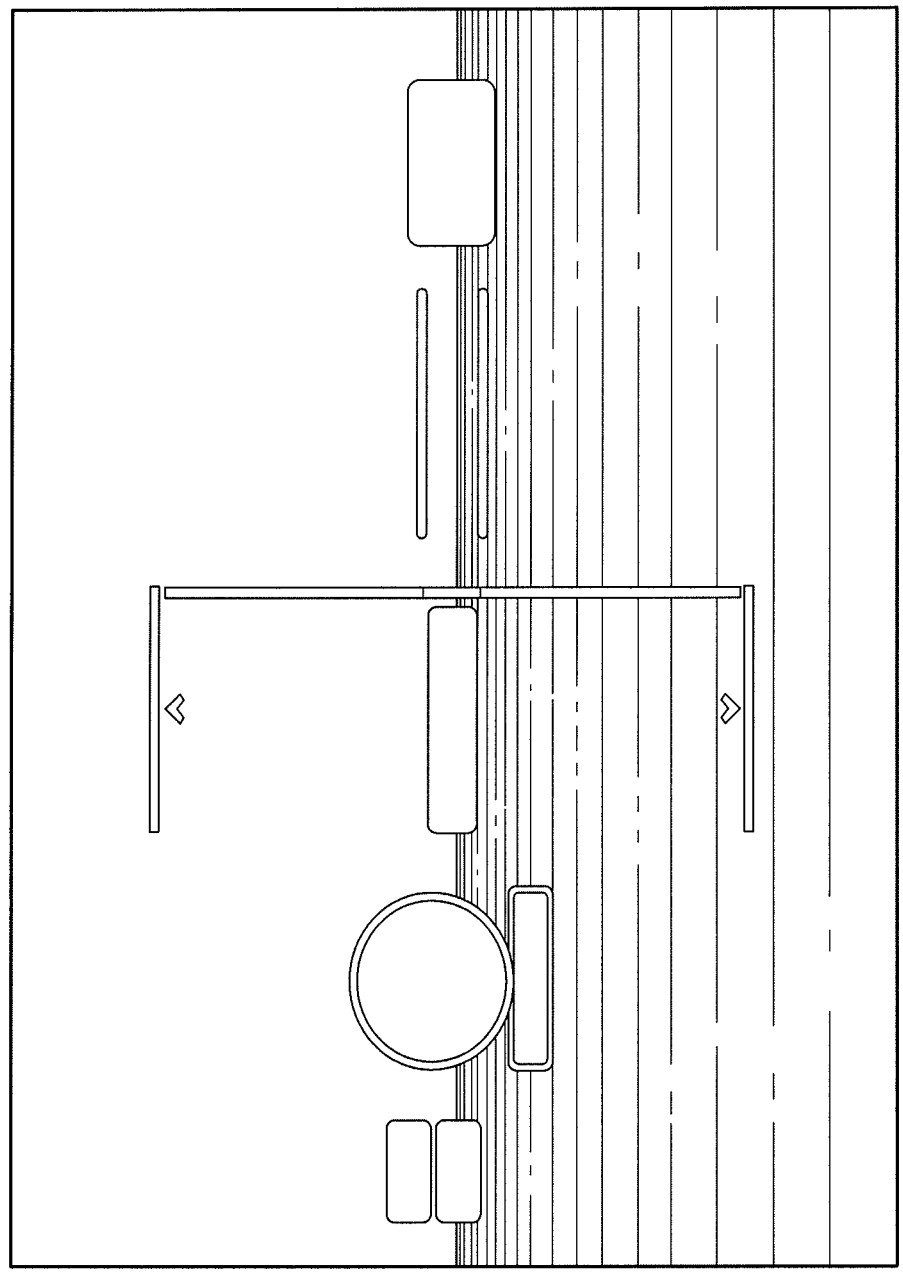
Figure 5F:
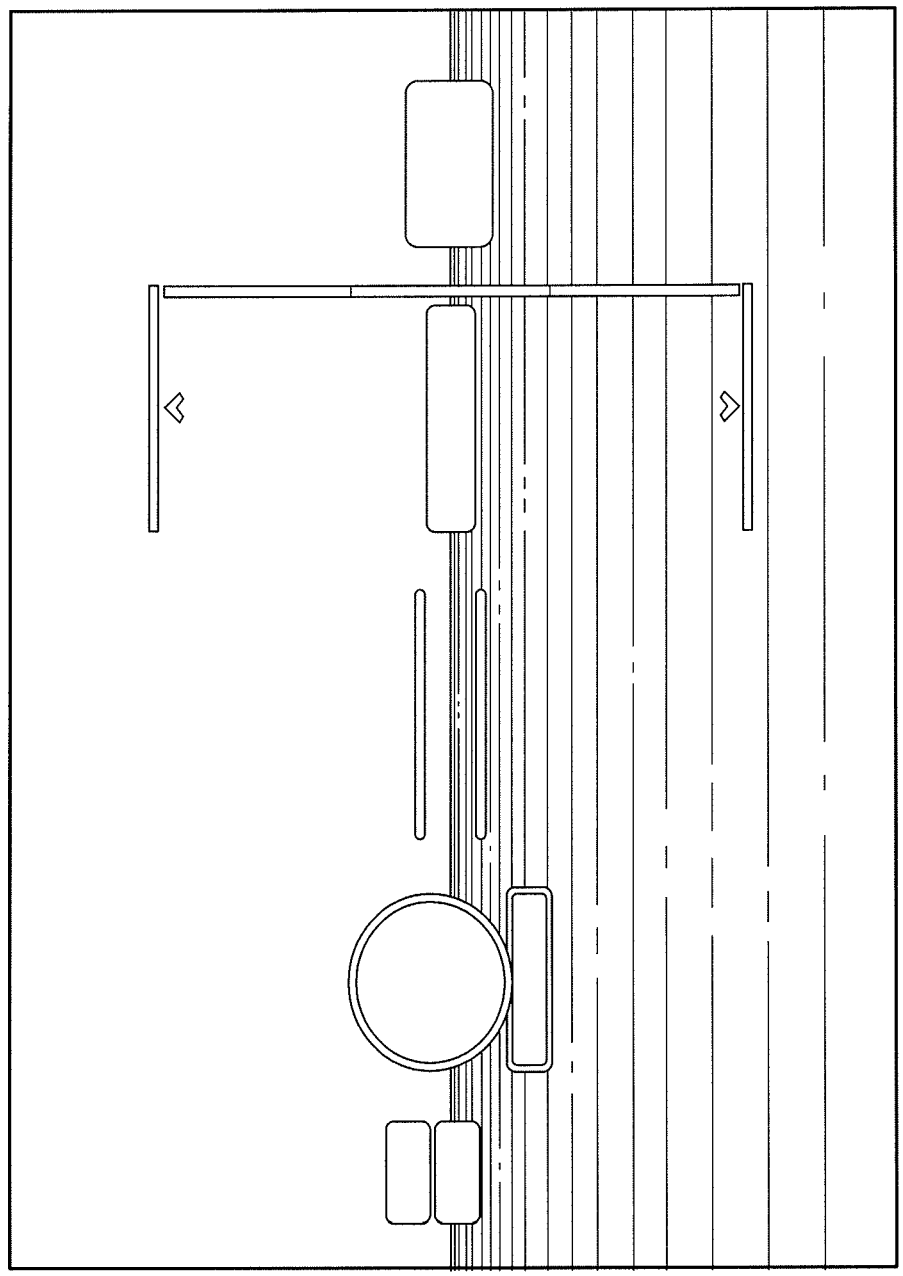
Figure 5G:
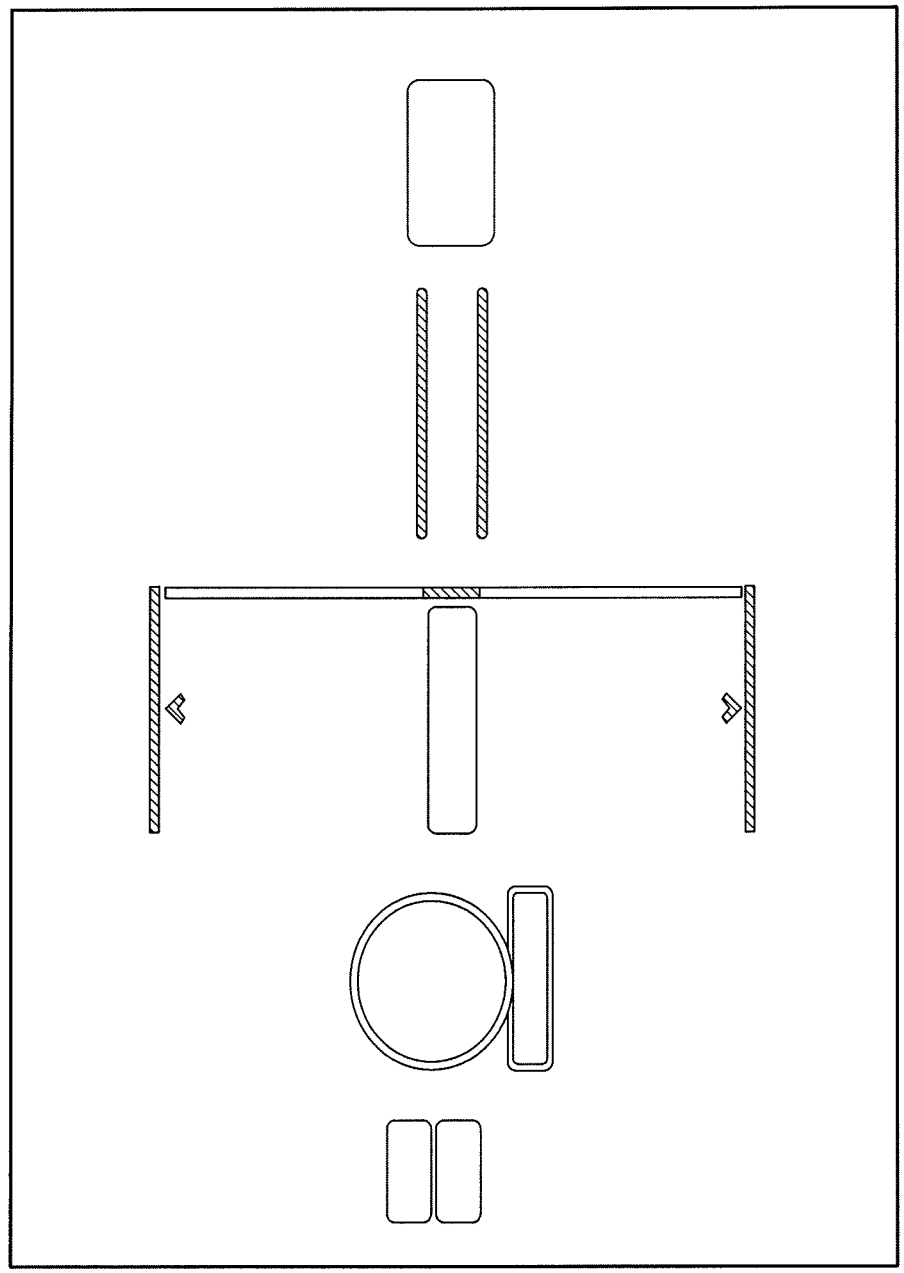
Figure 5H:
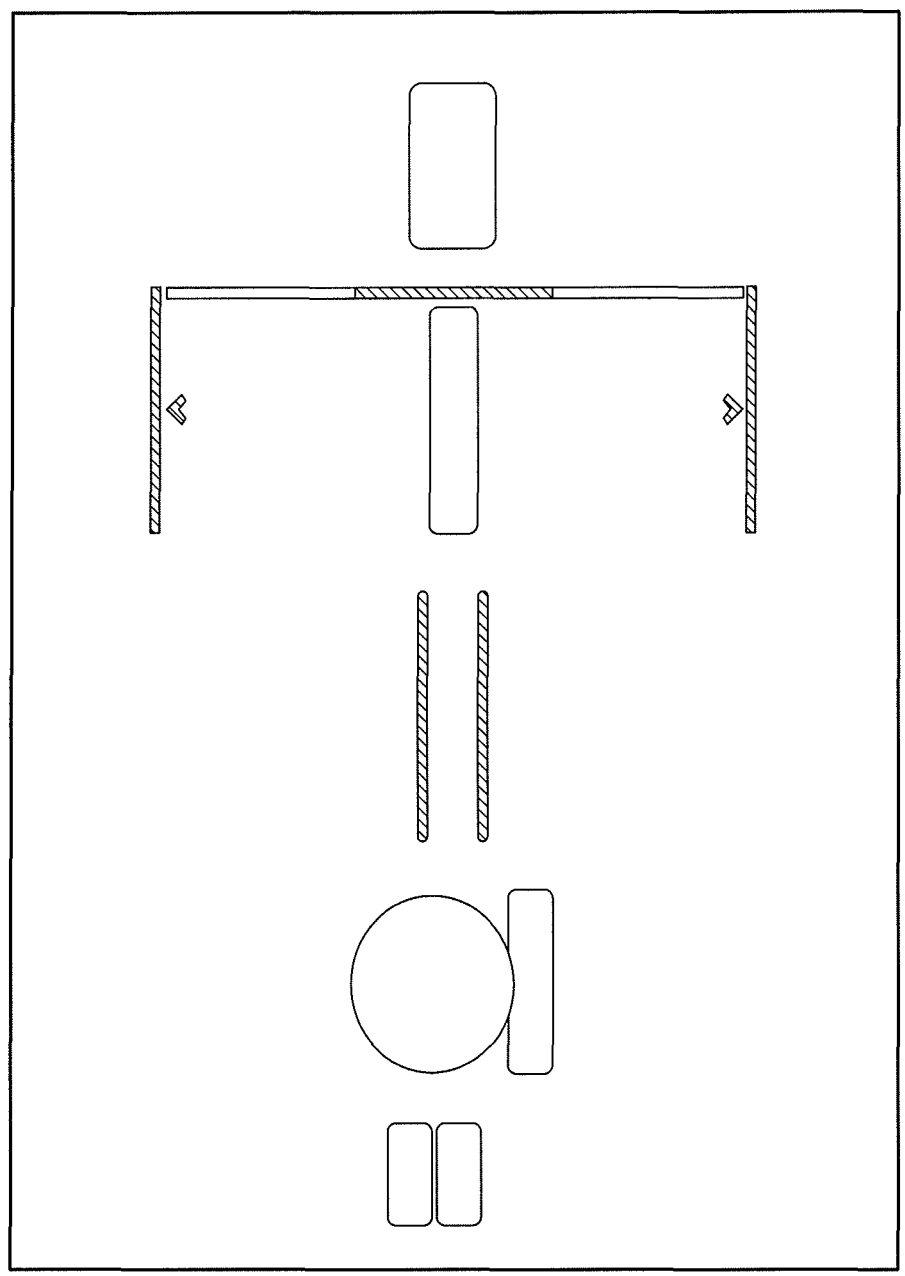
Figure 6:
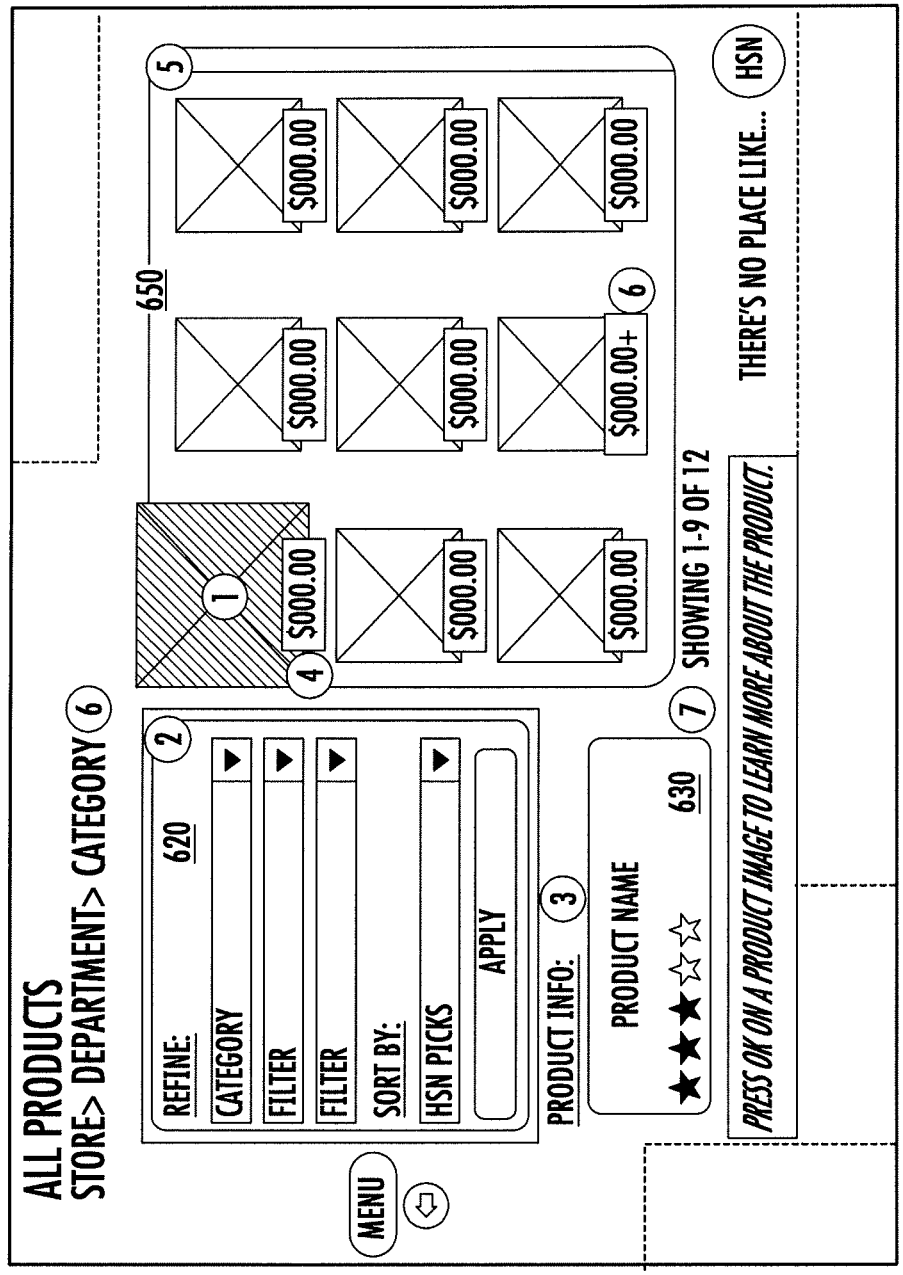
Figure 6B:
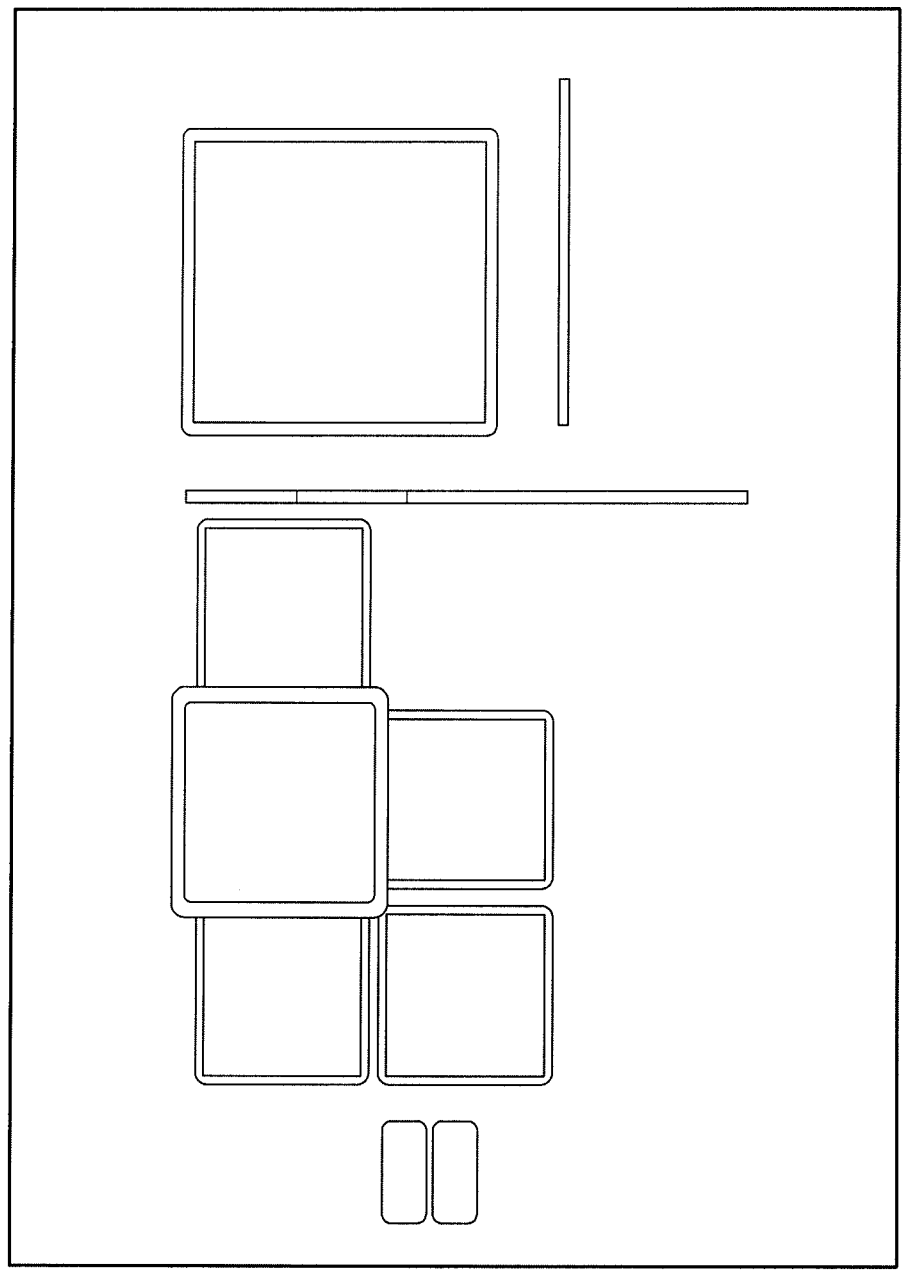
Figure 6C:
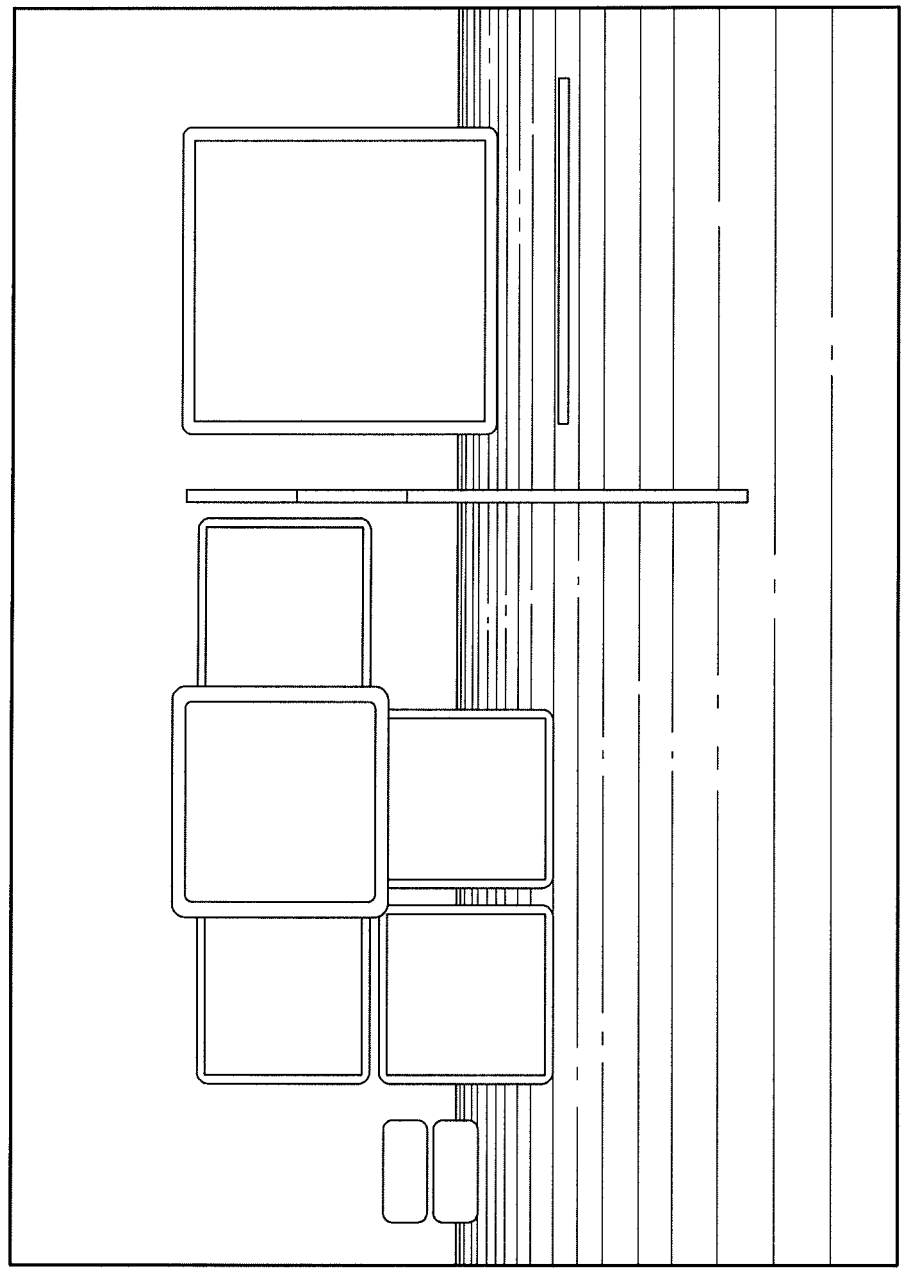
Figure 6D:
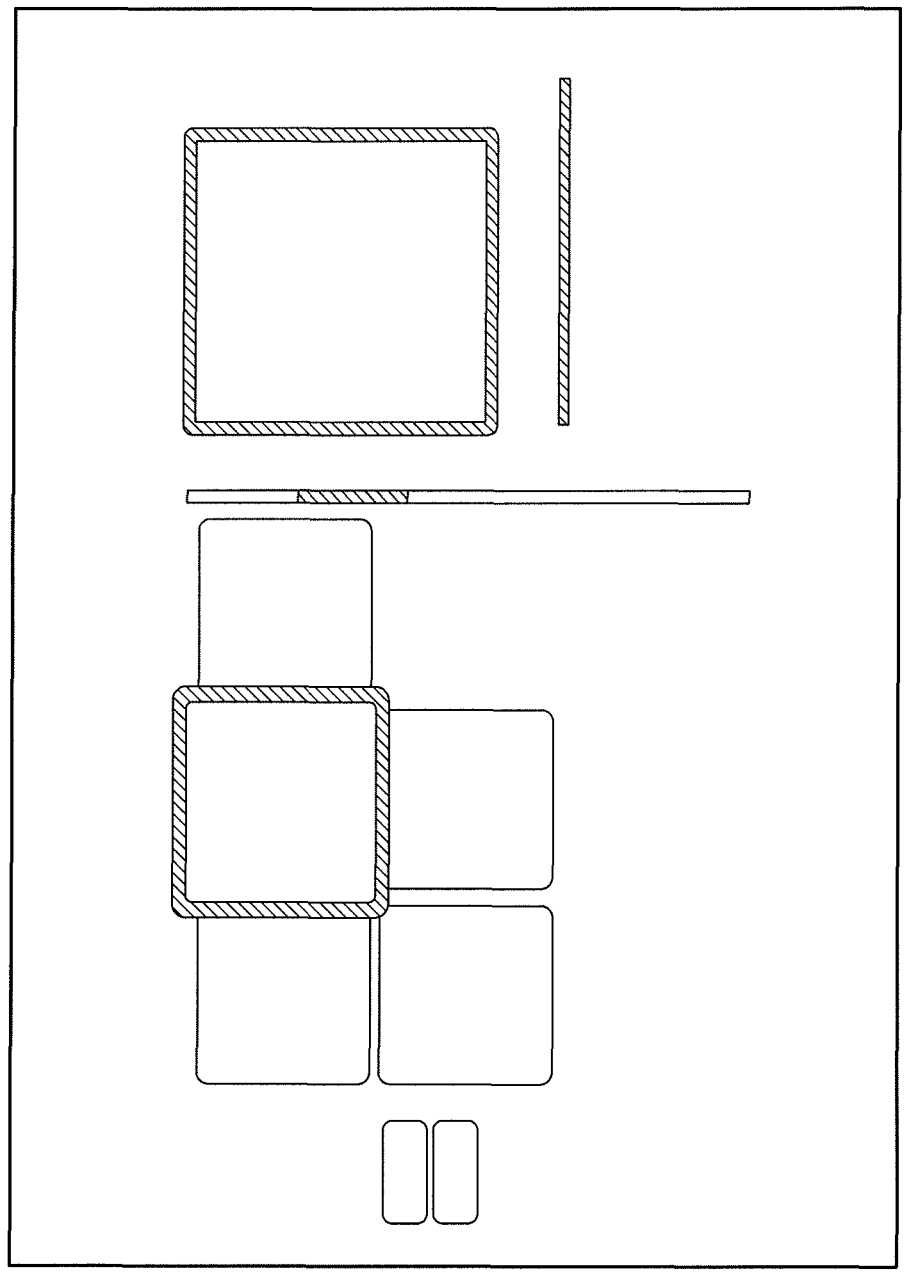
Figure 7:
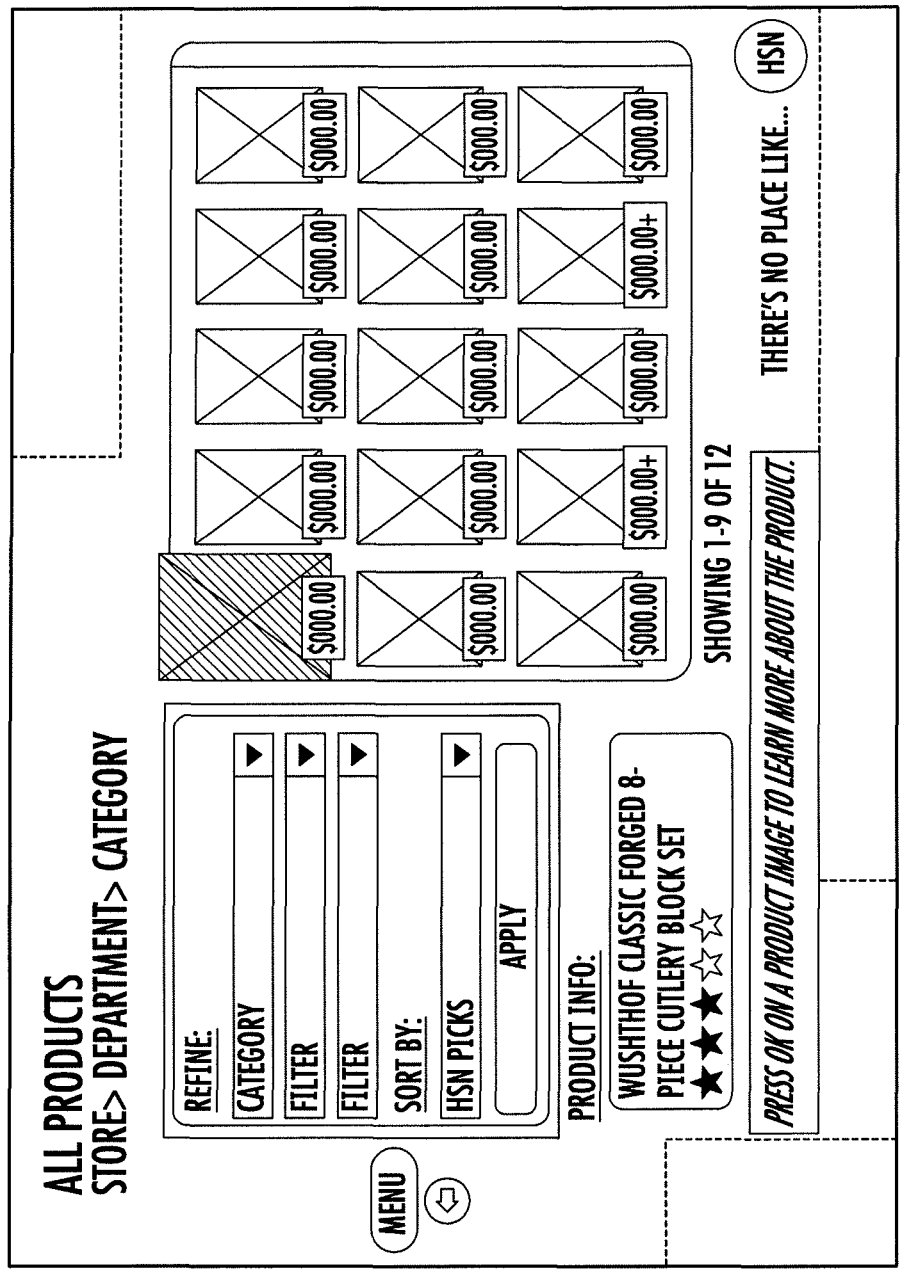

FIGS. 4 to 4D illustrate example embodiments of the product catalog or "All Products" section. As illustrated in FIG. 4, there may be a set of "store fronts," and a scroll bar to view more store fronts. Each of these may be the categories previously discussed (e.g., "Health," "Beauty," "Apparel," etc.). FIGS. 5A to 5H illustrate further sub-category progressions. In FIG. 5A, "Departments" are listed under the "Beauty" category selected from the interface shown in FIG. 4. FIG. 5B illustrates a set of categories under "Makeup," which the user may select. Once the user has selected the illustrated categories, the user may select "view products" or any other similar action button (e.g., "submit"). The user may then be brought to a page such as the one illustrated in FIG. 6. Here, (e.g., at 620) the user may refine the set of items even further. Refinement criteria could be anything, such as brand, price, size, color, etc. Further, once the final set of results is provided, the user may then sort by a criteria, e.g., provider picks, most popular, price, etc. A final set of products may be presented in sorted order, e.g., 650. The user may then select a product to preview and/or purchase, or scroll through the different pages of products. Advantageously, when the user positions a pointing device over an item (e.g., a mouse) or clicks on an item, that entry may enlarge, highlight, illuminate, etc. The selected item may also load preview information in another portion of the screen, e.g., 630. FIGS. 6B to 6D illustrate alternative example embodiments similar to FIG. 6. Other layouts are possible, e.g., FIG. 7.

Figure 8:
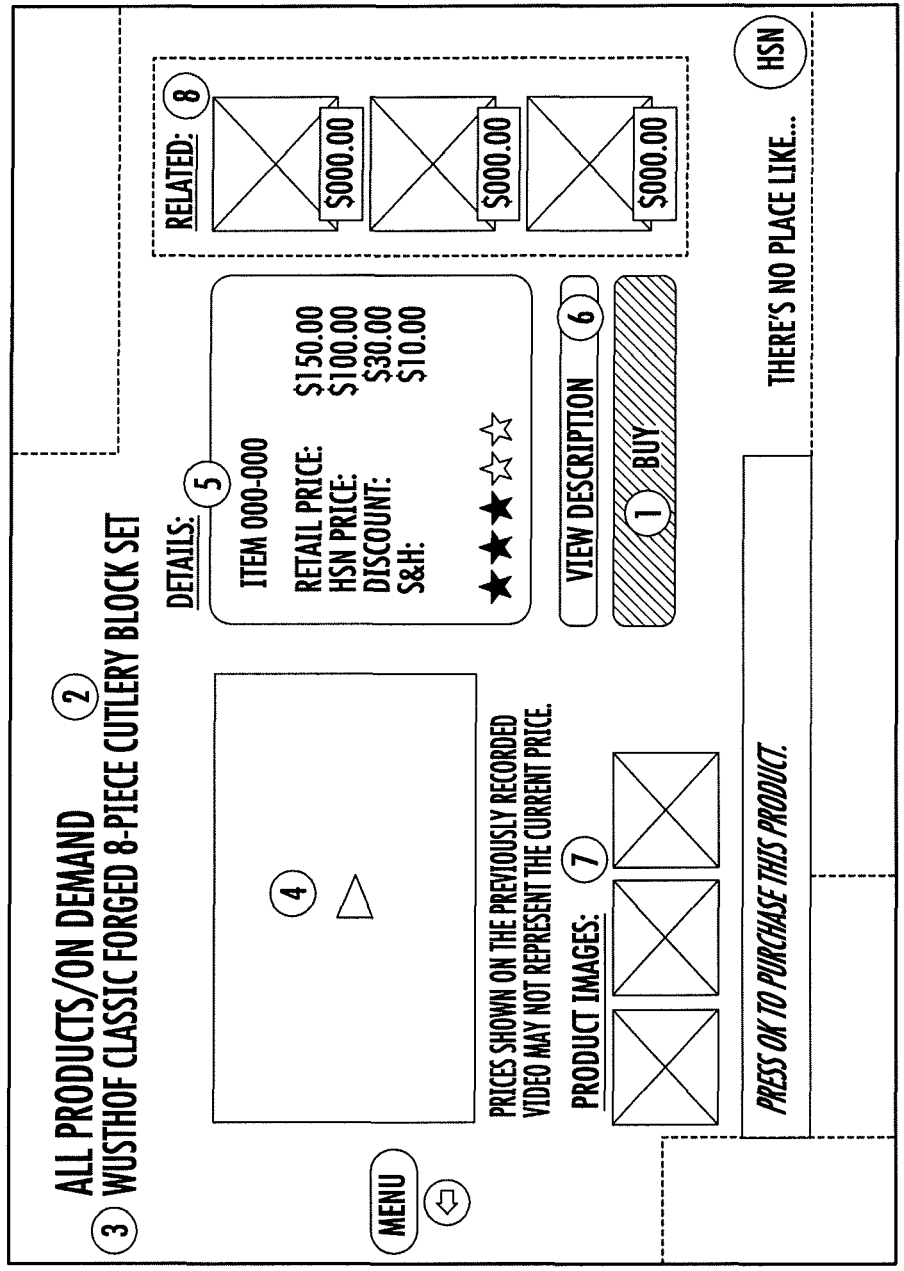
Figure 8B:
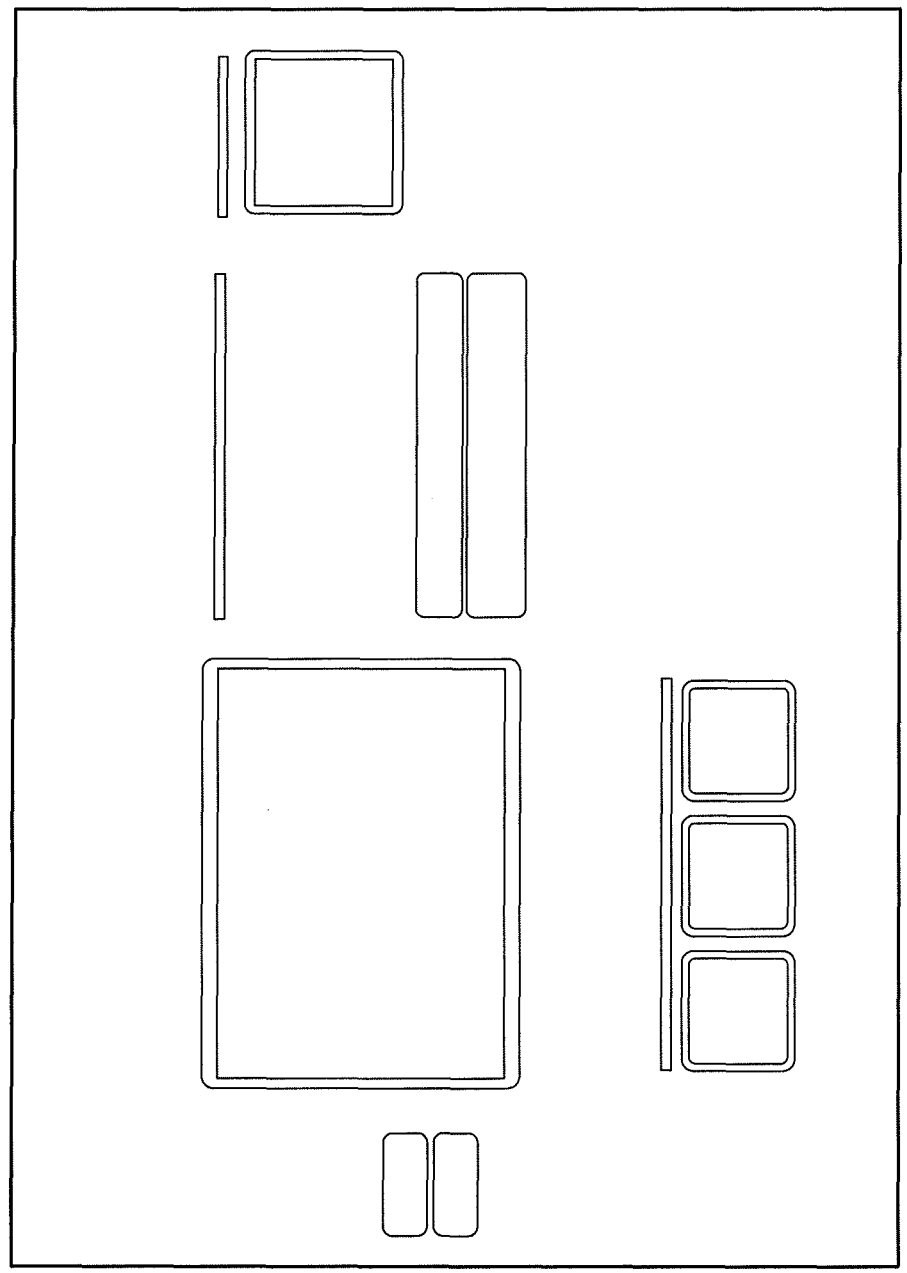
Figure 8C:
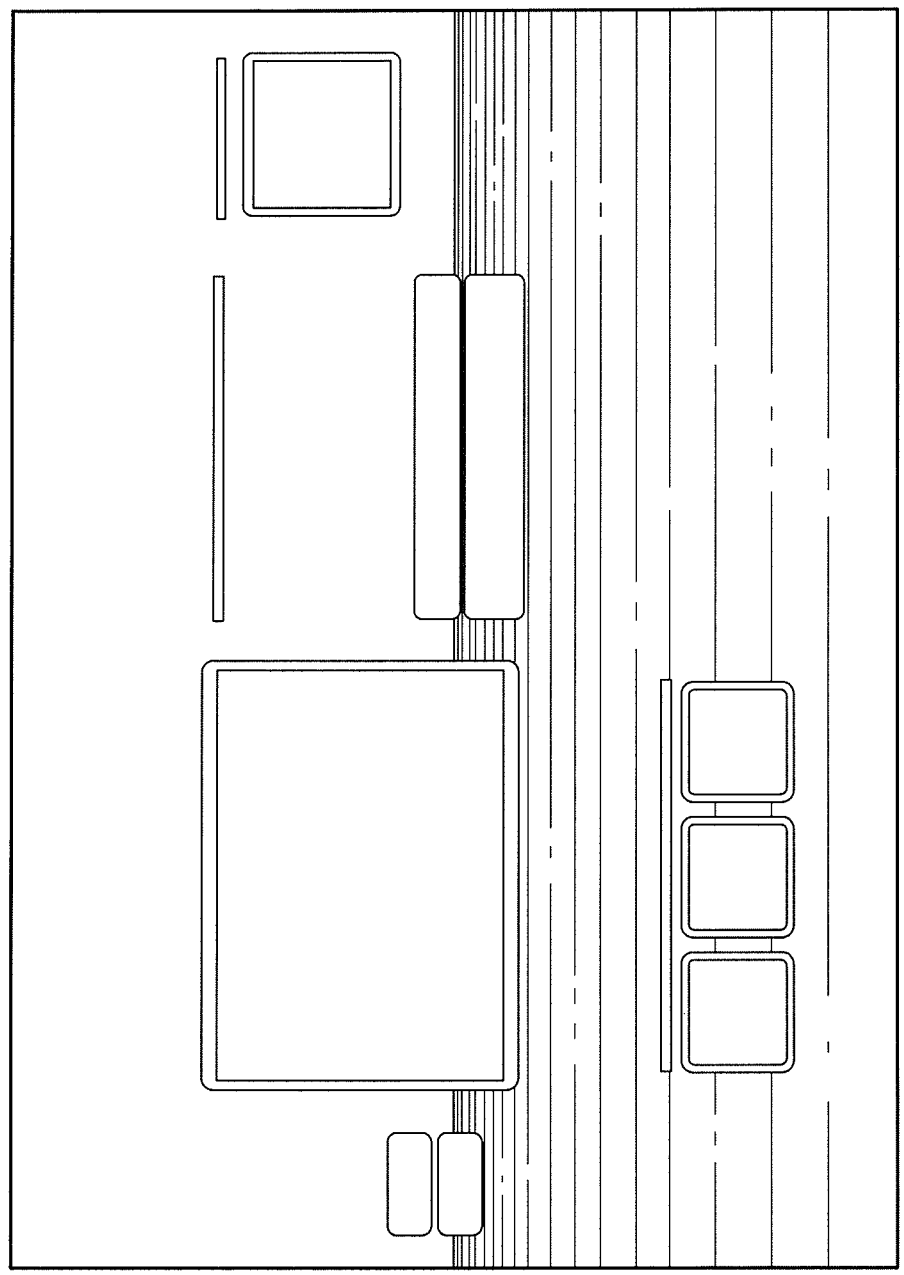
Figure 8D:
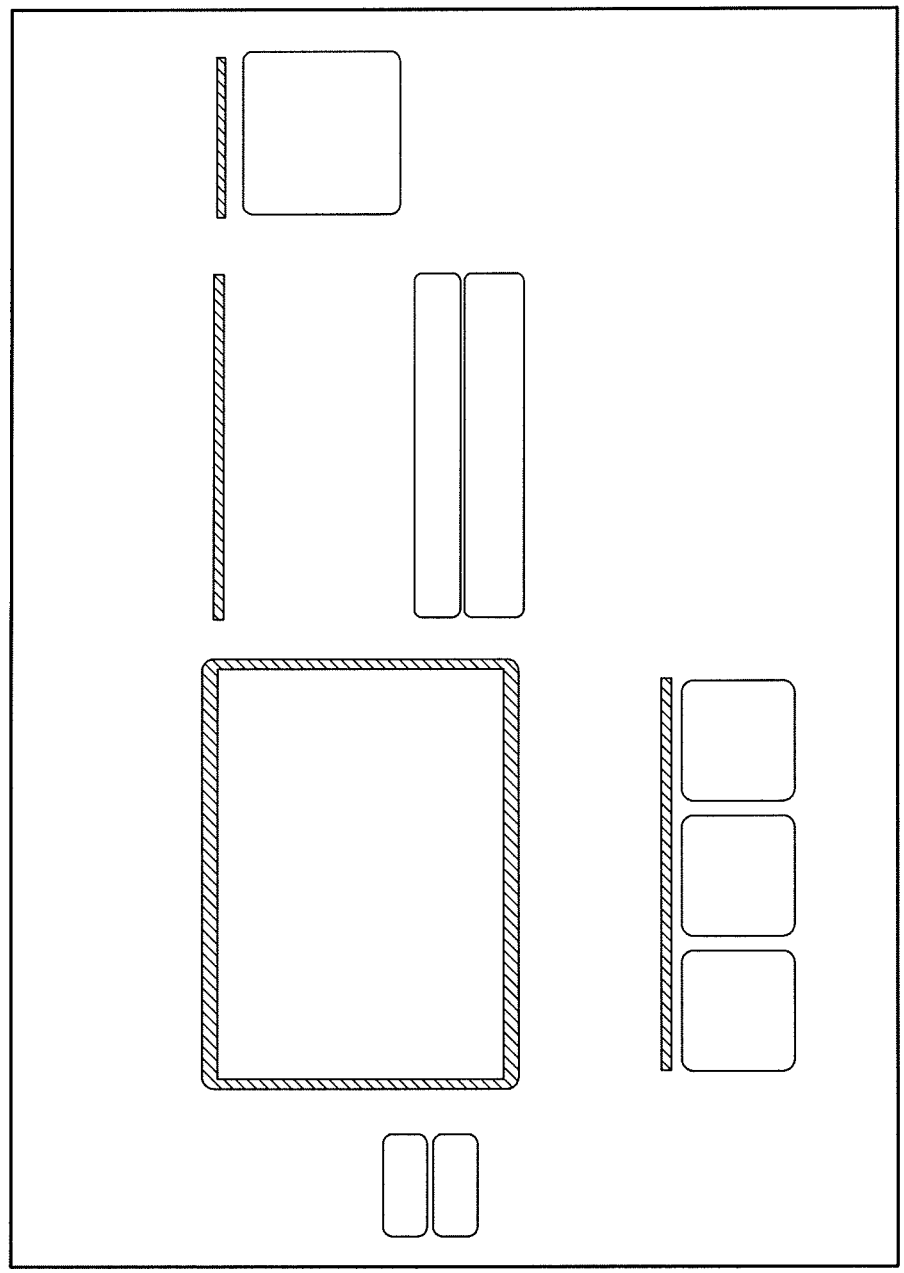
Figure 9:
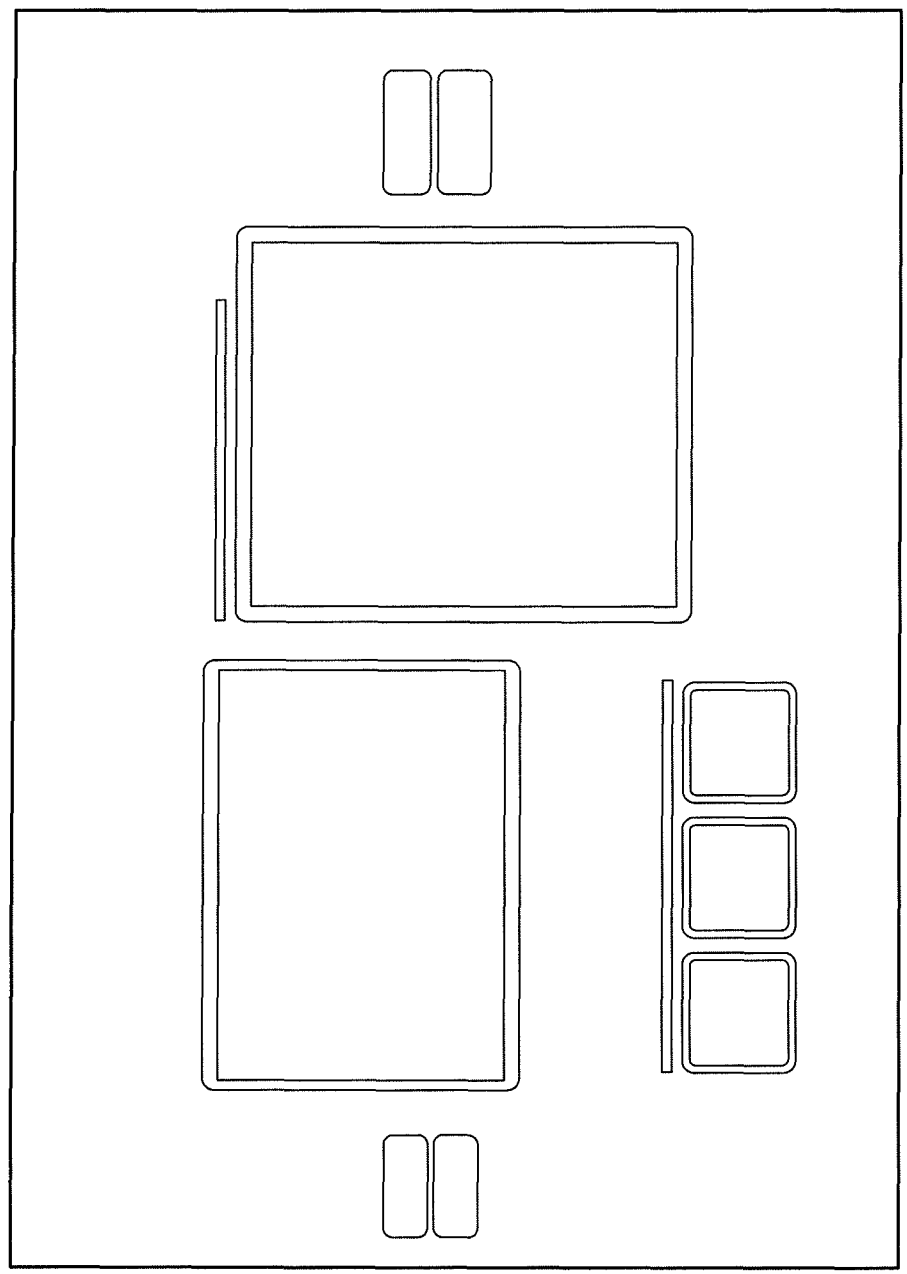
Figure 9B:
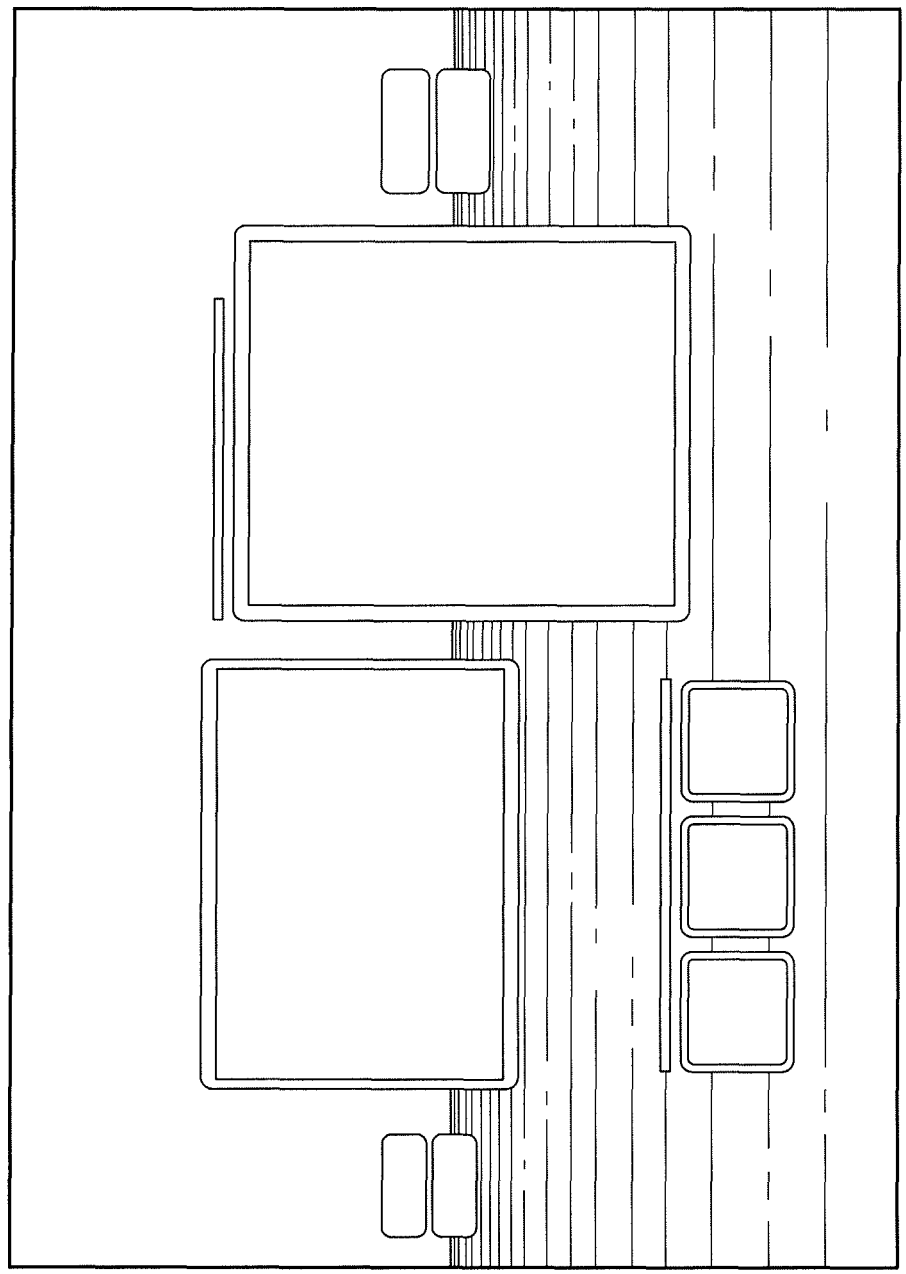
Figure 9C:
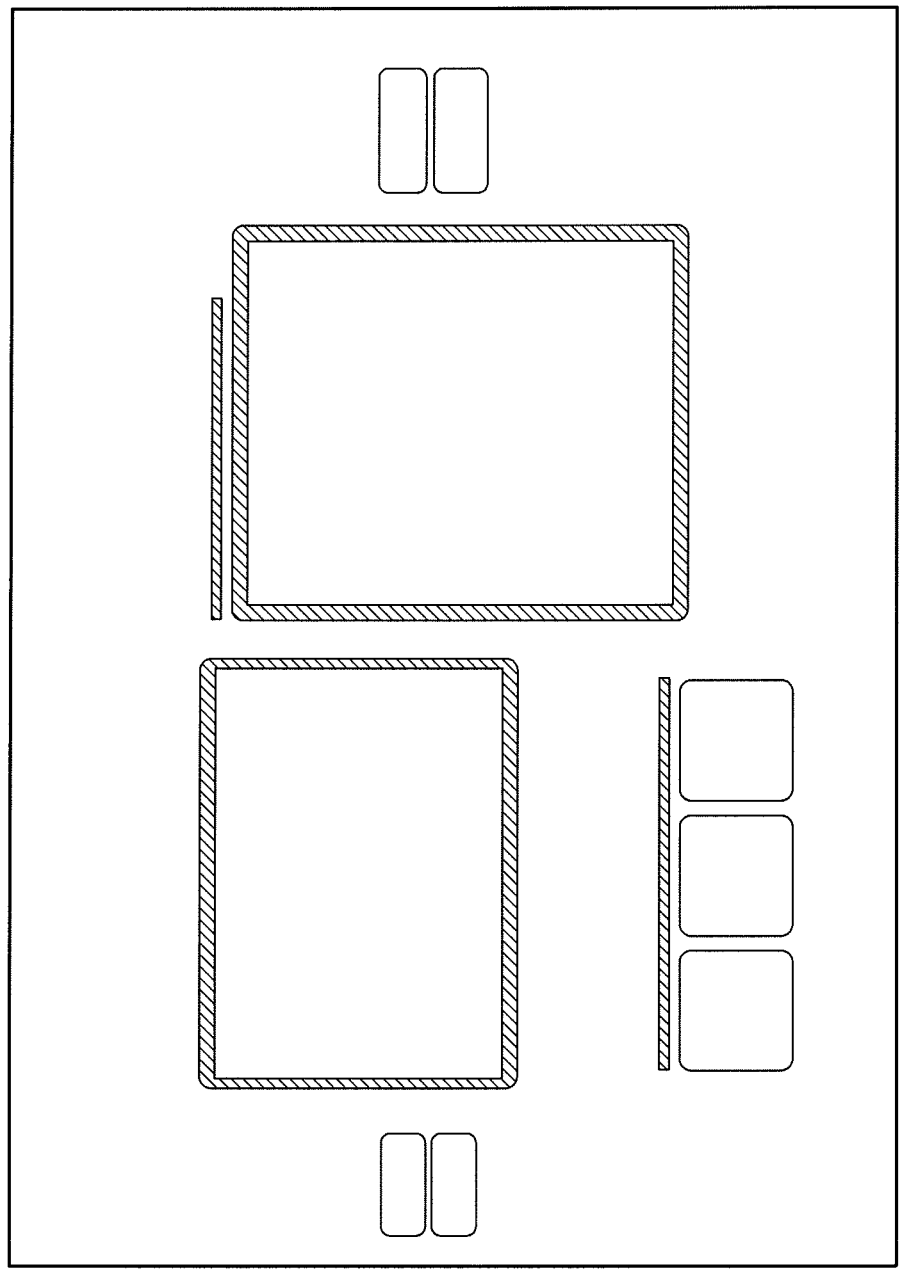
Figure 10:
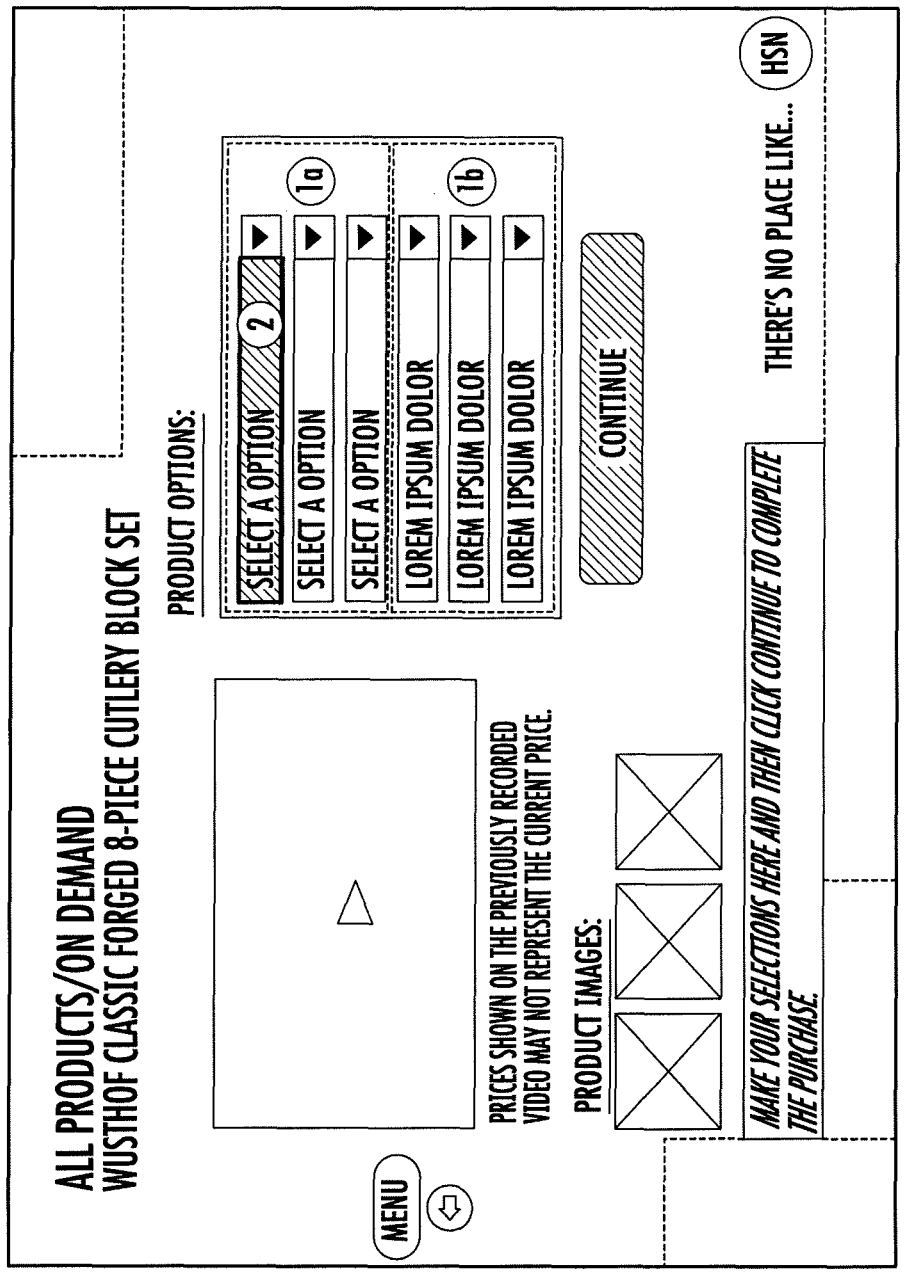
Figure 10B:
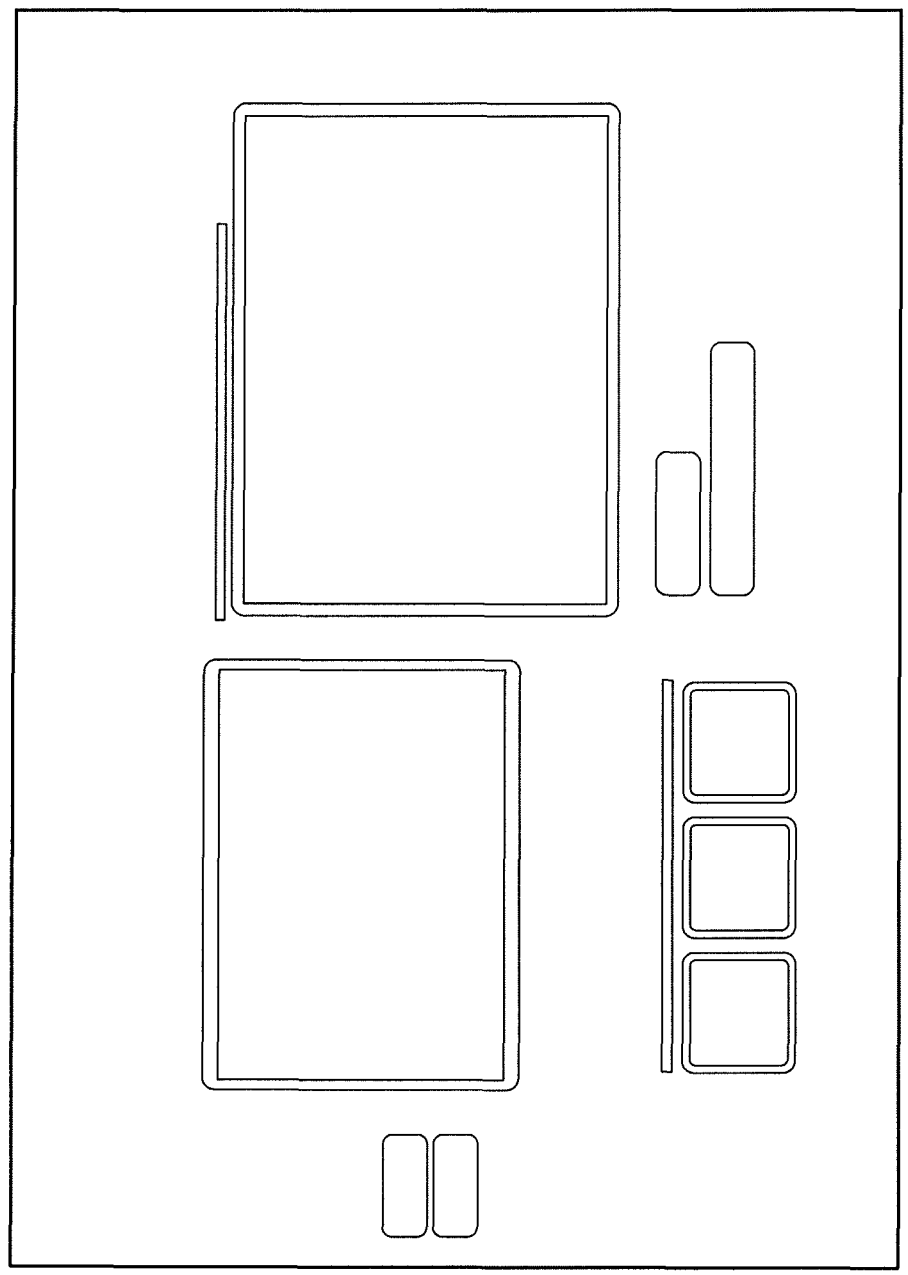
Figure 10C:
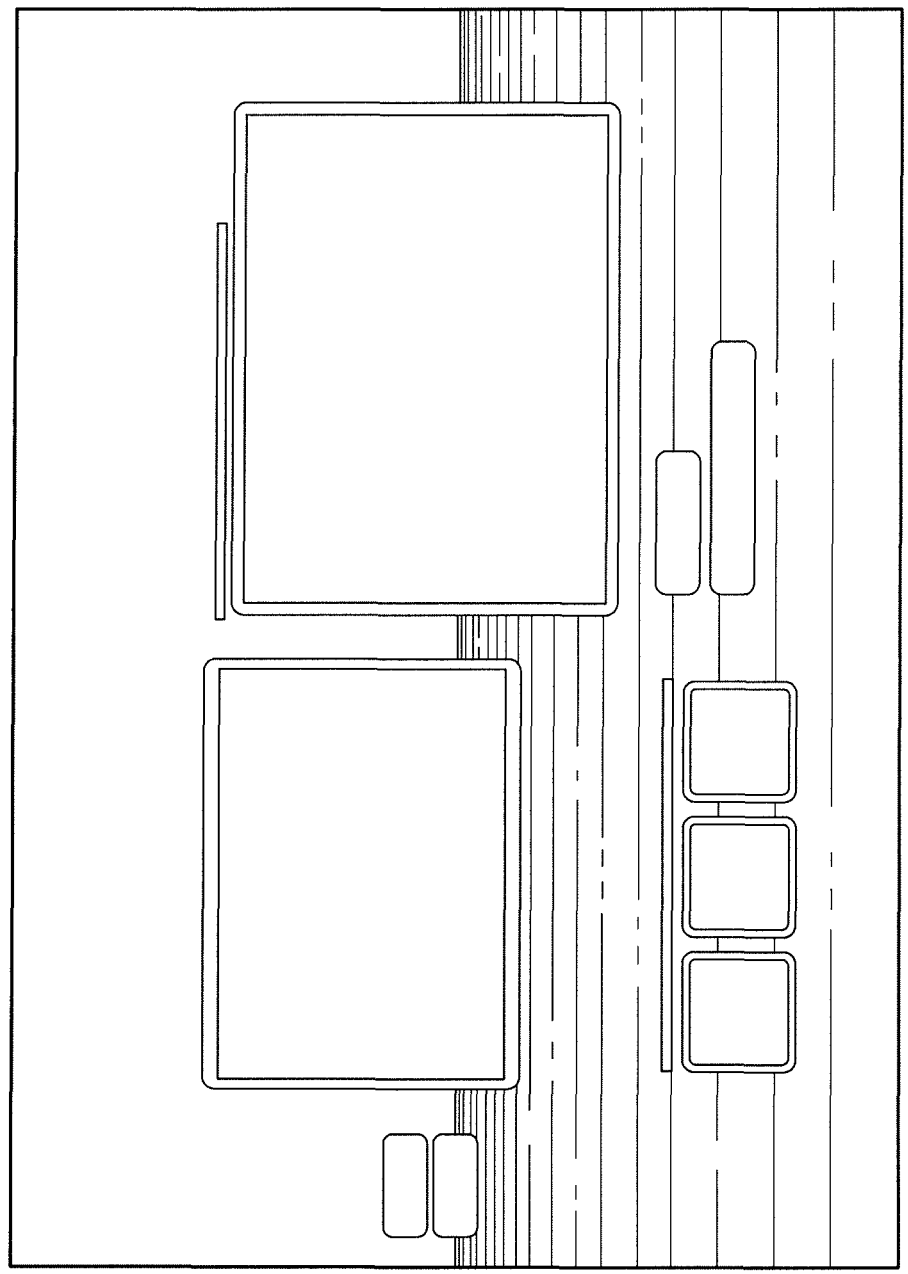
Figure 10D:
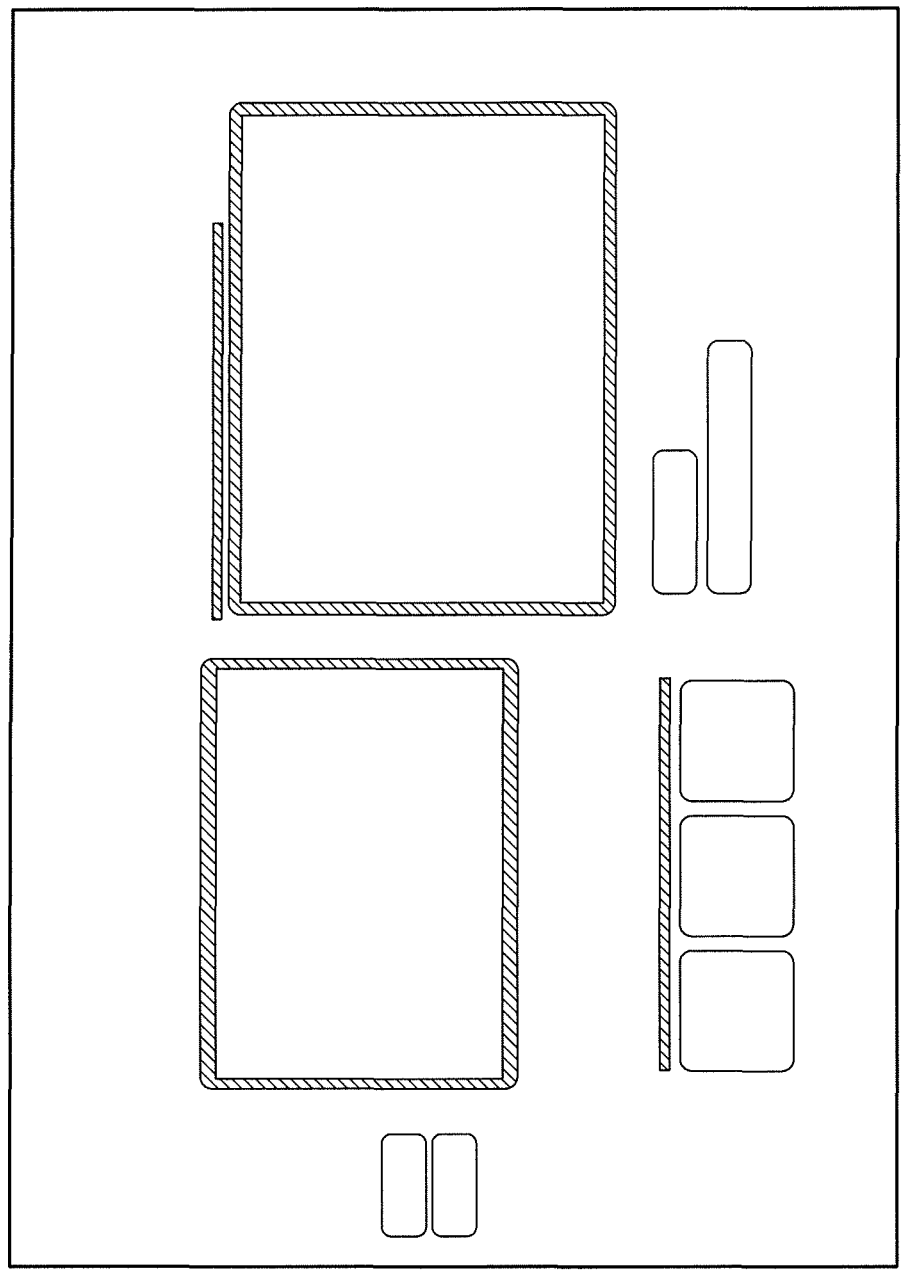

FIGS. 8 to 8D illustrate a product detail page. These are example embodiments of the user interface after the user selects one of the products from FIG. 6, for example. As illustrated, there may be related products, product pictures, product details, a purchase option, and a related video. The video portion could be a stream of the VOD segment where that product was presented for purchase. In this way, the product detail page of the product catalog (e.g., FIG. 8) is similar to an active VOD page (e.g., FIG. 3). Also, the product detail page (e.g., FIG. 8) may be accessible from the VOD page (e.g., FIG. 3), or from any part of the embodiment that includes the product. Upon entering the product detail page, the associated video may automatically begin playing. However, if no video is associated with the product yet, this area may display a single image of the product, a slideshow of the associated images, an advertisement, or any number of other things. FIGS. 9 to 9C illustrate example embodiments of the product details screen with an expanded textual description section. FIGS. 10 to 10D show an additional detail screen which may be used with products that have various options (e.g., size, color, etc.).

Figure 11:
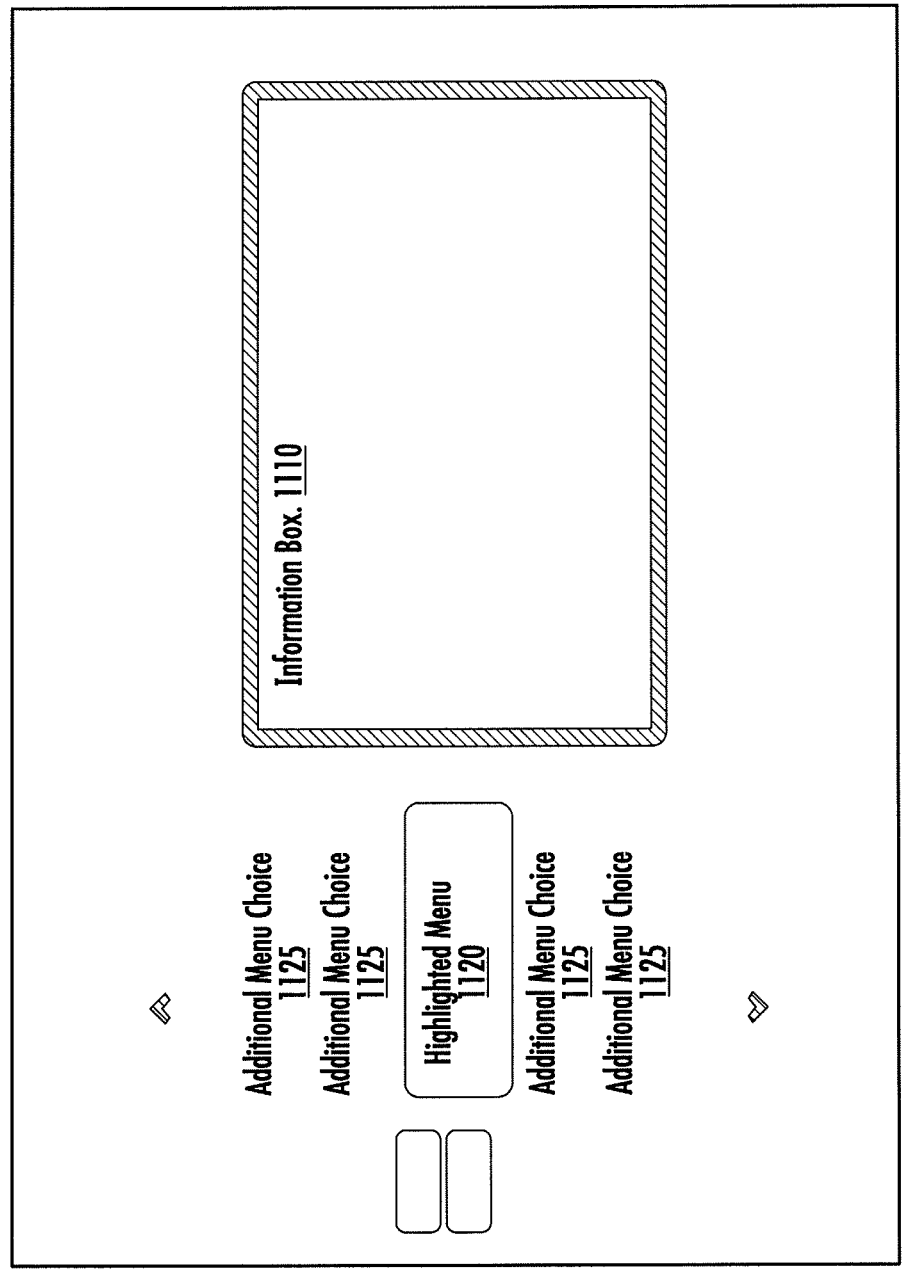
Figure 11B:
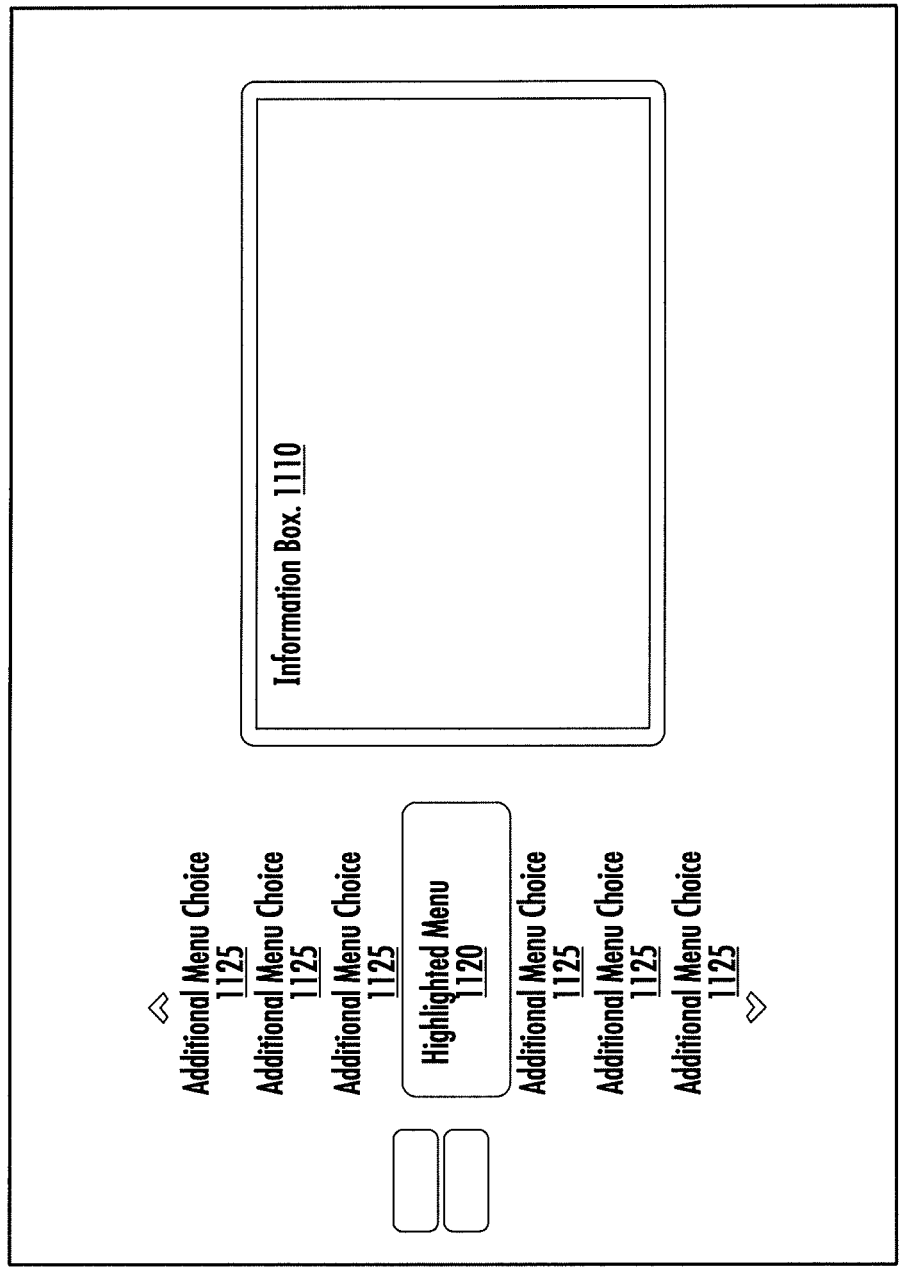
Figure 11C:
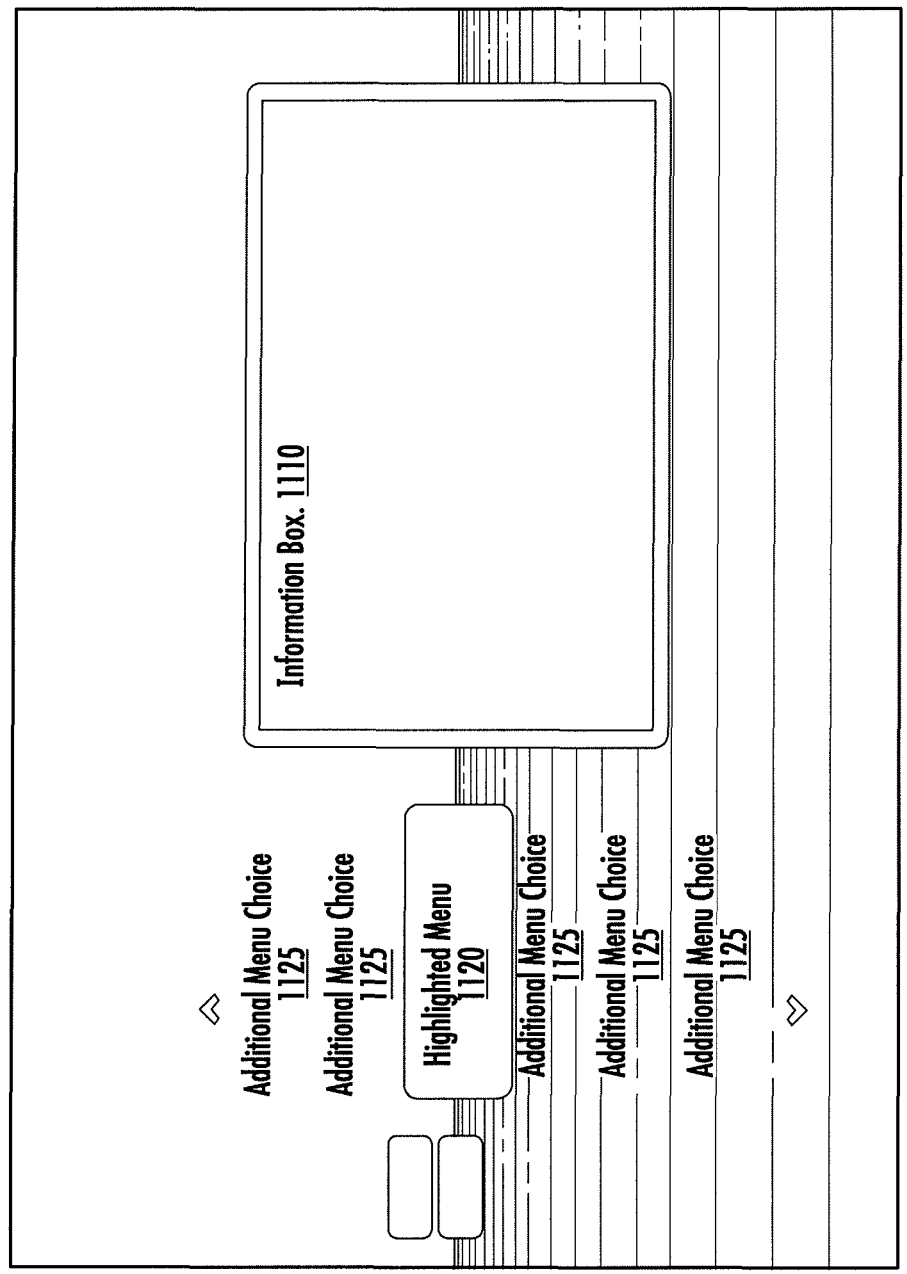
Figure 12:
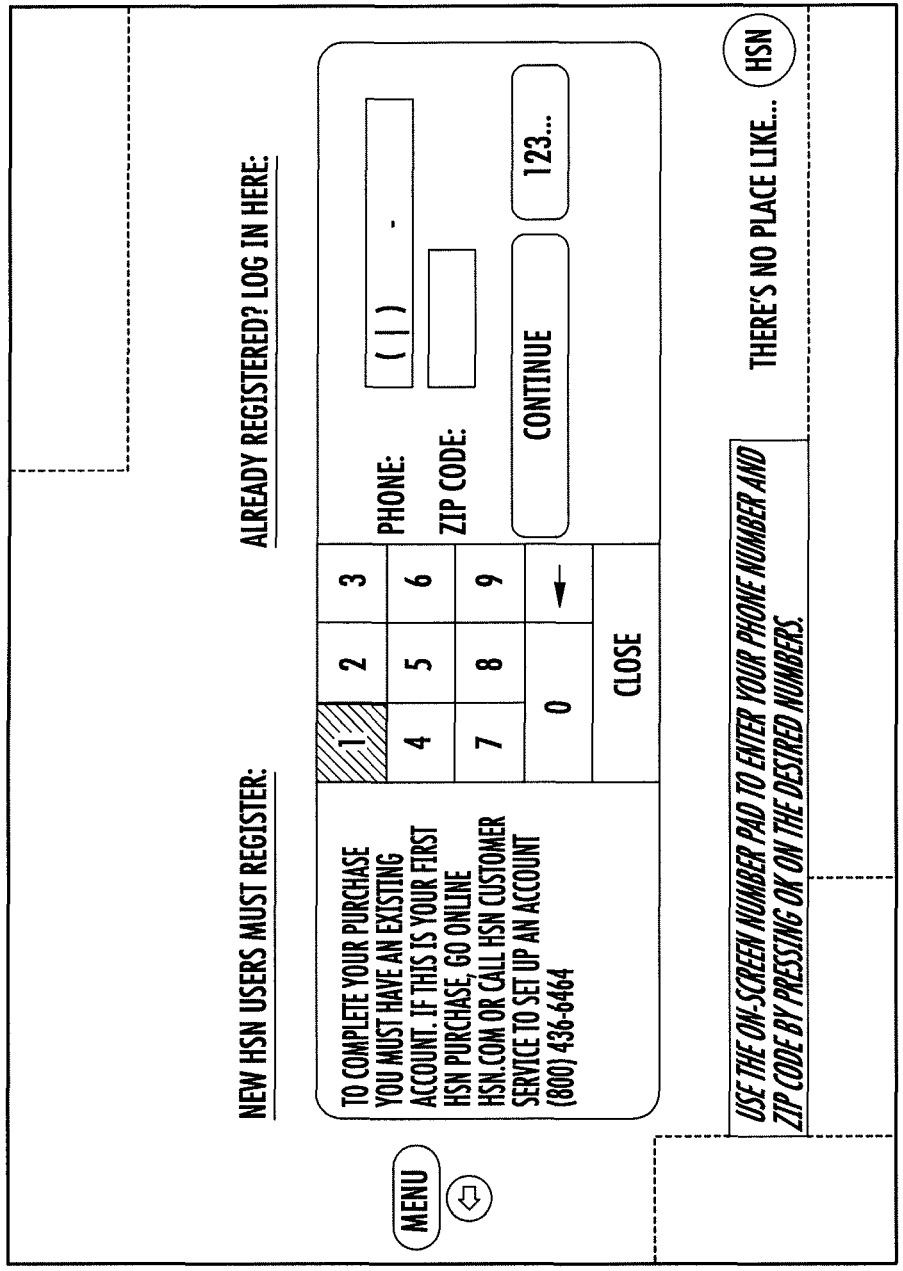

Example embodiments of the present invention may include areas of interactive help topics related to any of the provided features and/or products. FIGS. 11 to 11C illustrate examples of a "Help Center" interface. This example includes a help topic menu similar to the previously discussed category menus. Additionally, there is an information box 1110. This could be textual information, an explanatory video, animations, or any number of other help presentations. Users of the example system may be able to create an account to save their information and/or the state of the items in their "shopping cart. FIG. 12 illustrates an example log-in screen for that account. This example also provides a number entry option for entering numbers with the pointing device. E-commerce accounts are known in the art, and embodiments of the present invention may implement any number of known features in conjunction with the features discussed above.

Figure 13:
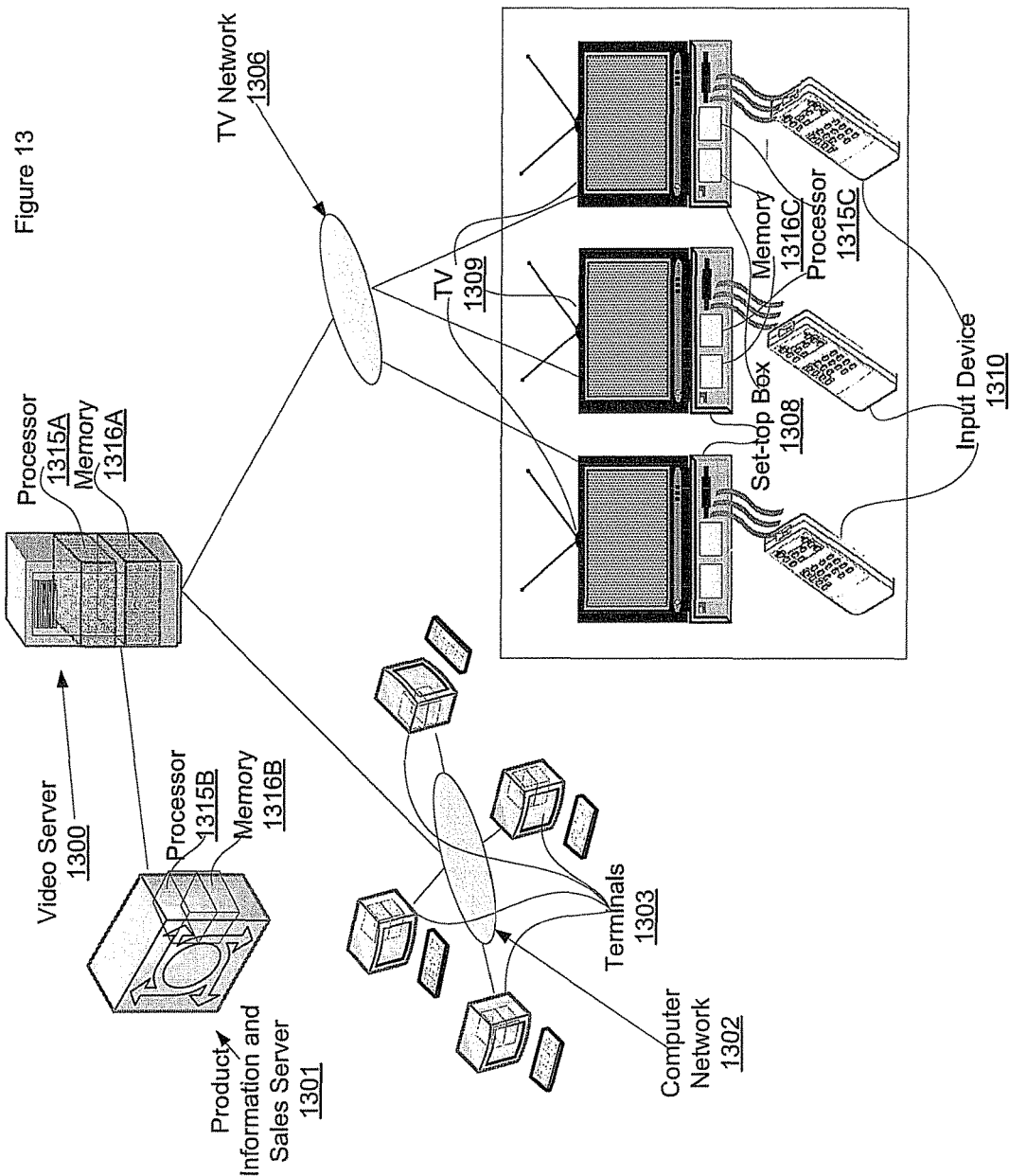
FIG. 13 is a system diagram, according to an example embodiment of the present invention.

FIG. 13 is a block diagram that illustrates exemplary components of a system according to an example embodiment of the present invention. The system may include a VOD server 1300, a product information and sales server 1301, a computer terminal network 1302, and a television network 1306 including a plurality of set-top boxes 1308, each of which is associated with a corresponding TV 1309 and corresponding input device 1310, such as a remote control. The set-top boxes 1308 may be separate from or integrated with their corresponding TVs 1309. This embodiment illustrates two user device networks (e.g., a TV network and a computer network), but example embodiments may include only one of the two and/or additional types of devices (e.g., cell-phones, PDAs, portable game systems, etc.). The product information and sales server 1301 may store images and details about the various products for sale. Additionally, the product information and sales server 1301 may be configured to facilitate the e-commerce and account maintenance functions of the example embodiment. The video server 1300 may store video segments for one or more products available for sale. The video segments may include previously televised segments produced to present and sell the featured product. Example embodiments may have additional "live" feeds connected to the network (not shown).

Each of the server 1300, product information and sales server 1301, terminals 1303, and set-top-boxes 1308 may be controlled by a corresponding processor(s) (e.g., 1315A-C), (collectively referred to herein as processor 115). The processor 115 may be any one or combination of suitably appropriate processing systems, such as, for example, a microprocessor, a digital signal processor, and a field programmable logic array. The processing system may be embodied as any suitably appropriate computing device, e.g., a computer, PDA, laptop computer, notebook computer, a hard-drive based device, or any device that can receive, send, and store data. For the control, the processors 115 may execute program instructions. Some of such instructions may be pre-installed or manually loaded over time. Others may be transmitted between the different system components. Program instructions may be in any suitable form. Some or all of the instructions may be provided in programs written in a self-describing computer language, e.g., Hyper Text Markup Language (HTML) or extensible Markup Language (XML). Other instructions may be in pre-compiled languages such as C, C++, and basic, or in "just in time" compiled languages such as Java and Microsoft .NET. Transmitted program instructions may be used in combination with other previously installed instructions, e.g., for controlling a manner of display of data items described in a received program markup sheet.

Each of the server 1300, product information and sales server 1301, terminals 1303, and set-top-boxes 1308 may include or be in communication with memories (e.g., 116A-C), 5 (collectively referred to herein as memory 116), for storing data and/or program instructions. The memory 116 may include any combination of memory circuits, including electrical, magnetic, and/or optical systems. The memory 116 may include, for example, read only memory (ROM), random access memory (RAM), and/or bulk memory.

Figure 14:
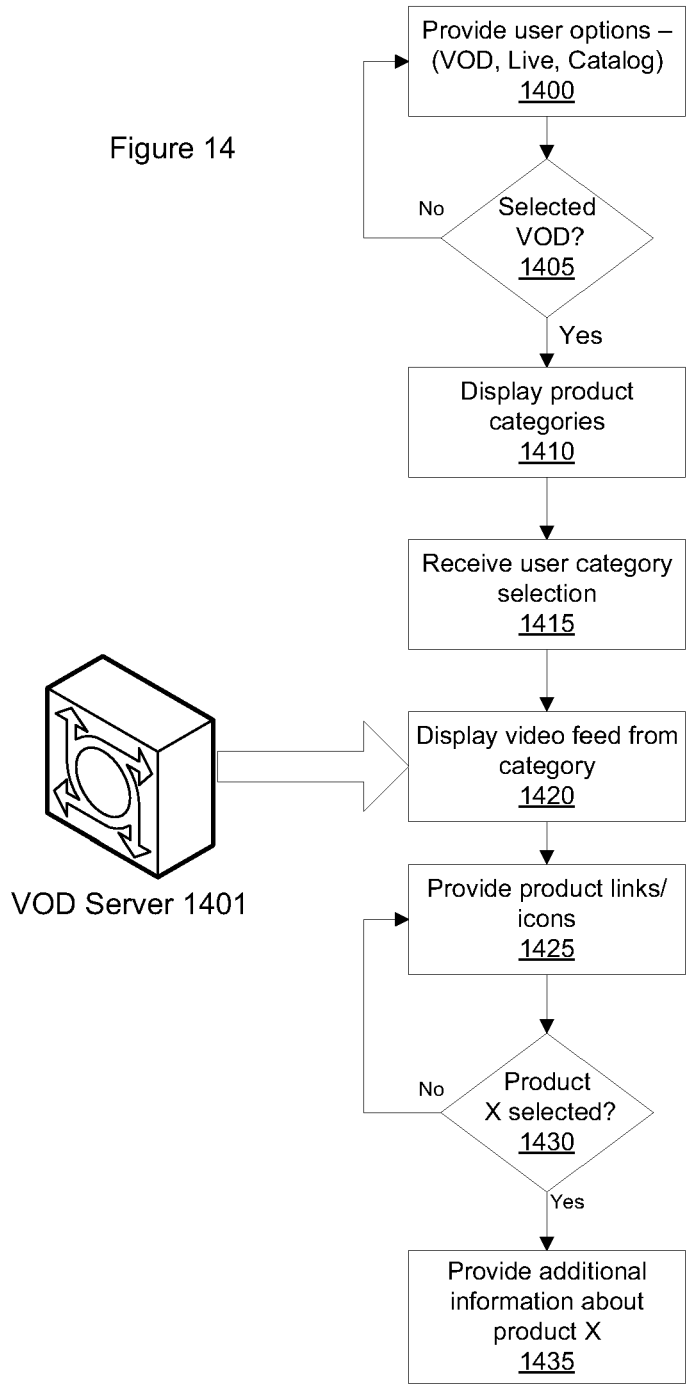
FIG. 14 is a flow diagram illustrating an example of the VOD presentation format, according to an example embodiment of the present invention.
Figure 15:
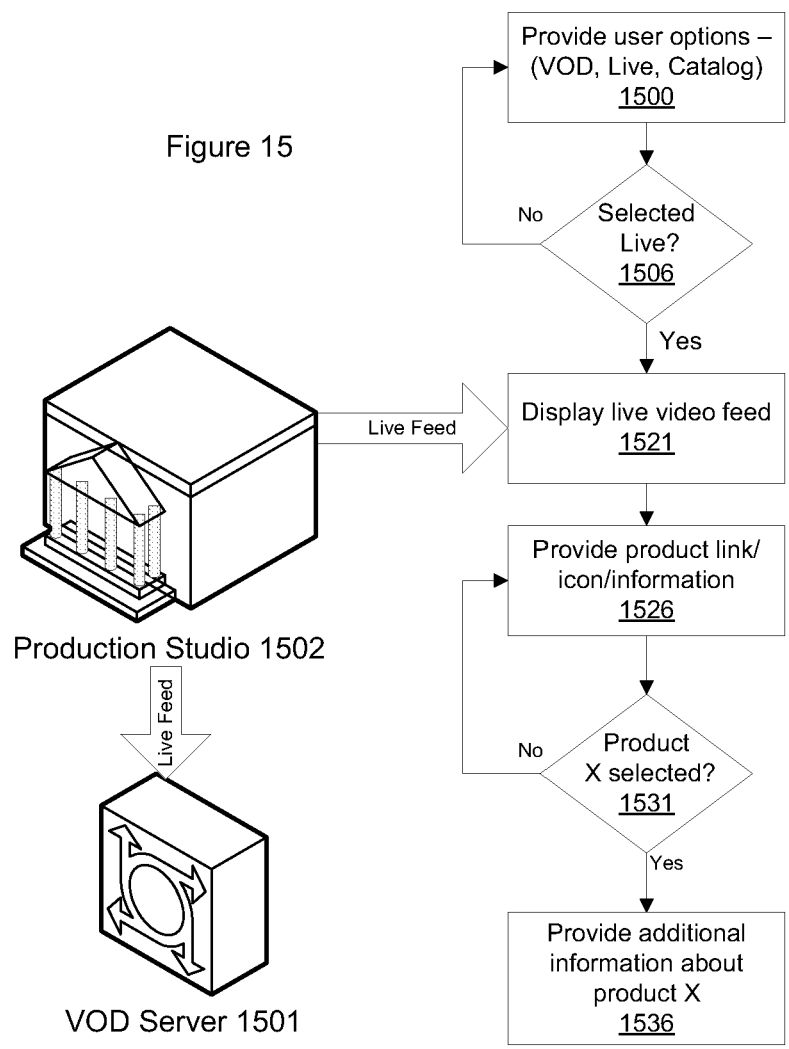
FIG. 15 is a flow diagram illustrating an example of the VOD presentation format, according to an example embodiment of the present invention.

FIG. 14 illustrates an example embodiment of the present invention. First, at 1400, the example method may provide a user with the three presentation formats, e.g., VOD, Live, and the product catalog. This step will remain the same in the next two Figures, and FIG. 14 will illustrate one example of the VOD format. For example, if the user selects the VOD format at 1405, the example method may display the various product categories, at 1410. Next, at 1415, the example method may receive a category selection from the user (e.g., as illustrated in FIG. 15 3). Next, at 1420, the example method may display a video feed from a VOD server 1401. This video feed may include a series of product presentation segments that are all in the selected category. The video segments may be stored in a segmented format and pre-arranged or randomly selected. Alternatively, the video segments may be stored in a combined format with an inherent order. At 1425, in conjunction with 1420, the example method may provide product links, icons, information, and/or function buttons (e.g., as illustrated in FIG. 4). At 1430, if a user selects a particular product, the example method may provide additional information about the particular product. Additionally, the selection of a product that is not currently being presented in the video feed, may cause the video feed to advance to the presentation of the selected product. Selection of the product may also bring the user to that product's entry in the product catalog (e.g., as illustrated in FIG. 10).

FIG. 15 illustrates an example embodiment of the present invention and the "Live Feed" format. At 1500, the user is again given the option of VOD, Live, or Catalog. At 1521, after the user selects the Live Feed format at 1506, the example method may display the live feed from the production studio 1502. FIG. 15 illustrates a live feed leaving the production studio to the example method, and also sending the live feed to the VOD server 1501. However, alternative embodiments may have the feed passing through one or more servers (including the VOD server) before streaming to the user who selects the "live" format. Additionally, live may be a truly live production, performed and transmitted directly to the viewers. Alternatively, the transmission may be buffered or time-delayed. The "live" transmission may be a stream of a 5 prerecorded production that may have been an edited production or a "live to tape" production. As illustrated, the "live feed" may generally be any feed that is being transmitted irrespective of a user request for the program. As compared to the VOD feeds, which are stored on the VOD server 1501 until requested by a user, and then streamed to the requesting user. The example method may provide product links, icons, information, function buttons, etc., at 1526 (e.g., as 10 illustrated in FIG. 5). If the product is selected at 1531, the example method may provide additional information about the product at 1536. This may include taking the user to the product catalog page associated with the user.

Figure 16:
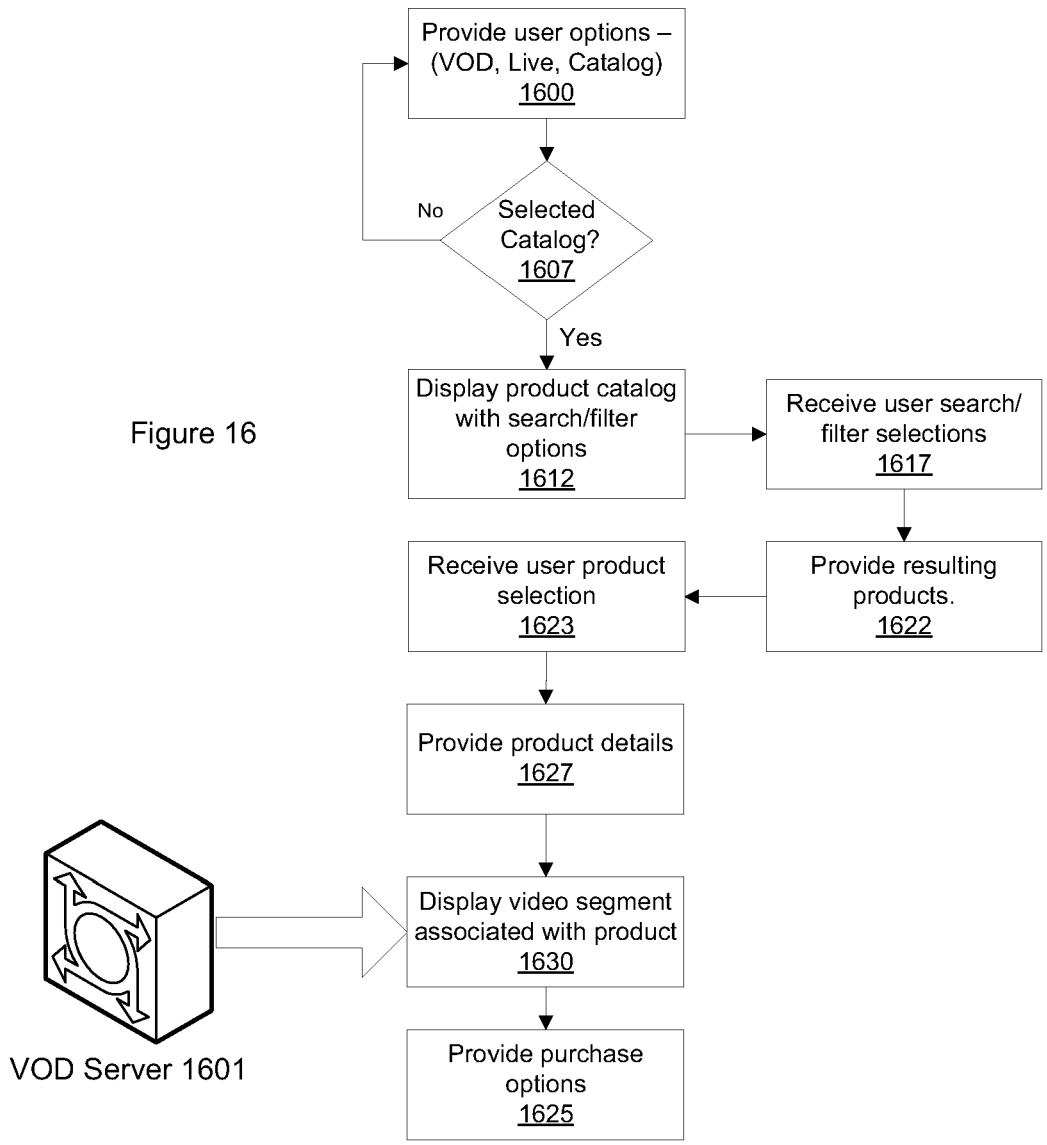
FIG. 16 is a flow diagram illustrating an example of the VOD presentation format, according to an example embodiment of the present invention.

FIG. 16 illustrates an example embodiment of the present invention and the "Product Catalog" format. At 1600, the user is again given the option of VOD, Live, or Catalog. At 1612, after the user selects the product catalog format at 1607, the example method may display the product catalog with search options and filter settings. These were previously discussed with respect to FIGS. 6 to 8, and may include any number of attributes. At 1617, the example method may receive the user's selections and at 1622 provide the resulting products (e.g., as illustrated in FIG. 8). At 1623, the example method may next receive a user selection for a particular product from among the resulting products. At 1627, the example method may provide product details, for example, as illustrated in FIG. 10. One aspect of this may be to provide a video presentation of the selected product, e.g., at 1630. This may cause the VOD server to stream that product's video presentation within the product details screen. At 1625, the example method may provide purchase options, or any number of other functions to facilitate the sale of the particular product.

Figure 17:
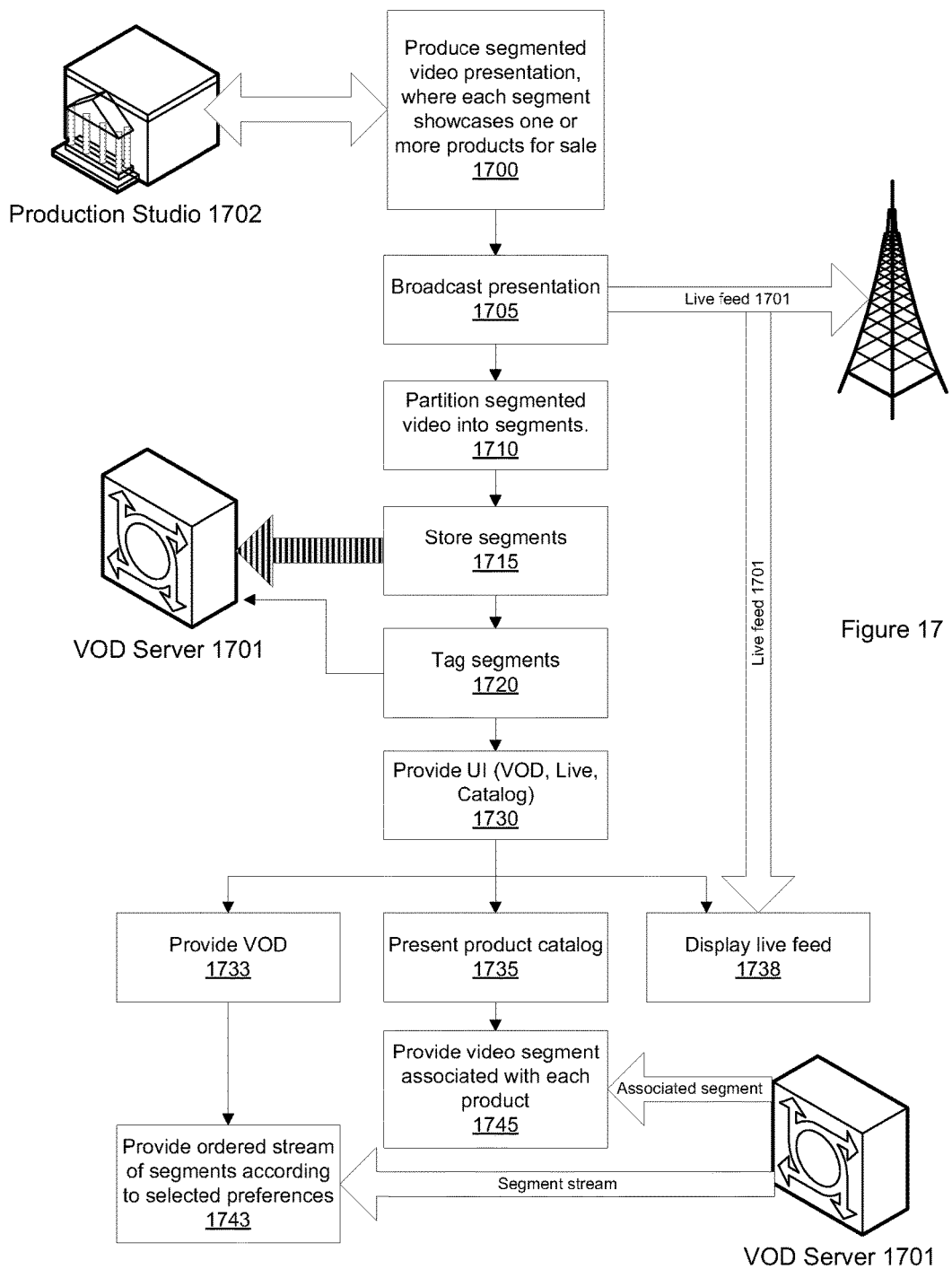
FIG. 17 is a flow diagram illustrating an example of the VOD presentation format, according to an example embodiment of the present invention.
Figure 18:
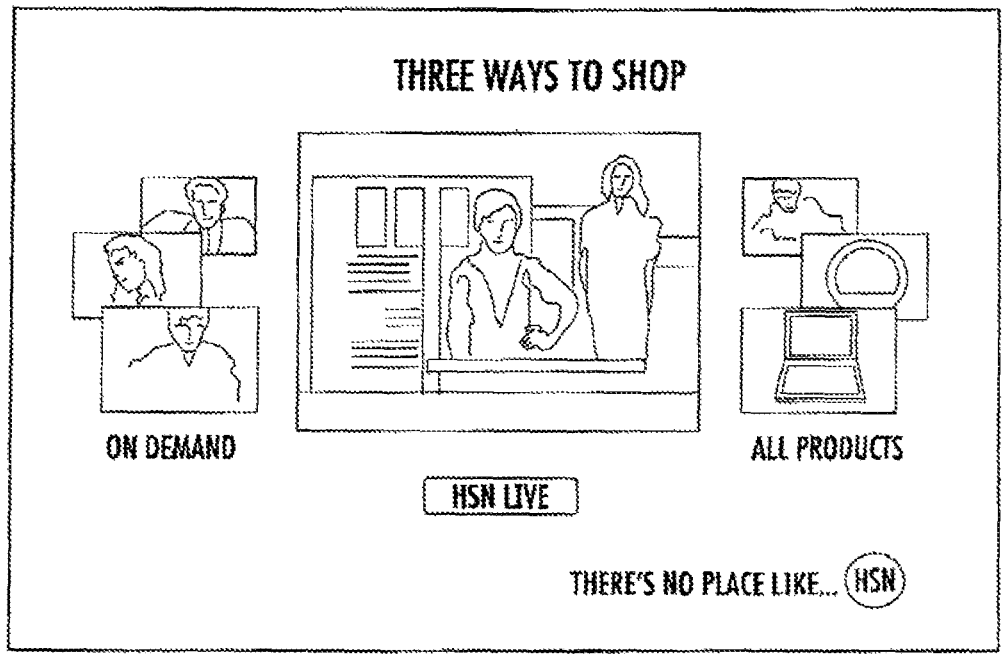
FIGS. 18 to 27 are exemplary user interfaces, according to example embodiments of the present invention.
Figure 19:
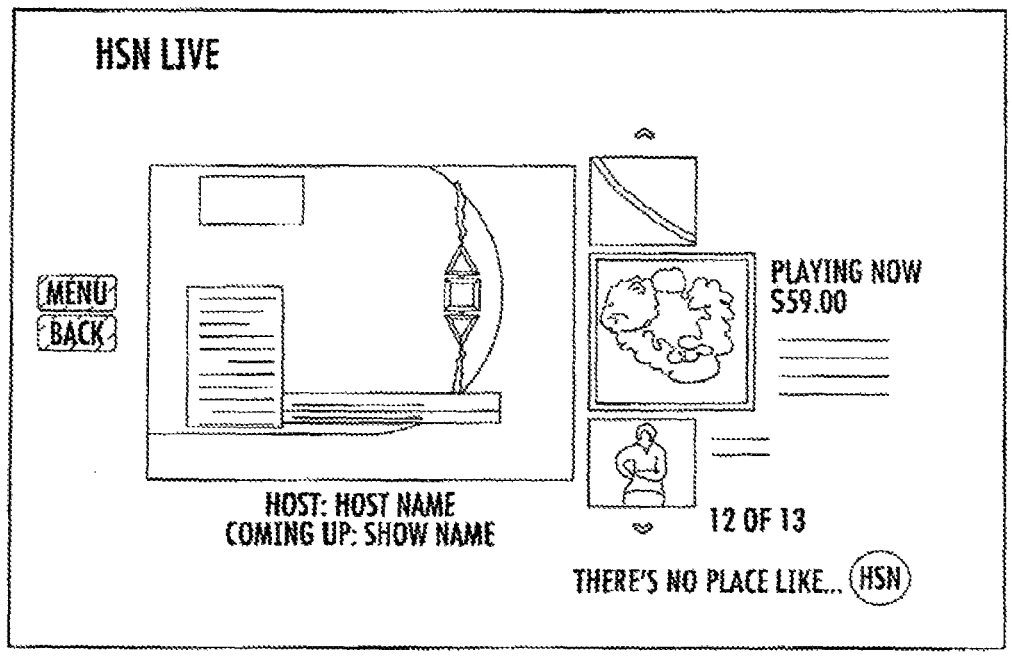
Figure 20:
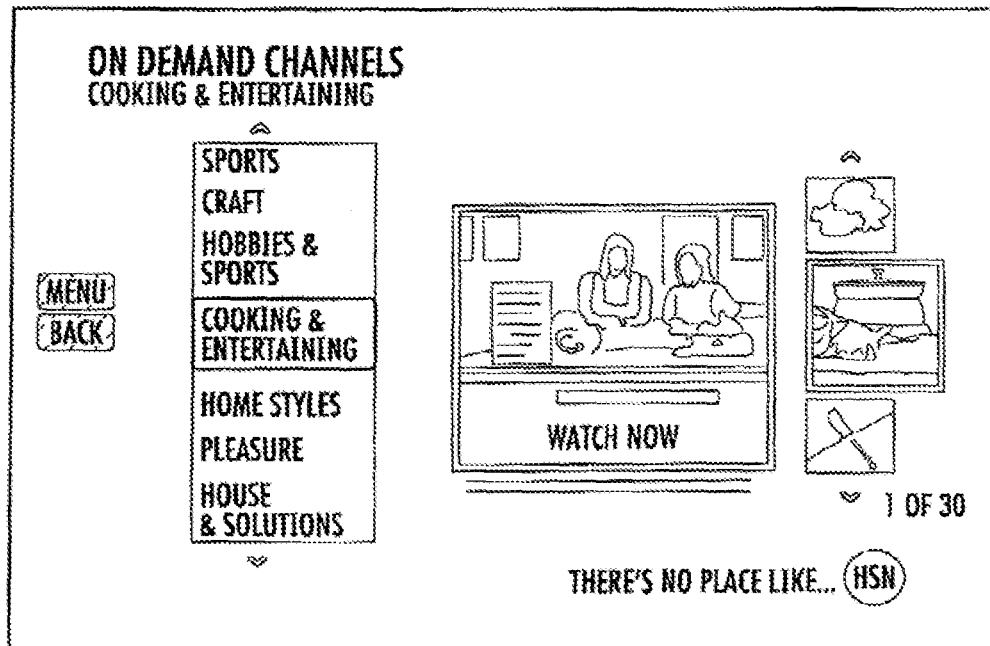

FIG. 17 illustrates an example embodiment method of the three format product presentation system. At 1700, the example method may facilitate the production of video segments, each segment featuring a particular product or set of products for sale. This may be a "shop at home" television studio that traditionally produces live segments featuring a product, 30 information about the product, and a phone number for ordering the product. The segments are then broadcast over the television airwaves, satellite signals, cable lines, and any number of other transmission mediums (e.g., fiber optic). At 1705, live feed 1701 is broadcast to various viewers. The live feed 1701 may consist of any number of formats, including the internet, cable, satellite (e.g., direct broadcast satellite, "DBS"), "teleco" (e.g., phone line networks), fiber optics, etc.

At 1710, the example method partitions the segmented video into the respective segments. Meaning, the continuous feed coming from the production studio is broken into each individual segment, where each segment presents a product or set of products. t 1715, the segments may then be stored in the VOD server 1701. Example embodiments may not actually partition the video feed into different digital entities (e.g., video files), but rather store the digital feed as one or more blocks, where each block includes several "segments." In this embodiment, the blocks may be virtually partitioned via one or more methods. For example, a database of meta-data may be maintained, recording information about logical partitions in the video (e.g., Product ID 4 presentation begins at this date/time stamp and lasts for 12 minutes, etc.). Other organizational schemes are possible as well. Also, at 1720, the example method may tag each segment with other meta-data. For example, a segment featuring $10 lipstick may be tagged with the "Beauty" category, "Makeup" sub-category, and $10 price attribute. Other attribute tags are possible, such as color, brand, etc. The "tagging" may be done by inserting meta-data into the video file. Additionally or alternatively, "tagging" may use a pointer system, and example embodiments may maintain a meta-data database where each record is associated with one or more video file identifiers. The example embodiments may store additional databases, including play-lists for various sets of clips (e.g., a default play-list for the "Beauty" category).

Next, from 1730 on, the example procedure is similar to the example embodiments illustrated in FIGS. 14, 15, and 16. At 1730, the example method may provide a user interface with options for the VOD format, live format, and product catalog. The user may select one of the three options. For example, the live option will display the live feed at 1738. The live feed may not actually go directly to the example method from the same source as the broadcasted feed, but may alternatively be passed through any number of other streaming video servers. The live feed displayed at 1738 is generally a video feed being broadcast independent of any particular user requesting its transmission. Alternatively compared to 1733, where the example method provides the VOD format. Here, the VOD server 1701 streams only the video segments requested by a user. For example, at 1743, the example method may provide and display an ordered stream of video segments according to preferences selected by a user (e.g., the previously mentioned categories and filters). The third format, the product catalog, may be presented at 1735. Here, upon selection of a particular product, the VOD server 1701 may stream the video segment associated with that particular product, as part of the product details page for the particular product.

An example embodiment of the present invention is directed to one or more computer processors configured to operate according to a set of instructions stored on a hardware-implemented computer readable medium to perform the methods described above, separately or in combination.

An example embodiment of the present invention is directed to a hardware-implemented computer-readable medium having stored thereon instructions adapted to be executed by the computer for performing the method described above, separately or in combination.

An example embodiment of the present invention is directed to a method of using a communication device to transmit data representing instructions, the data and represented instructions executable by a processor to perform the methods described above, separately or in combination.

An example embodiment of the present invention is directed to a display device and/or interactive computer system via which to present the various passive and/or interactive user interface screens described above.

Example embodiments of the present invention are directed to novel designs of the various user interface screens described above.

Example embodiments have been described above with reference to e-commerce "products." "Products" is used for illustrative purposes and as a broad descriptive term. For example, all of the example embodiments described above may be implemented for services or a combination of physical goods and services. "Products" may include physical products, product rentals, digital products (e.g., a software download), and/or service products.

Example embodiments have been described above with reference to "video streams." "Video" is used for illustrative purposes and as a broad descriptive term. For example, the video streams and/or stored video may include a synchronous audio stream presented with the video feed. The audio stream may be stored separately or together with the video stream. The audio stream may be streamed separately or together with the video stream. Further, example embodiments may present video without audio, and likewise the methods described above with respect to "video" may be applied to collecting, storing, and streaming audio without a video component.

Several illustrated example embodiments illustrate a series of lines from the bottom of the interface to the middle. The distance between the lines is increasingly greater toward the bottom of the interface. These lines may be literal lines illustrated in the interface. Alternatively, the lines represent a three dimensional arrangement of the interface and/or 10 background of the interface. This progressive gradient is sometimes referred to as a "table-top" effect, and illustrates a surface space design of the interface. These embodiments are illustrative and not limiting, as any number of other embodiments may provide the inventive features described above.

Additional example user interface layouts are illustrated in FIGS. 18 to 27. FIGS. 18 to 23 are similar in layout to FIGS. 1 to 6 respectively, and FIGS. 24 to 27 are similar in layout to FIGS. 8 to 11 respectively.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings and specification.

What is claimed:

1. A system for partitioning a video stream for segmented storage thereof to provide access to targeted video segments tagged with associated item meta-data, the system comprising:
 a processor configured to:
  analyze a video stream broadcast toward a plurality of viewing devices over a network to determine a plurality of items presented in the broadcast video stream,
  partition the analyzed video stream into a plurality of video segments separated by respective logical partitions, with each video segment having a video file identifier that is based on at least one identified item in the respective video segment, and
  obtain respective meta-data associated with the respective at least one item presented in each respective video segment;
 a video segment database configured to store the plurality of video segments in an organizational scheme, such that the respective video file identifier of each video segment is tagged with at least a portion of the obtained meta-data associated with the respective at least one item presented in the respective video segment; and
 a server communicatively coupled to the database and configured to:
  receive, from a requesting viewing device, a video access request associated with the respective at least one item, with the video access request including an access request for the at least one video segment presenting the respective at least one item,
  access the at least one video segment in the video segment database in response to the video access request received from the requesting viewing device and using the meta-data associated with the respective at least one item to access the at least one video segment in the video segment database, and
  transmit the accessed at least one video segment toward the requesting viewing device in response to the video access request.

2. The system according to claim 1, wherein the plurality of items presented in the broadcast video stream are sequentially presented with each item of the plurality of items presented in a respective video segment.

3. The system according to claim 1, wherein the video access request is a video-on-demand request received from the requesting viewing device, which comprises at least one of a general purpose computer, a smart phone, a personal digital assistant, or a set-top box with a coupled display device, and is configured to receive and display the at least one video segment.

4. The system according to claim 1, wherein the server is further configured to embed at least one interactive set of instructions with the at least one video segment, with the at least one interactive set of instructions configured to present a user interface on the requesting viewing device that includes at least one interactive page with textual description associated with the at least one item presented in the at least one video segment.

5. The system according to claim 4, wherein the requesting viewing device is further configured to access and display product content information relating to the at least one item in the at least one video segment in response to a user selection of a link presented in the at least one interactive page.

6. The system according to claim 5, wherein the product content information comprises a webpage related to the at least one item.

7. The system according to claim 5, wherein the at least one video segment is configured to be displayed on the requesting viewing device concurrently with the at least one interactive page.

8. The system according to claim 1, wherein the video stream is a continuous video feed incoming from a production studio.

9. The system according to claim 1, wherein the video segment database is configured to store the plurality of video segments as a continuous video feed that is virtually partitioned in the organization scheme with the respective logical partitions configured as pointers to separate each of the plurality of video segments.

10. The system according to claim 1, wherein each of the plurality of video segments is stored in the video segment database in a respective video file and the respective video file identifier of each video segment is tagged with the obtained meta-data by inserting the obtained meta-data into the respective video file.

11. The system according to claim 1, wherein the processor is further configured to tag each video file identifier with additional meta-data relating to a product category associated with the at least one item presented in the at least one video segment.

12. The system according to claim 11, wherein the server is further configured to:
 access a subset of video segments of the plurality of video segments in response to the video access request that includes an access request for the subset of video segments based on the additional meta-data associated with the product category of the at least one item presented in the at least one video segment, and
 transmit the accessed subset of video segments toward the requesting viewing device in response to the video access request.

13. A system for partitioning a video stream for segmented storage thereof to provide access to targeted video segments tagged with associated item meta-data, the system comprising:
 a processor configured to:
  analyze a video stream to determine a plurality of items presented in the video stream,
  partition the analyzed video stream into a plurality of video segments separated by respective logical partitions, with each video segment partitioned based on at least one identified item of the plurality of items presented in the respective video segment as part of the video stream, and
  obtain respective meta-data associated with the respective at least one item presented in each respective video segment;
 a video database configured to store the plurality of video segments with each video segment tagged with at least a portion of the obtained meta-data associated with the respective at least one item presented in the respective video segment, such that the plurality of video segments are configured and stored in the video database to be accessed using the tagged meta-data, respectively, in response to a video access request received from at least one viewing device; and a server communicatively coupled to the video database and configured to receive a video access request associated with the at least one item of the plurality of items, and to access at least one video segment in the video database using the meta-data associated with the respective at least one item.

14. The system according to claim 13, wherein the server is further configured to:

transmit the accessed at least one video segment toward the at least one viewing device in response to the video access request.

15. The system according to claim 13, wherein the plurality of items presented in the video stream are sequentially presented with each item of the plurality of items presented in a respective video segment.

16. The system according to claim 13, wherein the video access request is a video-on-demand request received from the at least one viewing device, which comprises at least one of a general purpose computer, a smart phone, a personal digital assistant, or a set-top box with a coupled display device, and is configured to receive and display the at least one video segment.

17. The system according to claim 14, wherein the server is further configured to embed at least one interactive set of instructions with the at least one video segment, with the at least one interactive set of instructions configured to present a user interface on the at least one viewing device that includes at least one interactive page with textual description associated with the at least one item presented in the at least one video segment.

18. The system according to claim 17, wherein the at least one viewing device is further configured to access and display product content information relating to the at least one item in the at least one video segment in response to a user selection of a link presented in the at least one interactive page.

19. The system according to claim 17, wherein the at least one video segment is configured to be displayed on the at least one viewing device concurrently with the at least one interactive page.

20. The system according to claim 13, wherein the video database is configured to store the plurality of video segments as a continuous video feed that is virtually partitioned in an organization scheme with the respective logical partitions configured as pointers to separate each of the plurality of video segments.

21. The system according to claim 13, wherein each of the plurality of video segments is stored in the video database in a respective video file and a respective video file identifier of each video segment is tagged with the obtained meta-data by inserting the obtained meta-data into the respective video file.

22. The system according to claim 21, wherein the processor is further configured to tag each video file identifier with additional meta-data relating to a product category associated with the at least one item presented in the at least one video segment, and wherein the server is further configured to:

access a subset of video segments of the plurality of video segments in response to the video access request that includes an access request for the subset of video segments based on the additional meta-data associated with the product category of the at least one item presented in the at least one video segment, and transmit the accessed subset of video segments toward the at least one viewing device in response to the video access request.

23. A method for partitioning a video stream for segmented storage thereof to provide access to targeted video segments tagged with associated item meta-data, the method comprising:

analyzing, by a processor, a video stream broadcast toward a plurality of viewing devices over a network to determine a plurality of items presented in the broadcast video stream;

partitioning, by the processor, the analyzed video stream into a plurality of video segments separated by respective logical partitions, with each video segment having a video file identifier that is based on at least one identified item in the respective video segment;

obtain, by the processor, respective meta-data associated with the respective at least one item presented in each respective video segment;

storing, by a video segment database, the plurality of video segments in an organizational scheme, such that the respective video file identifier of each video segment is tagged with at least a portion of the obtained meta-data associated with the respective at least one item presented in the respective video segment;

receive, by a server communicatively coupled to the database and from a requesting viewing device, a video access request associated with the respective at least one item, with the video access request including an access request for the at least one video segment presenting the respective at least one item, accessing, by the server, the at least one video segment in the video segment database in response to the video access request received from the requesting viewing device and using the meta-data associated with the respective at least one item to access the at least one video segment in the video segment database; and transmitting, by the server, the accessed at least one video segment toward the requesting viewing device in response to the video access request.

24. The method according to claim 23, further comprising:

embedding, by the server, at least one interactive set of instructions with the at least one video segment, with the at least one interactive set of instructions configured to present a user interface on the requesting viewing device that includes at least one interactive page with textual description associated with the at least one item presented in the at least one video segment; and access and display, by the requesting viewing device, product content information relating to the at least one item in the at least one video segment in response to a user selection of a link presented in the at least one interactive page, wherein the at least one video segment is configured to be displayed on the requesting viewing device concurrently with the at least one interactive page.

25. The method according to claim 23, further comprising:

storing, by the video segment database, the plurality of video segments as a continuous video feed that is virtually partitioned in the organization scheme; and configuring with the respective logical partitions as pointers to separate each of the plurality of video segments.

26. The method according to claim 23, further comprising:

storing, by the video segment database, each of the plurality of video segments in a respective video file; and tagging the respective video file identifier of each video segment with the obtained meta-data by inserting at least a portion of the obtained meta-data into the respective video file.

27. The method according to claim 23, further comprising:

tagging, by the processor, each video file identifier with additional meta-data relating to a product category associated with the at least one item presented in the at least one video segment;

accessing, by the server, a subset of video segments of the plurality of video segments in response to the video access request that includes an access request for the subset of video segments based on the additional meta-data associated with the product category of the at least one item presented in the at least one video segment; and transmitting, by the server, the accessed subset of video segments toward the requesting viewing device in response to the video access request.

28. A method for partitioning a video stream for segmented storage thereof to provide access to targeted video segments tagged with associated item meta-data, the method comprising:

analyzing, by a processor, a video stream to determine a plurality of items presented in the video stream;

partitioning, by the processor, the analyzed video stream into a plurality of video segments separated by respective logical partitions, with each video segment partitioned based on at least one identified item of the plurality of items presented in the respective video segment as part of the video stream;

obtaining, by the processor, respective meta-data associated with the respective at least one item presented in each respective video segment;

storing, by a video database, the plurality of video segments with each video segment tagged with at least a portion of the obtained meta-data associated with the respective at least one item presented in the respective video segment;

configuring the plurality of video segments in the video database to be accessed using the tagged meta-data, respectively, in response to a video access request received from at least one viewing device;

receiving, by a server communicatively coupled to the video database, a video access request associated with the at least one item of the plurality of items; and accessing, by the server, at least one video segment in the video database using the meta-data associated with the respective at least one item.

29. The method according to claim 28, further comprising:

transmitting, by the server, the accessed at least one video segment toward the at least one viewing device in response to the video access request.

30. The method according to claim 29, further comprising:

storing, by the video database, each of the plurality of video segments in a respective video file;

tagging a respective video file identifier of each video segment with at least a portion of the obtained meta-data by inserting the obtained meta-data into the respective video file;

tagging each video file identifier with additional meta-data relating to a product category associated with the at least one item presented in the at least one video segment;

accessing, by the server, a subset of video segments of the plurality of video segments in response to the video access request that includes an access request for the subset of video segments based on the additional meta-data associated with the product category of the at least one item presented in the at least one video segment; and transmitting, by the server, the accessed subset of video segments toward the at least one viewing device in response to the video access request.

\* \* \* \* \*